US012621337B2

(12) United States Patent
Wang et al.

(10) Patent No.: US 12,621,337 B2
(45) Date of Patent: May 5, 2026

(54) AMPLIFICATION OF FORMAL METHOD AND FUZZ TESTING TO ENABLE SCALABLE ASSURANCE FOR COMMUNICATION SYSTEM

(71) Applicant: The Trustees of The Stevens Institute of Technology, Hoboken, NJ (US)

(72) Inventors: Ying Wang, West New York, NJ (US); Jingda Yang, Jersey City, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 78 days.

(21) Appl. No.: 18/628,625

(22) Filed: Apr. 5, 2024

(65) Prior Publication Data

US 2024/0340302 A1 Oct. 10, 2024

Related U.S. Application Data

(60) Provisional application No. 63/457,557, filed on Apr. 6, 2023.

(51) Int. Cl.
| | |
|---|---|
| *H04L 29/00* | (2006.01) |
| *G06F 21/57* | (2013.01) |
| *G06F 40/20* | (2020.01) |
| *G06N 5/048* | (2023.01) |
| *H04L 9/40* | (2022.01) |

(52) U.S. Cl.
CPC ........ *H04L 63/1433* (2013.01); *G06F 21/577* (2013.01); *G06F 40/20* (2020.01); *G06N 5/048* (2013.01); *G06F 2221/033* (2013.01)

(58) Field of Classification Search
CPC ... H04L 63/1433; G06F 21/577; G06F 40/20; G06F 2221/033; G06N 5/048; G06N 20/00
See application file for complete search history.

(56) References Cited

U.S. PATENT DOCUMENTS

| | | | | |
|---|---|---|---|---|
| 11,238,542 | B1 * | 2/2022 | Wixted | G06Q 40/123 |
| 11,593,648 | B2 * | 2/2023 | Lee | G06N 3/0499 |
| 12,434,725 | B1 * | 10/2025 | Casterton | G06N 20/00 |
| 2006/0274070 | A1 * | 12/2006 | Herman | G06T 13/20 |
| | | | | 345/473 |

(Continued)

FOREIGN PATENT DOCUMENTS

| | | | | |
|---|---|---|---|---|
| CN | 116150684 B | * | 9/2024 | G06N 3/08 |

OTHER PUBLICATIONS

Abdo et al., "Ensured Confidentiality Authentication and Key Agreement Protocol for Eps," in 2012 Symposium on Broadband etworks and Fast Internet, RELABIRA, May 28-29, 2012.

(Continued)

*Primary Examiner* — Don G Zhao
(74) *Attorney, Agent, or Firm* — Clark Hill PLC; Ralph W. Selitto; John K. Kim

(57) ABSTRACT

Methods for more secure mobile network communications are disclosed. Specifically, details involving natural language processing (NLP) based auto formal modeling of protocols and specifications with large language models (NLP) are provided. Methods for formal and fuzzing amplification for fuzz testing to detect vulnerabilities are also disclosed. Furthermore, solutions are provided to identified vulnerabilities in existing 5G infrastructures. Also disclosed is a digital twin fuzzing framework.

32 Claims, 92 Drawing Sheets

(56) References Cited

U.S. PATENT DOCUMENTS

| | | | |
|---|---|---|---|
| 2021/0058970 A1* | 2/2021 | Kwak | H04W 72/23 |
| 2021/0117617 A1* | 4/2021 | Blaya | G06N 20/00 |
| 2022/0284235 A1* | 9/2022 | Jones | G06N 20/10 |
| 2022/0329608 A1* | 10/2022 | Liu | H04L 63/1416 |
| 2022/0335135 A1 | 10/2022 | McGraw et al. | |
| 2023/0094656 A1 | 3/2023 | Mukherjee | |
| 2023/0123322 A1* | 4/2023 | Cella | G05B 23/0283 700/29 |
| 2023/0127651 A1* | 4/2023 | Cella | G06N 3/045 705/7.11 |
| 2023/0196179 A1* | 6/2023 | Abraham | G06N 5/04 706/12 |
| 2023/0222393 A1* | 7/2023 | Zahm | G06F 40/35 706/12 |
| 2023/0298325 A1* | 9/2023 | Malur Srinivasan | G06V 10/772 382/159 |
| 2023/0319086 A1 | 10/2023 | Beauchesne | |
| 2024/0187176 A1* | 6/2024 | Wang | H04W 72/23 |
| 2024/0242428 A1* | 7/2024 | Ackerman | G06F 40/166 |
| 2024/0249158 A1* | 7/2024 | Narayanan | G06N 5/022 |
| 2024/0256948 A1* | 8/2024 | Betthauser | G06N 20/00 |
| 2024/0330655 A1* | 10/2024 | Hearty | G06N 20/00 |
| 2024/0333765 A1* | 10/2024 | McGrew | G06F 21/552 |
| 2024/0338458 A1 | 10/2024 | Wang et al. | |
| 2024/0340302 A1* | 10/2024 | Wang | G06N 20/00 |
| 2024/0388540 A1* | 11/2024 | Bush | H04L 47/28 |
| 2024/0403428 A1* | 12/2024 | Lal | G06F 21/566 |
| 2024/0414211 A1* | 12/2024 | Boyer | G06F 40/58 |
| 2025/0007926 A1* | 1/2025 | Southgate | G06F 21/552 |
| 2025/0111150 A1* | 4/2025 | Garapati | G06F 40/30 |
| 2025/0227119 A1* | 7/2025 | Abbaszadeh | H04L 63/1425 |
| 2025/0231973 A1* | 7/2025 | Kelsey | G06F 16/3329 |

OTHER PUBLICATIONS

Clarke et al., "Counterexample-guided Abstraction Refinement," CAV 2000, LNCS 1855, Springer-Verlag Berlin Heidelberg, 2000,154-169.
Cremers et al., "Component-Based Formal Analysis of 5G-AKA: Channel Assumptions and Session Confusion," Network and Distributed System Security Symposium, Jan. 2019.
Hadj-Kacem et al., "A Formal Model of a Multi-step Coordination Protocol for Self-adaptive Software Using Coloured Petri Nets," International Journal of Computing and Information Sciences (IJCIS), http://www.ijcis.info/, hal-00361145, 7 (1), 2009, 16 pages.
Khan et al., "Defeating the Downgrade Attack on Identity Privacy in 5g," in International Conference on Research in Security Standardisation, Springer, 2018.
Universal Mobile Telecommunications System (UMTS); LTE; Mobility Management Entity (MME)—Visitor Location Register (VLR), SGs Interface Specification, 3rd Generation Partnership Project (3GPP), Apr. 9, 2018, 79 pages.
Vaswani et al., "Attention is all you need," 31st Conference on Neural Information Processing Systems (NIPS 2017), 2017, 11 pages.
Yang, "Vulnerability and Unintended Emergent Behavior Detection for 5G RRC Protocols and Stack Journal Version," IEEE Journal on Selected Areas in Communications, Feb. 9, 2023.
Yang et al., "Dependency-Graph enabled Formal Analysis for 5G AKA Protocols: Assumption Propagation and Verification," Accepted at 2024 IEEE International Conference on Communications (ICC), Jan. 2024, 7 pages plus cover page.
Yang et al., "Systematic Meets Unintended: Prior Knowledge Adaptive 5G Vulnerability Detection via Multi-Fuzzing," Journal of Latex Class Files, IEEE, 2021, 1-15.
Yang et al., "Toward Auto-Modeling of Formal Verification for NextG Protocols: A Multimodal Cross-and-Self-Attention Large Language Model Approach," IEEE Access, vol. 12, Feb. 26, 2024, 12 pages.
Yang et al., "Systematic and Scalable Vulnerability Detection for 5G Specifications and Implementations," IEEE Journal on Selected Areas in Communications, 2023, 1-11.
Abdo et al., "Ensured Confidentiality Authentication and Key Agreement Protocol for EPS," 2012 Symposium on Broadband Networks and Fast Internet (RELABIRA), IEEE, 2012, 5 pages.
Cremers et al., "Component-Based Formal Analysis of 5G-AKA: Channel Assumptions and Session Confusion," Network and Distributed System Security (NDSS) Symposium 2019, Feb. 24-27, 2019, San Diego, USA, 15 pages.
Khan et al., "Defeating the Downgrade Attack on Identity Privacy in 5G," Springer Nature Switzerland AG 2018, 95-119.
Office Action issued for U.S. Appl. No. 18/628,619 entitled "Amplification of Formal Method and Fuzz Testing to Enable Scalable Assurance for Communication System," dated Sep. 4, 2025, 30 pages.

* cited by examiner

FIG. 2

THRUST 4:
DEPLOYMENT

DIGITAL TWIN FRAMEWORK CONNECTING TO REAL—WORD

THRUST 2+ THRUST 3:
VULNERABILITY DETECTION

SCALABLE FORMAL+FUZZ VULNERABILITY DETECTION AND MIGRATION SYSTEM (FF—VUDMS)

THRUST 1: PROTOCOL ABSTRACTION

S1:FORMAL—BASED DESCRIPTION

S2:PROTOCOL—BASED DESCRIPTION

S3:SCENARIO DATA DESCRIPTION

S4:NATURAL LANGUAGE DESCRIPTION

Ci | USE SCENARIO i

Aj | APPLICATION j

A1:5G OPEN SOURCE INFRASTRUCTURE

A2:INDOOR DRONES CONTROL TESTBED

A3:OUTDOOR MULTI—AGENT NAVIGATION TESTBED

PILOT SCIENTIFIC RESEARCH CRITICAL INFRASTRUCTURES

Figure 6:
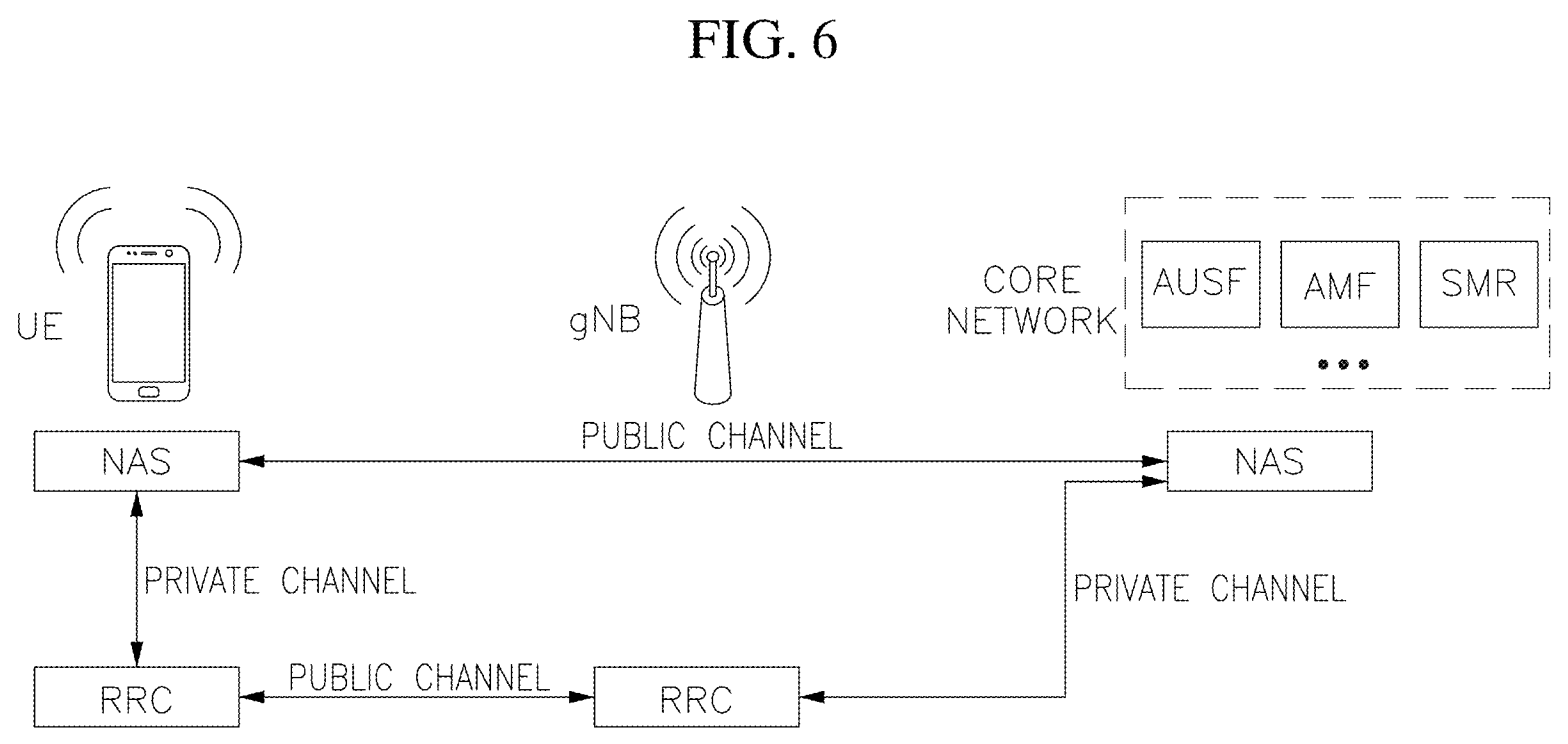

Figure 9:
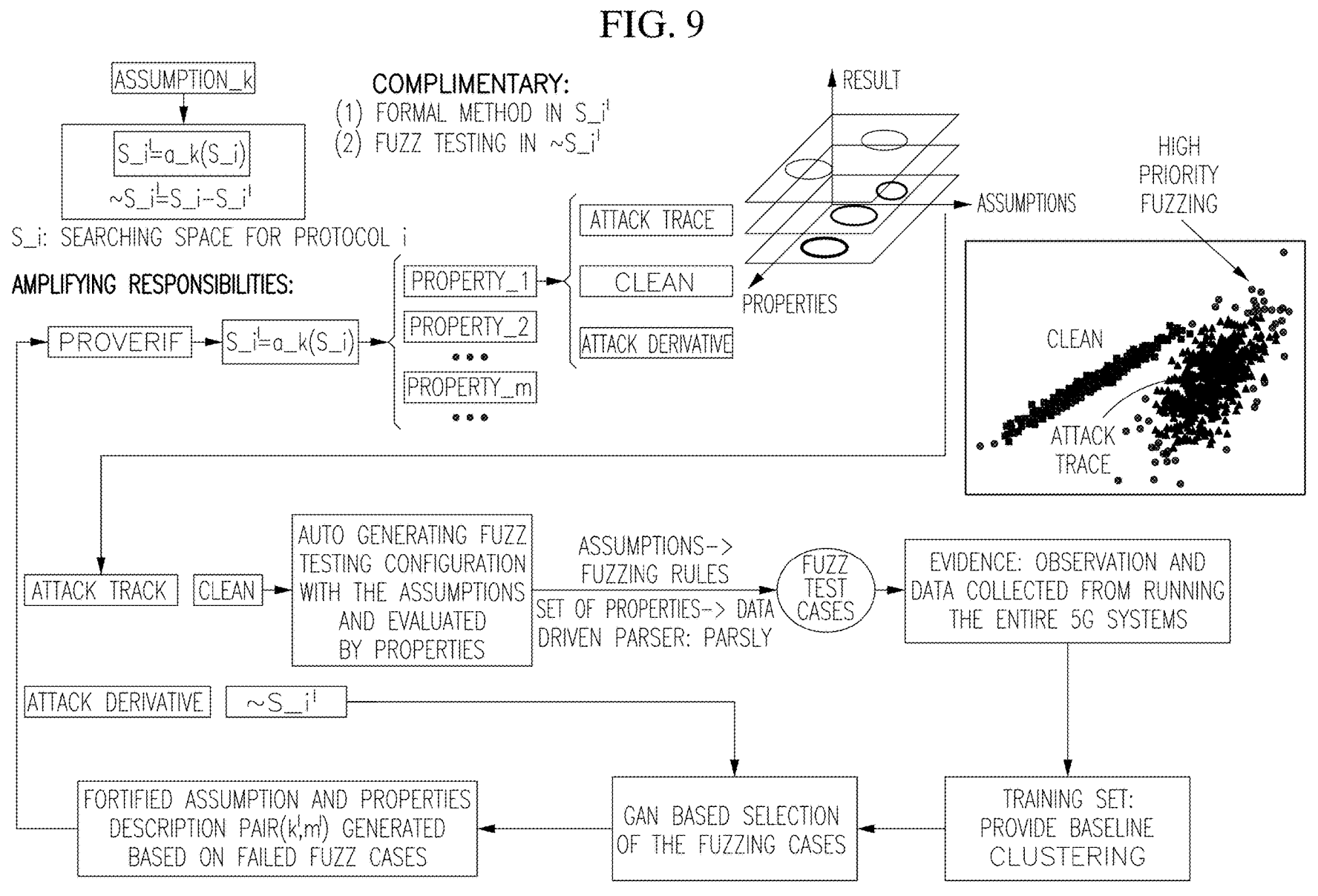

S_i: SEARCHING SPACE FOR PROTOCOL i

COMPLIMENTARY:
(1) FORMAL METHOD IN $S\_i^t$
(2) FUZZ TESTING IN $\sim S\_i^t$

AMPLIFYING RESPONSIBILITIES:

ASSUMPTION_k $S\_i^t = a\_k(S\_i)$
$\sim S\_i^t = S\_i - S\_i^t$

PROPERTY_1
PROPERTY_2
...
PROPERTY_m

ATTACK TRACE
CLEAN
ATTACK DERIVATIVE

RESULT

ASSUMPTIONS

PROPERTIES

HIGH PRIORITY FUZZING

CLEAN

ATTACK TRACE

PROVERIF

ATTACK TRACK    CLEAN

ATTACK DERIVATIVE    $\sim S\_i^t$

AUTO GENERATING FUZZ TESTING CONFIGURATION WITH THE ASSUMPTIONS AND EVALUATED BY PROPERTIES

ASSUMPTIONS-> FUZZING RULES
SET OF PROPERTIES-> DATA DRIVEN PARSER: PARSLY

FUZZ TEST CASES

EVIDENCE: OBSERVATION AND DATA COLLECTED FROM RUNNING THE ENTIRE 5G SYSTEMS

TRAINING SET: PROVIDE BASELINE CLUSTERING

GAN BASED SELECTION OF THE FUZZING CASES

FORTIFIED ASSUMPTION AND PROPERTIES DESCRIPTION PAIR(k,m) GENERATED BASED ON FAILED FUZZ CASES

FUZZING TEST AND STATE DISTRIBUTION IN DIFFERENT TYPES

| AMOUNT | SUCCESSFUL CONNECTION | FAILED CONNECTION |
|---|---|---|
| CASES | 76 | 129 |
| STATES | 39 | 7 |

FIG. 17A

LEGAL COMMAND-LEVEL FUZZING TEST DISTRIBUTION IN DIFFERENT TYPES

| AMOUNT | SUCCESSFUL CONNECTION | FAILED CONNECTION |
|---|---|---|
| CASES | 3037 | 54 |
| STATES | 43 | 13 (HIGH-RISK) |

Figure 17B:
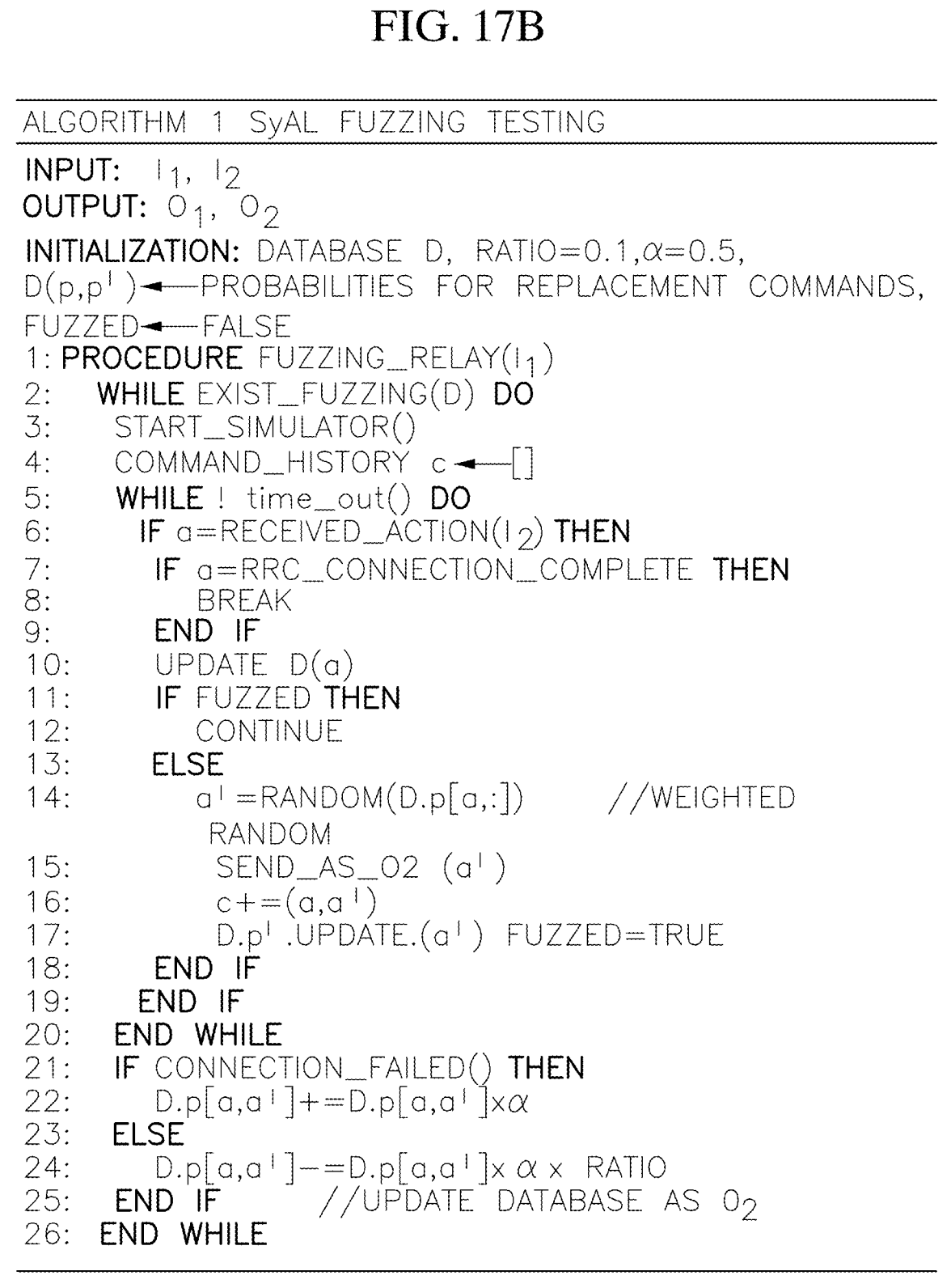

ALGORITHM 1 SyAL FUZZING TESTING

---

INPUT: $I_1$, $I_2$
OUTPUT: $O_1$, $O_2$
INITIALIZATION: DATABASE D, RATIO=0.1,$\alpha$=0.5,
$D(p,p^I)$◄──PROBABILITIES FOR REPLACEMENT COMMANDS,
FUZZED◄──FALSE
1: PROCEDURE FUZZING_RELAY($I_1$)
2:    WHILE EXIST_FUZZING(D) DO
3:       START_SIMULATOR()
4:       COMMAND_HISTORY c◄──[]
5:       WHILE ! time_out() DO
6:          IF a=RECEIVED_ACTION($I_2$) THEN
7:             IF a=RRC_CONNECTION_COMPLETE THEN
8:                BREAK
9:             END IF
10:            UPDATE D(a)
11:            IF FUZZED THEN
12:               CONTINUE
13:            ELSE
14:               $a^I$ =RANDOM(D.p[a,:])      //WEIGHTED
                  RANDOM
15:               SEND_AS_O2 ($a^I$)
16:               c+=(a,$a^I$)
17:               D.$p^I$.UPDATE.($a^I$) FUZZED=TRUE
18:            END IF
19:         END IF
20:      END WHILE
21:      IF CONNECTION_FAILED() THEN
22:         D.p[a,$a^I$]+=D.p[a,$a^I$]x$\alpha$
23:      ELSE
24:         D.p[a,$a^I$]-=D.p[a,$a^I$]x $\alpha$ x RATIO
25:      END IF      //UPDATE DATABASE AS $O_2$
26:   END WHILE

---

SUCCESSFUL CONNECTION

FAILED CONNECTION

NEVER FUZZING

ORIGINAL COMMANDS

REPLACEMENT COMMANDS

FIG. 20A

COMMAND LIST

| COMMAND INDEX | COMMAND TYPE |
|---|---|
| A | RRC CONNECTION REQUEST |
| B | RRC CONNECTION SETUP COMPLETE |
| C | UL INFORMATION TRANSFER |
| D | SECURITY MODE COMPLETE |
| E | UE CAPABILITY INFORMATION |

FIG. 20B

COMPARISON OF FUZZ STRATEGY IN DIFFERENT PLATFORMS

| FUZZ STRATEGY (UP-LINK) | RRC LAYER | MAC LAYER |
|---|---|---|
| COMMAND A → COMMAND D | FAILED CONNECTION | REPEAT OF COMMAND A |
| COMMAND B → COMMAND D | FAILED CONNECTION | FAILED CONNECTION |

FIG. 20C

RESULT OF BIT-LEVEL FUZZING

| CHANNEL | COMMAND | IDENTIFIER | FUZZING VALUE | RESULT |
|---|---|---|---|---|
| CCCH (UP_LINK) | RRC SETUP REQUEST | UE-IDENTITY | OO | SUCCESSFUL |
| | | | O1 | SUCCESSFUL |
| | | | 10 | SUCCESSFUL |
| | | ESTABLISHMENT CAUSE | 0000 | EMERGENCY |
| | | | 0001 | NULLTYPE |
| | | | 0010 | HIGH_PRIO_ACCESS |
| | | | 0011 | NULLTYPE |
| | | | 0100 | MT_ACCESS |
| | | | 0101 | NULLTYPE |
| | | | 0110 | MO_SIG |
| | | | 0111 | NULLTYPE |
| | | | 1000 | MO_DATA |
| | | | 1001 | NULLTYPE |
| | | | 1010 | DELAY_TOLERANT_ ACCESS_v1020 |
| | | | 1011 | NULLTYPE |
| | | | 1100 | MO_VOICE_ CALL_v1280 |
| | | | 1101 | NULLTYPE |
| | | | 1110 | SPARE 1 |
| | | | 1111 | NULLTYPE |
| | | SPARE | NONE | NONE |
| PDCCH (DOWN_LINK) | RRC RECONFIGURATION | sr-CONFIGINDEX | <5 | SUCCESSFUL |
| | | | <15 | SUCCESSFUL |
| | | | <35 | SUCCESSFUL |
| | | | <75 | SUCCESSFUL |
| | | | <155 | SUCCESSFUL |
| | | | <157 | SUCCESSFUL |
| | | | =157 | SUCCESSFUL |
| CCCH (DOWN_LINK) | RRC CONNECTION | srb1.srb_id | 0 | REJECT |
| | | | 2 | REJECT |

FIG. 20D

COMPARISON OF DIFFERENT BIT-LEVEL STRATEGIES

| COMMAND | IDENTIFIER | FUZZING VALUE | FUZZING IN RRC LAYER | FUZZING IN MAC LAYER |
|---|---|---|---|---|
| RRC CONNECTION REQUEST | UE-IDENTITY | OO | SUCCESSFUL | FAILED |
| | | O1 | SUCCESSFUL | FAILED |
| | | 10 | SUCCESSFUL | FAILED |
| | ESTABLISHMENT CAUSE | 0000 | EMERGENCY | FAILED |
| | | 0001 | NULLTYPE | FAILED |
| | | 0010 | HIGH_PRIO_ACCESS | FAILED |
| | | 0011 | NULLTYPE | FAILED |
| | | 0100 | MT_ACCESS | FAILED |
| | | 0101 | NULLTYPE | FAILED |
| | | 0110 | MO_SIG | FAILED |
| | | 0111 | NULLTYPE | FAILED |
| | | 1000 | MO_DATA | FAILED |
| | | 1001 | NULLTYPE | FAILED |
| | | 1010 | DELAY_TOLERANT_ACCESS_v1020 | FAILED |
| | | 1011 | NULLTYPE | FAILED |
| | | 1100 | MO_VOICE_CALL_v1280 | FAILED |
| | | 1101 | NULLTYPE | FAILED |
| | | 1110 | SPARE 1 | FAILED |
| | | 1111 | NULLTYPE | FAILED |

FIG. 23A

COMPARISON ANALYSIS WITH DIFFERENT FUZZING STRATEGIES

| APPROACHES | | SYSTEM MODEL | PRIOR-KNOWLEDGE REQUIREMENT | FUZZING TECHNOLOGIES | AUTOMATION LEVEL |
|---|---|---|---|---|---|
| BASESAFE | | WHITE BOX | BASEBAND FIRMWARE | COMMAND-LEVEL FUZZING IN NON-TASK BOUNDRIES | SEMI-AUTOMATED |
| BASESPEC | | WHITE BOX | BASEBAND FIRMWARE | BIT-LEVEL FUZZING IN NON-TASK BOUNDRIES | SEMI-AUTOMATED |
| FIRMWIRE | | WHITE BOX | INITIALIZE THE BASEBAND THROUGH BOOT | COMMAND-LEVEL FUZZING IN BASEBAND'S RTOSAPIs | SEMI-AUTOMATED |
| LTEFUZZ | | WHITE BOX | FULLY CONTROLLABLE LTE OPEN SOURCE SOFTWARE | RULE-BASED COMMAND-LEVEL FUZZING | SEMI-AUTOMATED |
| LTEINSPECTOR | | WHITE BOX | ABSTRACT LTE MODEL | RULE-BASED COMMAND-LEVEL FUZZING | SEMI-AUTOMATED |
| DIRECTFUZZ | | GRAY BOX | RTL INPUT RANGE | COVERAGE GUIDED BIT-LEVEL FUZZING | FULLY-AUTOMATED |
| OURS | LISTEN-AND-LEARN (LAL) | BLACK BOX | NO PRIOR-KNOWLEDGE REQUIRED | COMMAND-LEVEL FUZZING | FULLY-AUTOMATED |
| | SYNCHRONIZE-AND-LEARN (SyAL) | GRAY BOX (PROTOCOL STRUCTURE) | MESSAGE INTERPRETER | BIT-LEVEL FUZZING | FULLY-AUTOMATED |
| | SOURCE-AND-LEARN (SoAL) | WHITE BOX | SrsRAN MODIFICATION | BIT-LEVEL FUZZING | SEMI-AUTOMATED |

FIG.24A

RRC SETUP REQUEST−IEs FIELD DESCRIPTIONS

| IDENTIFIER | DESCRIPTION |
|---|---|
| ESTABLISHMENT CAUSE | PROVIDES THE ESTABLISHMENT CAUSE FOR THE RRCSETUPREQUEST IN ACCORDANCE WITH THE INFORMATION RECEIVED FROM UPPER LAYERS. gNB IS NOT EXPECTED TO REJECT AN RRCSETUPREQUEST DUE TO UNKNOWN CAUSE VALUE BEING USED BY THE UE. |
| ue−IDENTITY | UE IDENTITY INCLUDED TO FACILITATE CONTENTION RESOLUTION BY LOWER LAYERS. |

FIG. 26A

IMBALANCED NATURE OF FORMAL PROPERTY DATA

| RELATIONSHIP | CLASS | COUNT | RELATIONSHIP | CLASS | COUNT |
|---|---|---|---|---|---|
| CONFIDENTIALITY | 0 | 16421 | ACCOUNTING | 0 | 16399 |
| CONFIDENTIALITY | 1 | 7 | ACCOUNTING | 1 | 29 |
| INTEGRITY | 0 | 16408 | INCLUDE | 0 | 16329 |
| INTEGRITY | 1 | 20 | INCLUDE | 1 | 99 |
| AUTHENTICATION | 0 | 16417 | GENERATE | 0 | 16389 |
| AUTHENTICATION | 1 | 11 | GENERATE | 1 | 39 |

FIG. 26B

CONFIGURATION OF MODEL

| PARAMETER | VALUE |
|---|---|
| GPT-2'S EMBEDDING SIZE | 768 |
| GPT-2'S SEQUENCE LENGTH | 104 |
| GPT-2'S LAYERS | 12 |
| GPT-2'S ATTENTION HEAD | 12 |
| CROSS-ATTENTION LAYER | 6 |
| CROSS-ATTENTION ATTENTION HEAD | 6 |
| SELF-ATTENTION LAYER | 6 |
| SELF-ATTENTION ATTENTION HEAD | 6 |
| LEARNING RATE | $1e^{-7}$ |
| EPOCH | 100 |
| DROPOUT RATE | 0.1 |
| TRAIN/VALIDATION RATIO | 9 : 1 |

Figure 28:
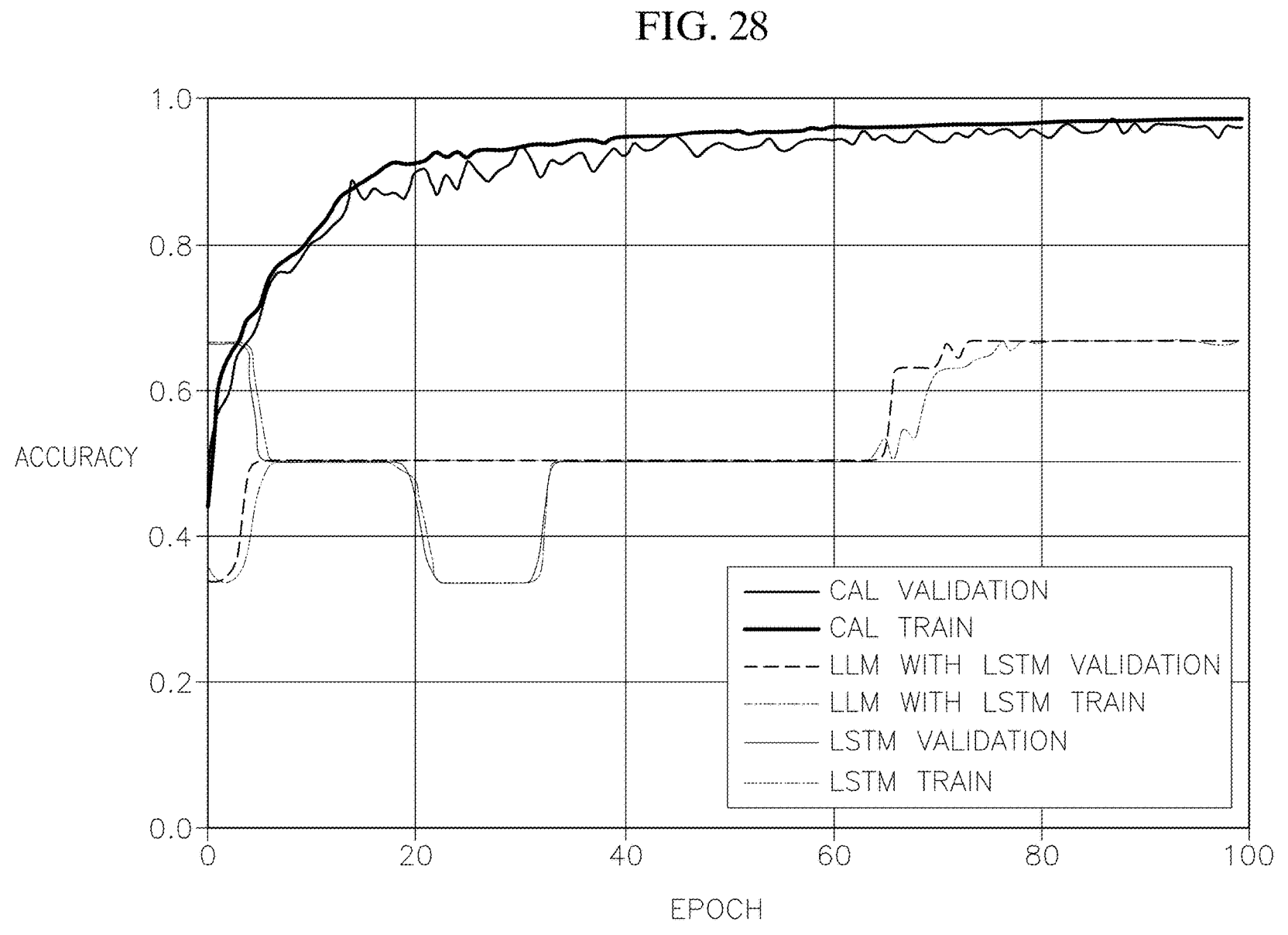

ACCURACY OF DIFFERENT MODELS

| MODEL | ACCURACY |
|---|---|
| CAL | 95.94% |
| LLM WITH LSTM | 66.76% |
| LSTM | 50.21% |

Figure 32E:
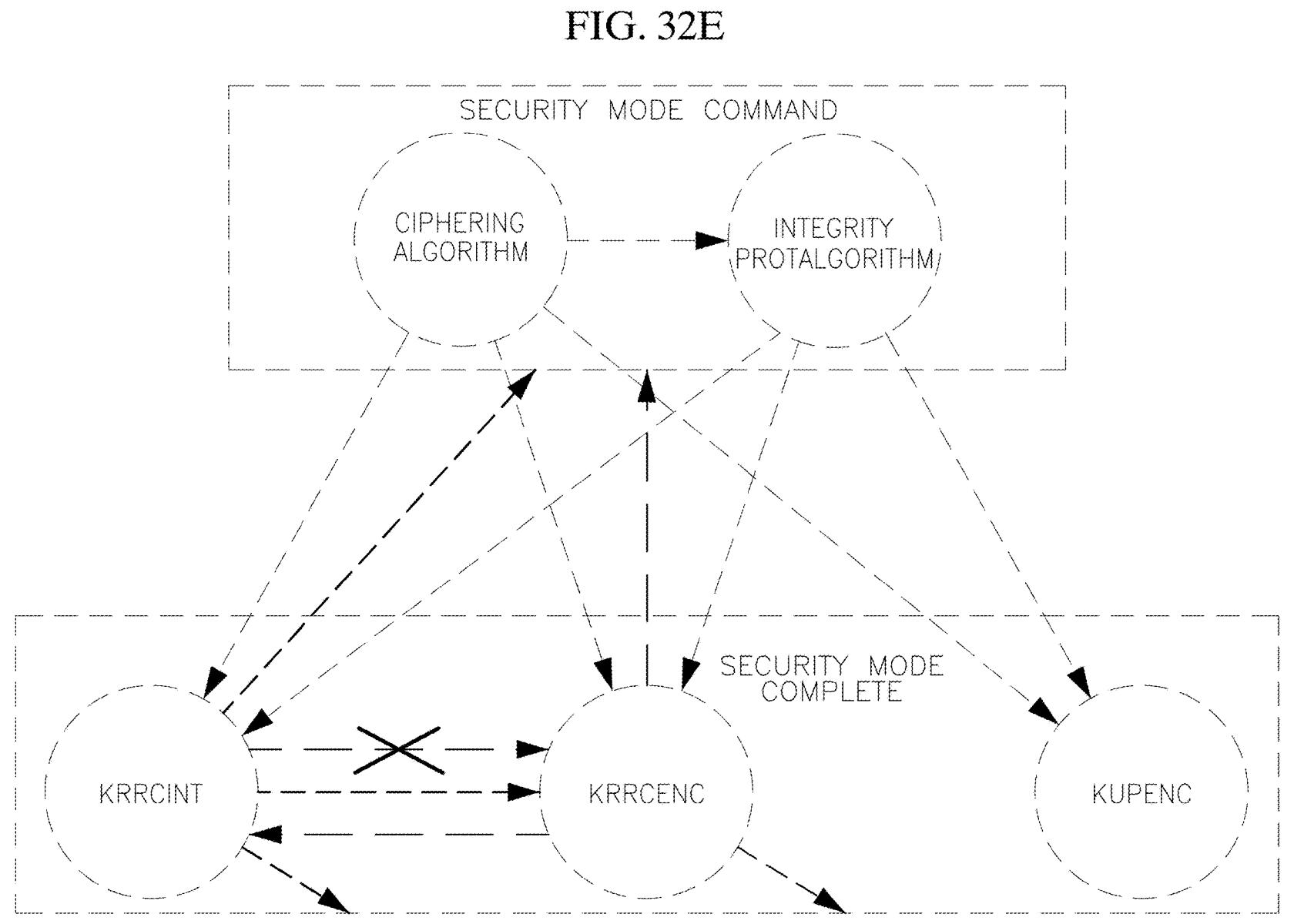

MESSAGE cl: rrcCONNECTIONSETUP: {
  rrc—TRANSACTIONIDENTIFIER 0,
  CRITICALEXTENSIONS cl: rrcCONNECTIONSETUP—r8: {
    RADIORESOURCECONFIGDEDICATED {
      srb—TOADDMODLIST {
        rlc—CONFIG EXPLICITVALUE: am: {
          ul—AM—RLC {
            t—POLLRETRANSMIT ms60,
            POLLPDU pINFINITY,
            POLLBYTE kBINFINITY,
            MAXRETxTHRESHOLD t32
          },
          dl—AM—RLC {
            t—REORDERING ms45,
            t—STATUSPROHIBIT ms0
          }
        },
        LOGICALCHANNELCONFIG DEFAULTVALUE: NULL
      },
```

FIG. 35

```
12  2023-11-30T22:03:05.888981  [USIM   ] [I] GENERATING AS KEYS. NAS UL COUNT 4
13  2023-11-30T22:03:05.888999  [RRC    ] [I] RRC ENCRYPTION KEY-k_rrc-enc
14  0000: 1d 97 eb 33 76 e0 0f a0 24 d1 ea 24 d1 ea 30 1a b8 5d 80
15  0010: f0 b0 23 cf dd ef d4 4f ef dd 6c c2 cc 06 c8 cb
16  2023-11-30T22:03:05.889000  [RRC    ] [I] RRC INTEGRITY KEY-k_rrc-int
17  0000: 38 e5 a1 9f 57 d0 91 85 53 0e 52 4e ff 8d 6f 8a
18  0010: 8b 23 76 da f7 57 62 d7 02 25 c6 c9 88 6c 67 da
19  2023-11-30T22:03:05.889001  [RRC    ] [I] UP ENCRYPTION KEY-k_UP-enc
20  0000: 05 1e b4 f0 f7 88 a1 dd 23 77 44 14 8b 99 67 7e
21  0010: 04 33 1a fa 65 fc b4 ad 24 ba cd ca b1 46 66 44
22  2023-11-30T22:03:05.889005  [RRC    ] [II] CHANGED SECURITY MODE COMMAND eea: 128-EEA1, eia
23  2023-11-30T22:03:05.889005  [USIM   ] [I] GENERATING AS KEYS. NAS UL COUNT 4
24  2023-11-30T22:03:05.889015  [RRC    ] [I] RRC ENCRYPTION KEY-k_rrc-enc
25  0000: 3a 05 ca 54 02 c5 35 a8 22 c5 f2 be e0 9f 7d e0
26  0010: b1 cb a8 0d e5 48 6e 8c b1 45 a0 ab a6 ce cf 48
27  2023-11-30T22:03:05.889016  [RRC    ] [I] RRC INTEGRITY KEY-k_rrc-int
28  0000: 38 e5 a1 9f 57 d0 91 85 53 0e 52 4e ff 8d 6f 8a
29  0010: 8b 23 76 da f7 57 62 d7 02 25 c6 c9 88 6c 67 da
30  2023-11-30T22:03:05.889016  [RRC    ] [I] UP ENCRYPTION KEY-k_up-enc
31  0000: 337 ae 90 9b 6b 43 6e 0d 5e d6 d5 93 72 c8 4c
```

SECURITY MODE COMMAND

INTEGRITY PROTALGORITHM

CIPHERING ALGORITHM

SECURITY MODE COMPLETE

KUPENC

KRRCENC

KRRCINT

LEGEND

CONFIDENTIALITY ————
INTEGRITY ————
AUTHENTICATION ————
ACCOUNTING ————
GENERATE
INCLUDE

| PROCEDURE | COMMAND | IDENTIFIER | CONFIDENTIALITY | INTEGRITY | AUTHNTIFICATION | ACCOUNTING |
|---|---|---|---|---|---|---|
| RRC CONNECTION SETUP | RRC CONNECTION REQUEST | UE-IDENTIFIER | N | N | N | N |
| | | ESTABLISHMENT CAUSE | N | N | N | N |
| | RRC CONNECTION SETUP | RADIORESOURCE-CONFIGDEDICATED | N | N | N | N |
| | RRC CONNECTION SETUP COMPLETE | RRC-TRANSACTION IDENTIFIER | N | N | N | N |
| | | SELECTEDPLMN-IDENTITY | N | N | N | N |
| | | DEDICATEDINFONAS | N | N | N | N |
| MUTUAL AUTHENTICATION | ATTACH REQUEST | IMSI | N | N | N | N |
| | | UE CAPACITY | N | N | N | N |
| | | KSIASME=7 | N | N | N | N |
| | AUTHENTICATION REQUEST | RAND | | N | N | N |
| | | AUTN$_{HSS}$ | N | RAND | SERVING NETWORK ID | SQN (SEQUENCE NUMBER) |
| | | KSIASME=1 | N | RAND | SERVING NETWORK ID | SQN (SEQUENCE NUMBER) |
| | AUTHENTICATION RESPONSE | RES | N | RAND | SERVING NETWORK ID | SQN (SEQUENCE NUMBER) |
| NAS SECURITY SETUP | NAS SECURITY MODE COMMAND | KSIASME=1 | N | RAND, NAS INTEGRITY | SERVING NETWORK ID | SQN (SEQUENCE NUMBER) |
| | | REPLAYED UE CAPABILITY | N | AS INTEGRITY PROTECED | N | N |
| | | NAS CIPHERING ALGORITHM=EEA1 | N | AS INTEGRITY PROTECED | N | N |
| | | NAS CIPHERING ALGORITHM=EIA1 | N | AS INTEGRITY PROTECED | N | N |
| | | MAS-MAC | N | AS INTEGRITY PROTECED | N | N |
| | NAS SECURITY MODE COMPLETE | NAS-MAC | N | AS INTEGRITY PROTECED | N | N |
| | | K$_{NASENC}$ | KSIASME=1, EEA, EIA, DISTINGUISHER | KSIASME=1, EEA, EIA, DISTINGUISHER | KSIASME=1 | N |
| | | K$_{NASINT}$ | KSIASME=1, EEA, EIA, DISTINGUISHER | KSIASME=1, EEA, EIA, DISTINGUISHER | KSIASME=1 | N |
| AS SECURITY SETUP | AS SECURITY MODE COMMAND | AS CIPHERING ALGORITHM=EEA1 | N | AS INTEGRITY PROTECED | N | N |
| | | AS INGRITY ALGORITHM=E1A1 | N | AS INTEGRITY PROTECED | N | N |
| | | MAC-1 | N | AS INTEGRITY PROTECED | N | N |
| | AS SECURITY MODE COMPLETE | MAC-1 | N | AS INTEGRITY PROTECED | N | N |
| | | K$_{eNB}$ | K$_{ASME}$,NAS UPLINK COUNT | Y | N | NAS UPLINK COUNT |
| | | K$_{PRCENC}$ | KSI$_{NB}$=1, EEA, EIA, DISTINGUISHER | KSI$_{NB}$=1, EEA, EIA, DISTINGUISHER | K$_{eNB\dagger}$ | N |
| | | K$_{PRCINT}$ | KSI$_{NB}$=1, EEA, EIA, DISTINGUISHER | KSI$_{NB}$=1, EEA, EIA, DISTINGUISHER | K$_{eNB\dagger}$ | N |
| | | K$_{UPENC}$ | KSI$_{NB}$=1, EEA, EIA, DISTINGUISHER | KSI$_{NB}$=1, EEA, EIA, DISTINGUISHER | K$_{eNB\dagger}$ | N |

SUMMARY OF FINDINGS

| ATTACK | VULNERABILITY | ASSUMPTION | NEW DISCOVERIES? | SOLUTION | GUIDANCE TO OTA EXPERIMENTS AND FUZZ TESTING |
|---|---|---|---|---|---|
| MODIFICATION OF RRC CONNECTION | MODIFIED COMMANDS WILL DISABLE THE RRC FUNTIONS | KNOWN C-RNTI OR TMSI | NO | INTEGRITY PROTECTION | FUZZ TESTING CAN START WITH DIFFERENT RRC STATUS. |
| DoS OR CUTTING OF DEVICE USING AUTHENTICATION REQUEST. | UE ACCEPTS AUTHENTICATION REQUEST WITHOUT INTEGRITY | NO | NO | • EC-AKA<br>• HASHED IMSI ONLY PREVENT CUTTING)<br>• HASHED IMSI WITH INTEGRITY CHECK | REPEAT AUTHENTICATION REQUEST COMMANDS CAN BE FUZZED AT RANDOM TIME TOTEST DoS AND CUTTING OF DEVICE ATTACK. |
| EXPOSING KNASENC AND KNASINT | ALL NAS INFORMATION WILL BE MONITORED, HIJACKED AND MODIFIED | KNOWN IMSI, MITM RELAY | NO | • ASYMMETRIC ENCRYPTION<br>• HASHED IMSI BASED ENCRYPTION | NAS FUZZ TESTING CAN START WITH KNOWN KNASENC AND KNASINT |
| EXPOSING KRRCENC, KRRCINT AND KUPENC | ALL RRC AND UP INFORMATION WILL BE MONITORED, HIJACKED AND MODIFIED | KNOWN IMSI, MITM RELAY | YES | • ASYMMETRIC ENCRYPTION<br>• HASHED IMSI BASED ENCRYPTION | RRC FUZZ TESTING CAN START WITH KNOWN KRRCENC AND KRRCINT, UP FUZZ TESTING CAN START WITH KNOWN KUPENC |

```
FROM: ENB
INFO: 192.168.10.10:9001, v2022-12-16
TIME: 20:18:18.576
INDEX: 412677
MESSAGE: RRC CONNECTION SETUP

DATA:

0000: 60 12 98 0b fd d2 04 fa 18 3e d5 e6 c2 59 90 cl    `......>...Y.
0010: a6 00 01 41 40 42 f7 80 01 18                      ...A@B.....

MESSAGE cl: rrcCONNETIONSETUP: {
rrc-TRANSACTIONIDENTIFIER 0,
CRITICALEXTENSIONS cl: rrcCONNECTIONSETUP-r8: {
RADIORESOURCECONFIGDEDICATED {
srb-TOADDMODLIST {
{
srb-IDENTITY 1,
rlc-CONFIG EXPLICITVALUE: AM: {
ul-AM-RLC {
t-POLLRETRANMIT ms60,
POLLPDU pINFINITY,
MAXRETXTHRESHOLD t32
};
dl-AM-RLC {
t-REORDERING ms45,
t-STATUSPROHIBIT ms0
}
};
LOGICALCHANNELCONFIG DEFAULTVALUE: NULL
```

FIG. 52

```
┌──────────────────────────────────────────────────────────────────────────────────┐
│  OPEN⌄ 🗗            ue.log [READ-ONLY]              SAVE ☰ ⊖ ▢ ⊗   │
│              MACC/MEDIA/JINGDA/MACC/5G_SECURITY/LOG                                 │
├──────────────────────────────────────────────────────────────────────────────────┤
```

298 2023-11-30T22:03:05.888850 [PHY1    ] [I] [4074] PDCCH: cc=0, f-1A, cce=8, L=0, riv=30, pid=1, mcs={1}, ndi={0}, tpc_pucch=0, snr=17.3 dB 299 2023-11-30T22:03:05.888925 [PHY1    ] [I] [4074] PDSCH: cc=0, rnti=0x1f4, nof_prb=3, nof_re=378, tbs={11}, mod={2}, rv={0}, crc={OK}, it=1.0, snr=17.3 dB 300 2023-11-30T22:03:05.888935 [MAC    ] [I] [4074] DL 1(TB 0): newTX tbs=11, rv=0, ack=OK, ndi=0

301 2023-11-30T22:03:05.888945 [MAC    ] [I] DL LCID=1 len=10

302 2023-11-30T22:03:05.888948 [RLC    ] [I] SRB1: Rx PDU — N BYTES 10

303 2023-11-30T22:03:05.888950 [RLC    ] [I] SRB1: Rx DATA PDU SN=1 (8B)

304    0000:01 30 00 20 cf bd 75 76

305 2023-11-30T22:03:05.888954 [RLC    ] [I] SRB1: STATUS PACKET REQUESTED THROUGH POLLING BIT 306 2023-11-30T22:03:05.888956 [RLC    ] [I] SRB1: Rx SDU (8 B)

307    000:01 30 00 20 cf bd 75 76

308 2023-11-30T22:03:05.888959 [PDCC    ] [I] SRB1: Rx PDU SN=1 (8 B, INTEGRETY=NONE, ENCRYPTION=NONE)

309    0000:01 30 00 20 cf bd 75 76

310 2023-11-30T22:03:05.888967 [RRC    ] [I] SRB1: Rx SECURITYMODECOMMAND (3 B)

311 2023-11-30T22:03:05.888979 [RRC    ] [I] RECEIVED SECURITY MODE COMMAND eea: EEA0, eia: 128-EIA2

312 2023-11-30T22:03:05.888981 [USIM    ] [I] GENERATING AS KEYS. NAS UL COUNT 4

313 2023-11-30T22:03:05.888999 [RRC    ] [I] RRC ENCRYPTION KEY-k_rrc_enc 314    0000: 1d 97 eb 33 76 e0 0f a0 24 d1 ea 30 1a b8 5d 80

315    0010: 1f0 b0 23 cf dd ef d4 4f ef dd 6c c2 cc 06 c8 cb 316 2023-11-30T22:03:05.889000 [RRC    ] [I] RRC INTEGRITY KEY —k_rrc_int 317    0000: 38 e5 a1 9f 57 d0 91 85 53 0e 52 4e ff 8d 6f 8a 318    0010: 8b 23 76 da f7 57 62 d7 02 25 c6 c9 88 6c 67 da 319 2023-11-30T22:03:05.889001 [RRC    ] [I] UP ENCRYPTION KEY —k_up_enc 320    0000: 05 1e b4 f0 f7 88 a1 dd 23 77 44 14 8b 99 67 7e 321    0010: 04 33 1a fa 65 fc b4 ad 24 ba cd ca b1 46 66 44

322 2023-11-30T22:03:05.889005 [RRC    ] [I] CHANGED SECURITY MODE COMMAND eea: 128-EEA1, eia: 128-EIA2

323 2023-11-30T22:03:05.889005 [USIM    ] [I] GENERATING AS KEYS. NAS UL COUNT 4

324 2023-11-30T22:03:05.889015 [RRC    ] [I] RRC ENCRYPTION KEY —k_rrc_enc 325    0000: 3a 05 ca 54 02 c5 35 a8 22 c5 f2 be e0 9f 7d e0

326    0010: b1 cb a8 0d e5 48 6e 8c b1 45 a0 ab a6 ce cf 48

327 2023-11-30T22:03:05.889016 [RRC    ] [I] RRC INTEGRITY KEY —k_rrc_int 328    0000: 38 e5 a1 9f 57 d0 91 85 53 0e 52 4e ff 8d 6f 8a 329    0010: 8b 23 76 da f7 57 62 d7 02 25 c6 c9 88 6c 67 da 330 2023-11-30T22:03:05.889016 [RRC    ] [I] UP ENCRYPTION KEY —k_up_enc 331    0000: 37 ae 90 8b 6b 43 6e 0d 5e d6 d5 93 72 f7 c8 4c 332    0010: f4 b4 dc bd c9 f0 a4 6f 5e 78 27 44 91 0a 6b 79

333 2023-11-30T22:03:05.889019 [PDCP    ] [I] CONFIGURING SECURITY WITH 128-EIA2 AND 128-EEA1

334 2023-11-30T22:03:05.889026 [RRC    ] [I] SRB1 - Tx SECURITYMODECOMPLETE (2 B)

335 2023-11-30T22:03:05.889033 [PDCP    ] [I] Tx SRB1 PDU SN=2, INTEGRETY=tx/rx, ENCRYPTION=NONE)

336    0000: 02 28 00 2a b1 b5 14

337 2023-11-30T22:03:05.889036 [RLC    ] [I] SRB1 PDU (7 B, PDCP_SN=2 tx_sdu_queue_len=1)

338    0000: 02 28 00 2a b1 b5 14

339 2023-11-30T22:03:05.889229 [PHY1    ] [I] [4074] PUCCH: cc=0, tti_tx=4078, rnti=0x1f4, f=1a, n_pucch=19, ack=1

340 2023-11-30T22:03:05.889785 [MAC    ] [I] [4075] SR: SIGNALLING PHY sr_counter=1

341 2023-11-30T22:03:05.890907 [PHY1    ] [I] [4076] PUCCH: cc=0, tti_tx=4080, SHORTENED, rnti=0x1f4, f=1, n_pucch=0, sr=yes Smile NET-ML MODEL (AUC=0.9699)
Smile NET-ML HIDDEN (AUC=0.9699)
CNN MODEL (ACU=0.9595)
LSTM MODEL (ACU=0.9612)
GRU MODEL (AUC=0.9566)
RANDOM GUESSING

FALSE POSITIVE RATE

TRUE POSITIVE RATE

```
2000-09-12T09:15:33.123161 [MAC-NR] [I] [256] Rx PDU: rnti
2000-09-12T09:15:33.123165 [RLC-NR] [I] SRB1: Rx PDU- Nbyt
2000-09-12T09:15:33.123170 [RLC-NR] [I] RX STATUS PDU: ACK_S
2000-09-12T09:15:33.123176 [RLC-NR] [I] SRB1: Rx PDU- Nbyt
2000-09-12T09:15:33.123178 [RLC-NR] [I] SRB1: Rx DATA PDU SN
        0000: c0 03 00 03 28 00 df 9f 47 23
2000-09-12T09:15:33.123179 [RLC-NR] [I] SRB1: STATUS PACKET
2000-09-12T09:15:33.123183 [PDCP-NR] [I] RX SRB1 PDU (8B), i
        0000: 00 03 28 00 df 9f 47 23
2000-09-12T09:15:33.123189 [PHY0-NR] [I] [256] PDCCH: cc=0
tti_tx=260
2000-09-12T09:15:33.123193 [RRC-NR] [I] rnti=0x4601, SRB1-
        0000: 28 00
2000-09-12T09:15:33.123198 [RRC-NR] [I] SECURITYMODECOMPLETE
2000-09-12T09:15:33.123200 [PDCC-NR] [I] CONFIGURING SECURITY
2000-09-12T09:15:33.123201 [RRC-NR] [I] rnti=0x4601, SRB1-
        0000: 30 02 01 20 01 00 08 00
2000-09-12T09:15:33.123204 [PDCC-NR] [I] TX SRB1 SDU (8B), ir
        0000: 30 02 01 20 01 00 08 00
2000-09-12T09:15:33.123208 [PDCC-NR] [I] TX SRB1 PDU (14B),
        0000: 00 03 30 02 01 20 01 00 08 00 93 f4 79 12
2000-09-12T09:15:33.123222 [RLC-NR] [I] SRB1: Tx SDU (14B,
        0000: 00 03 30 02 01 20 01 00 08 00 93 f4 79 12
2000-09-12T09:15:33.123224 [PHY0-NR] [I] [256] PDSCH: cc=0
2000-09-12T09:15:33.123363 [MAC-NR] [I] [257] SCHED: DL tx
2000-09-12T09:15:33.123366 [MAC-NR] [I] [257] SCHED: UL tx
2000-09-12T09:15:33.123371 [RLC-NR] [I] SRB1: GENERATING STA
2000-09-12T09:15:33.123375 [RLC-NR] [I] TX STATUS PDU-ACK_
2000-09-12T09:15:33.123382 [RLC-NR] [I] SRB1: STARTED t-POLL
2000-09-12T09:15:33.123385 [RLC-NR] [I] SRB1: [DATA PDU, P=1
2000-09-12T09:15:33.123388 [RLC-NR] [I] SRB1: NO DATA AVAILABLE
2000-09-12T09:15:33.123391 [MAC-NR] [I] [257] 0x4601 DL L
2000-09-12T09:15:33.123478 [PHY1-NR] [I] [257] PDCCH: cc=0
```

RECEIVER OPERATING CHARACTERISTIC (GRU)

LENGTH=50% (AUC=0.96)
LENGTH=20% (AUC=0.94)
LENGTH=10% (AUC=0.89)
LENGTH=5% (AUC=0.83)
LENGTH=4% (AUC=0.79)
LENGTH=3% (AUC=0.78)
LENGTH=2% (AUC=0.72)
LENGTH=1% (AUC=0.76)

FALSE POSITIVE RATE

TRUE POSITIVE RATE

RECEIVER OPERATING CHARACTERISTIC (CNN)

LENGTH=50% (AUC=0.97)
LENGTH=20% (AUC=0.97)
LENGTH=10% (AUC=0.95)
LENGTH=5% (AUC=0.93)
LENGTH=4% (AUC=0.93)
LENGTH=3% (AUC=0.93)
LENGTH=2% (AUC=0.93)
LENGTH=1% (AUC=0.89)

FALSE POSITIVE RATE

TRUE POSITIVE RATE

RECEIVER OPERATING CHARACTERISTIC (LSTM)

LENGTH=50% (AUC=0.96)
LENGTH=20% (AUC=0.95)
LENGTH=10% (AUC=0.94)
LENGTH=5% (AUC=0.90)
LENGTH=4% (AUC=0.84)
LENGTH=3% (AUC=0.86)
LENGTH=2% (AUC=0.84)
LENGTH=1% (AUC=0.82)

FALSE POSITIVE RATE

TRUE POSITIVE RATE

RECEIVER OPERATING CHARACTERISTIC (RNN)

TRUE POSITIVE RATE

FALSE POSITIVE RATE

LENGTH=50% (AUC=0.96)
LENGTH=20% (AUC=0.88)
LENGTH=10% (AUC=0.88)
LENGTH=5% (AUC=0.77)
LENGTH=4% (AUC=0.78)
LENGTH=3% (AUC=0.73)
LENGTH=2% (AUC=0.69)
LENGTH=1% (AUC=0.67)

AMPLIFICATION OF FORMAL METHOD AND FUZZ TESTING TO ENABLE SCALABLE ASSURANCE FOR COMMUNICATION SYSTEM

CROSS-REFERENCE TO RELATED APPLICATION

This application claims the benefit of and priority to U.S. Provisional Patent Application Ser. No. 63/457,557 filed Apr. 6, 2023, the entire disclosure of which is incorporated herein by reference.

STATEMENT REGARDING FEDERALLY SPONSORED RESEARCH

This invention was made with government support under Grant No. D22AP00144 awarded by the Department of Defense (DoD) and DARPA. The U.S. government has certain rights in the invention.

FIELD OF THE INVENTION

The present invention relates to a broad range of systems that require the reliability of communications, and, more specifically, to the automatic assurance for large scale computing and information systems.

BACKGROUND OF THE INVENTION

Existing machine learning-based vulnerability detection in 5G lacks transparency and adds uncertainty. Formal based detection is limited in scalability and lacks a synthesized knowledge of unintended emergent behaviors and causal chain effects.

The adoption of open-source stacks and distributed access systems are of rapidly increasing importance to the research infrastructure and offer unprecedented interdisciplinary benefits. However, the openness in resources and technologies also presents an attack surface of unprecedented size due to the in-transparency and complexity of design specification and stack implementations. Discovering and mitigating vulnerabilities and unintended emergent behaviors in a specific research project requires combinations of automated reasoning techniques in design and allowing testing techniques in implementation stacks. Enabling the solution at the infrastructure level can benefit research projects, while an agile approach could be taken to tailor the solution to fit the specific research area.

5G of wireless technology represents a complete transformation of telecommunication networks supporting massive amounts of devices connected through 5G and empowers a vast array of new and enhanced critical infrastructure services. Motivated by general trends such as network deperimetrization and 5G systems' strong dependency on software define networking and virtualization, 5G broke down the multidomain orchestration process into the main functions relevant to a multi-provider multi-domain environment of discovery, bilateral negotiation, provisioning and assurance stages with their corresponding multi-domain reference points. Verticals in 5G and next generation infrastructure create a diverse and intricate environment including software, hardware, configurations, instruments, data, users, and various stakeholders. With system complexity and its lack of security emphasis by domain scientists, the formed ecosystem requires a comprehensive evaluation and validation for improved research and transitional CI security postures.

State-of-the-art security research in large-scale 5G challenges has primarily focused on either specific system aspects/partitions or particular applications. However, the lack of systematic implementations with adaptive strategies and/or assessment of the security risks in both 5G specifications and implementations can prevent an attack surface to potential threats.

Detecting unintended emergent behavior in the software stacks requires strenuous effort because most of them fall into the stochastic domain, unlike deterministic behaviors that can be detected via formal methods. In the 5G-OPS application, the adopted Open Radio Access Network (O-RAN) characterized by machine learning algorithms adds significant performance improvement but introduces more uncertainty and less transparency to 5G communications. This uncertainty poses a significant challenge to traditional vulnerability detection methods, as they may not be able to effectively identify vulnerabilities arising from unexpected inputs or behaviors resulting from machine learning algorithms. Therefore, an efficient, systematic, and comprehensive vulnerability and unintended emergent behaviors detection scheme is essential to ensure the security and robustness of critical infrastructures.

Among vulnerability detection approaches, formal methods and fuzz testing has been to be efficient applying in crucial components of a system or critical infrastructure, especially in communication protocol vulnerability detection. Some registration and access control protocols, including Authentication and Key Agreement (AKA), Radio Resource Control (RRC), etc. have been applied formal methods in various frameworks. Particularly, in 5G protocols based on the 5G security design, necessary lemmas are verified, including helping lemmas, sanity-check lemmas, and the lemmas that check the relevant security properties against the 5G protocols. Several existing formal analysis frameworks include Tamarin, LTE inspector and 5G reasoner that can determine precisely which security guarantees are met in 5G protocols by applying formal methods and automated verification in the symbolic model.

Previously, a protocol-based fuzz testing protocol was presented to generate fuzz testing cases with all possible identifiers and provided a comprehensive understanding of how the reaction to different protocol-based attacks worked. Another past approach is mutation-based fuzz testing, which can generate extreme cases, like buffer overflow or incorrect format. Combining the advantages of protocol and mutation, a rule-based fuzzer was proposed, which can cover all protocol-based cases and part of extreme cases. Yet another past approach involved a state transaction method to analyze serial attacks, which can be achieved by modifying different messages in different states. These approaches significantly augmented the complexity and diversity of attacks; however, pre-assumptions of prior knowledge awareness and focusing on the specific implementation of the targeted protocols limits their applications. Successful tokenized-based general-purpose fuzzers (GPF), for example, LZfuzz, eliminate the requirements for access to well-documented protocols and implementations, while focusing on plain-text fuzzing. Additionally, the non-selective traverse type of fuzzing relies on massive computation resources.

Researchers and scientists in critical infrastructures (key assets that are essential for the functioning of a society and economy, e.g., Public Health, Information and Telecommunications, Energy, Transportation, etc.) are highly dependent on software applications, systems, and platforms as functionality in all aspects of research, collaboration, and technology transition and operation are increasingly implemented through software. In spite of the constant evolution of security mechanisms and safeguards that were introduced in compilers, operating systems, development environments, and the effectiveness in the context of vulnerability discovery, current state-of-the-art vulnerability detection approaches are limited by an inherent trade-off between accuracy and scalability, especially with a distributed system that relies on communication protocols to perform critical functionalities.

In to benefiting from an efficient testbed, many studies have proposed research on 5G protocol vulnerability detection and the extension to a critical area application. For instance, 3GPP TS 33.501a described how a significant number of pre-authentication messages are sent in an unencrypted format, which can be exploited to launch DoS attacks and obtain sensitive information, such as the location of mobile subscribers in 5G/LTE. In one study, the weakest links and channels vulnerable to sniffing and spoofing were identified in the 5G NR framework. Another proposal involved a property-directed approach for qualitative and quantifiable analysis. Innovative strategies such as a grammar-based fuzzing approach with a Markov chain model have recently been proposed to generate high-risk fuzzing inputs. Similarly, other stateful transition models have been introduced to efficiently locate vulnerabilities. In an effort to further refine the fuzzing scope, formal verification has been incorporated into fuzzing strategies as demonstrated by HyPFuzz. Capitalizing on advancements in deep learning technologies, Rainfuzz employs reinforcement learning to generate a heatmap, facilitating an estimation of risk associated with varying permutations of fuzzing cases. Additionally, Natural Language Processing (NLP) has been introduced to analyze vulnerabilities directly from the source code. In a bid to enhance vulnerability assessment, the development of security metrics and dependent fields offers a more comprehensive visualization of vulnerability evaluation. These developments continue to contribute to the effectiveness and efficiency of vulnerability detection and risk assessment. Despite the substantial contributions to protocol-based vulnerability detection, a comprehensive and systematic approach for detecting vulnerabilities and unintended emergent behaviors in the entire protocol, considering varying perspectives on prior knowledge and fuzzing levels, remains unaddressed.

Among vulnerability detection approaches, fuzz testing has been extensively used in large-scale 5G and beyond systems for cybersecurity purposes. Nevertheless, the major challenge in this area remains computational complexity, which tends to increase exponentially with the size of the protocol complexity.

Fuzz testing and formal methods are both effective approaches for vulnerability detection. Due to the increased intractability and complexity, as well as the distributing trending in modern systems, it is best practice to perform comprehensive vulnerability detection and testing to provide the assurance level required. Especially for critical infrastructure with safety concerns, undetected vulnerability and unintended emergent behavior could be disastrous. As a stochastic analysis method widely used in zero-day vulnerability detection, fuzz testing strategically selects invalid, unexpected, and random data as inputs for system testing. It detects system faults by examining if the outputs fall into the invalid space. In contrast, a static approach, like a formal method, uses mathematical proof to complement system testing to ensure correct behavior. Formal methods are more applicable for protocol analysis, although it could be applied to code stack with extensive computing resources, and fuzz testing requires being conducted on software implementation stacks. To date, both approaches need to be improved in large-scale systems and require significant input of human expertise, labor resources, and computation powers. Compared to commercial products, the scalability challenges when applying formal and fuzz testing to research facilities are more prudent due to limited resources and generally openness natures in research projects.

A digital twin allows systems' analysis, design, optimization, and evolution to take place fully digitally or in conjunction with a cyber-physical system. Digital twin concepts have been used in cybersecurity and risk management in communication systems. One existing proposal involved a systematic concept of digital twins application to develop and deploy the complex 5G environment and risk prevention system. Further, an Artificial Intelligence (AI) cloud modeling system to lower the risk of developing innovative technologies on the existing system was also previously developed. Combined with traditional fuzzing approaches, network digital twins provide comprehensive feasibility proof and evaluation for development and deployment on the physical system. Besides the design and development of software, digital twins technology can also formulate a specific and efficient standard for security training. Though various digital twin applications exist in manufacturing and research, the exponential increase in data volume and volatile environment poses numerous challenges for digital twin technology in physical systems. For example, providing scalable cybersecurity assurance through simulating and identifying unintended emergent behaviors still remains challenging. As a result, the digital twin is merely descriptive rather than actionable when applied in critical infrastructures.

5G New Radio (NR) has promised a multi-dimensional improvement to provide Ultra-Reliable Low Latency Communications (URLLC), by enhancing Mobile Broad-band (eMBB) and massive Machine Type Communications (mMTC) at various verticals. However, softwarization, virtualization, and open programmable requirements in 5G and NextG systems require rigorous testing against vulnerabilities, especially for applications in critical infrastructures and networks.

In existing large-size codebases for both open source and commercially available software stacks, the state-of-the-art security research focuses on either specific aspects, partitions of a system, or particular types of applications, lacking a systematic assessment of the security risks. In addition, general system engineering approaches (i.e., system dynamics and agent-based modeling) are insufficient to describe both the qualitative and quantifiable aspects of security features. More importantly, working with physical objects for comprehensive cyber-security assessments, especially over critical infrastructures, could be expensive and time-consuming In recent years, the digital twin has emerged as a disruptive concept that offers an efficient solution to the above challenges. A digital twin allows systems analysis, design, optimization, and evolution to take place fully digitally or in conjunction with a cyber-physical system. Compared to traditional engineering approaches, digital twin solutions enhance speed, accuracy, and efficiency. The application of the digital twin ranges from the well-defined low-flow device control communication such as industry 4.0 to more digital twin applications on large volumes of data flowing fields like Augmented Reality (AR).

Though various digital twin applications exist in manufacturing and research, the exponential increase in data volume and volatile environment poses numerous challenges for digital twin technology in physical systems. For example, providing scalable cybersecurity assurance through simulating and identifying unintended emergent behaviors in 5G by digital twins remains challenging. As a result, the digital twin is merely descriptive rather than actionable when applied in 5G and cybersecurity fields.

Detecting unintended emergent behavior in the 5G software stacks requires strenuous efforts because most of them fall into the stochastic domain, unlike deterministic behaviors that can be detected via formal methods. In particular, the recently adopted Open Radio Access Network (O-RAN) characterized by machine learning algorithms introduces even more uncertainty and less transparency to 5G communications. Therefore, an efficient, systematic, and comprehensive vulnerability and unintended emergent behaviors detection scheme is essential to ensure the security and robustness of 5G systems.

The states of commands in wireless connections can primarily be divided into three zones: valid and legal states (green zone), illegal and invalid states (red zone), and not illegal and not valid states (yellow zone), as illustrated in FIG. 12. 'Legal' indicates whether a command can pass the integrity check, while 'valid' refers to whether the command can function as intended. For example, states in the not illegal and not valid zone are those that do not trigger the defense mechanism but can introduce potential threats. Compared to intended attacks, which are defined in the protocol and located in the red zone, unintended vulnerabilities are more challenging to detect in 5G wireless communication.

The third-generation partnership project (3GPP) published its Release 17 (Rel-17) specifications at the end of the first quarter of 2022. Since then, parallel and subsequent releases have been rolled out to enhance and address new and unfulfilled requirements from previous releases. It ensures ongoing innovation and improvement in mobile communication technologies, aligning with the evolving needs and advancements in the field. 3GPP protocols include a multitude of technical specifications and documents that cover various aspects of mobile communication networks, including radio access, core network, and service capabilities. Encompassing a wide array of technical specifications, 3GPP protocols are extensive, with documents like the Radio Resource Control (RRC) in Release 17 spanning over a thousand pages. The extensive nature of these documents, coupled with their distributed security protocols, renders manual verification and testing both time-intensive and susceptible to error. This complexity escalates in future network generations, exacerbating the risk of zero-day vulnerabilities.

Furthermore, the incorporation of O-RAN and network function virtualization introduces additional layers of complexity and potential attack vectors through cloud APIs into 5G and future G infrastructure. These advancements offer enhanced functionality but expose operators to novel security challenges, especially in the relatively uncharted territory of cloud security. This complexity, compounded by the involvement of various entities in development, heightens the risk of security breaches, particularly through misconfigured containers and exposed APIs. Thus, in 5G and future G systems and networks, logical attacks exploiting protocol logic errors represent a significant vulnerability category.

These attacks are challenging to detect due to the scale and complexity of the network systems. Formal verification encompasses a broad range of techniques used to prove or disprove the correctness of algorithms, protocols, systems, or software with respect to certain formal specifications. It also involves mathematical analysis to ensure that a system behaves as intended. Utilizing the Dolev-Yao (DY) formal attack model, one of the widely adopted methodologies, formal verification has demonstrated its effectiveness in identifying flaws in infrastructure and communication protocols. However, this approach is limited to abstract specifications.

With the recent advancements in Large Language Models (LLMs), in order to contribute to accelerating the design and verification of large-scale protocols, and to be effectively integrated with system validation processes that involve existing implementations two conditions should be met: clarifying ambiguities and capturing design intentions. The first condition involves resolving the conflict between the ambiguity inherent in natural language processing and the need for explicitness in formal verification modeling. Resolving this conflict is essential to demonstrate the potential to provide measurable and verifiable trustworthiness. The second condition requires differentiating intentional relationships or dependencies from unintentional ones identified by LLMs in targeting protocol designs. The differentiation is crucial in transforming the design-intended relationships into mathematical and logical expressions in formal verification.

In the past several months, both academic and industry sectors have increasingly focused on applying LLMs in the realm of formal verification. Two major areas of this application are using prompt engineering and LLMs for hardware assertion and software system Bounded Model Checking (BMC). It is believed that using LLMs in verifying communication-related protocols and specifications has not been done previously, especially for the large and complex protocols of 3GPP releases. One of the reasons is due to a common challenge in existing research is capturing trustworthy design intent in a set of assertions for use in formal verification or testing-based checking. This challenge intensifies as system distribution and complexity increase in the case of 5G and the future G, particularly when intertwined with a broad spectrum of various usage scenarios and verticals. The iterative prompts to the LLMs have limitations due to the complex and broad dependencies among identifiers, commands, and properties.

Furthermore, previous work on a non-LLM-based NLP approach for 5G and other communication protocols marked a significant shift from manual to automated, accuracy-focused analysis in translating natural language-oriented protocols into formal models. While it revealed challenges in handling complex semantic relationships with strong contextual control, it also highlighted the potential and direction for LLM-based NLP in formal modeling.

Verticals in 5G and next-generation infrastructure create a diverse and intricate environment including software, hardware, configurations, instruments, data, users, and various stakeholders. With the complexity of the system and the lack of security emphasis by domain scientists, the formed ecosystem requires a comprehensive security evaluation and in-depth solution validation to improving transitional Critical Infrastructure security posture.

Formal verification serves as an effective method for offering rigorous mathematical proofs of security, and it has been advanced to detect various vulnerabilities and unintended emergent behaviors within the 5G network. Such verification provides a high-level protocol conceptualization, accompanied by logical proof of both security and vulnerabilities.

There has also been significant research progress using Natural Language Processing (NLP) in parsing and analyzing the protocols. In addition to the requirement to further improve the accuracy, it also depends on a streamlined formal process of utilizing the dependency relationships detected to construct the formal analysis.

SUMMARY OF THE INVENTION

The present invention creates a scalable solution for security assurance and resilience at both infrastructure and domain levels by discovering and mitigating vulnerabilities and unintended emergent behaviors in system design and implementations with sufficient automation, scalability, and usability. The methodology and outcome are demonstrated in pilot scientific projects of the fifth generation (5G) open programmable software defined platform for vulnerability and unintended emergent behaviors detection. Leveraging the domain knowledge in target research fields, an heuristic approach can be taken between static formal analysis and stochastic fuzz testing analysis to promote their interaction and amplification and provide the assurance of system design and protocol to implementation stacks.

To address the challenges of the prior knowledge requirements and computation complexity, a multiple dimension multi-layer protocol-independent fuzzing framework was invented, which is combined with machine learning algorithms aiming for protocol vulnerabilities detection and unintended emergent behaviors in fast-evolving 5G and NextG specifications and large-scale open programmable 5G stacks.

The present invention constitutes the first systematic solution for 5G stack end-to-end assurance by identifying the high-risk area, detecting vulnerabilities within the abstracted assumptions of formal reasoning, automatically assessing the unintended behaviors in the out-of-assumption domain and achieving scalability by associating the fuzzing results with vulnerabilities. The present invention marks the first time an effective formal and fuzz combined solution is achieved, through triggering the formal models and fuzz testing case sets to amplify the effects of the two methods to discover and mitigate vulnerabilities in scale. The outcome of this invention is the amplified and interactive formal methods and fuzz testing and the quantitative estimation of computation complexity.

The amplification of the formal method and fuzz testing in accordance with an embodiment of the present invention provides an innovative approach for scalable system vulnerability detecting. It also allows for a more sensitive unintended emergent behaviors detection and assessment by leveraging amplification and other methods. Furthermore, the assumption-divided formal approach sets the size of the formal model searching space and divides the space into potential attack trace, attack derivative, and clean area. Based on the results, fuzz testing is performed and further extended to an out-of-assumption space search. Data collected in the in-space is used for classification model training. The trained model is used to identify high-risk out-assumption regions to trigger the next round of formal models or eventually forfeit the design assumptions.

Traditional cybersecurity focuses on detection of and defending from potential attacks (red team/blue team) in an IP network. A broader view for CI is presently proposed for system-level vulnerability detection and migration to enhance resilience at both the infrastructure and specific research domains. The vulnerability could be root caused by malicious attack; it could also be caused by unintended emergent behaviors in large scale complex systems and when integrating with other systems. Both the vulnerability and unintended emergent behaviors are serious threats for critical systems in the research or prototyping stages and in transition to real-life ecosystems. Further, the detection of the hidden vulnerabilities are more challenging as the systems become more distributed and complex. The discovering and mitigating of vulnerabilities and unintended emergent behaviors from system design to implementations are performed with sufficient automation, scalability, and usability. The presently proposed method offers cyber research innovations tailored for transition research targeting on scientific workflow integrity, scientific data sharing, usable security, program analysis, fuzzing, penetration testing, and hardening existing systems and components.

The present invention focuses on fundamental research for inductive causal inference, deductive formal reasoning models, and unintended emergent behavior assessment for 5G extant codebases. When implemented, the deliverable can assure security for large-scale public safety infrastructures, private networks, and national carriers. Moreover, it could accelerate the Future G releases by systematic vulnerability and unintended emergent behavior detection in protocols design and stacks implementation.

The proposed approach is demonstrated on three selected pilot scientific projects: the fifth generation (5G) open, programmable software-define platform (5G-OPS), outdoor multi-agent robotic navigation system using Clearpath Jackal unmanned ground vehicle (UGV), and indoor drone control research Vicon system (VS) for vulnerability and unintended emergent behaviors detection. The diversity and coverage of the three platforms will empower the advanced technology transition-driven fundamental research in amplified formal and fuzz testing approaches. And the digital twin will be verified by the different perspectives in these three platforms on a larger scale to facilitate general critical infrastructures supporting research and technology transitions in critical infrastructure. The novelty of the proposed construction of a light weighted and flexible digital twin cyber platform is represented by its capacity for potential or actual attacks in the research system performing on the Critical Infrastructure (CI) in addition to its description, from the micro-atomic to the macro geometrical level. Besides, the vulnerability detection strategies could be validated and evolved on the proposed digital twin platform based on the metrics of accuracy and efficiency.

A 5G cybersecurity digital twin (CDT) platform of systematic and scalable vulnerability detection for 5G specifications and implementations with adaptive strategies was developed. Based on the awareness of prior knowledge and accessibility of physical objects, fuzzing strategies including "Listen-and-Learn" (LAL), "Sync-and-Learn (SyAL), and 'Source-and-Learn' (SoAL), which are analogous to black-box, grey-box and white-box models, respectively, were used.

The prior knowledge required by attackers can be considered as the cost of the attack and the impacts or risks to the target network can be considered as the gain. Counting on the cost and gain for attacks being performed in unexpected scenarios, it is desirable to build a systematic solution that adapts to scenarios and detects vulnerabilities and their impacts. Prior knowledge, in this context, refers to any information that an attacker possesses about a system or element before attempting to exploit vulnerabilities. This information includes protocols, synchronization information, zero-day exploits, or any other relevant information that can be used to exploit potential vulnerabilities. Furthermore, the developed digital twin framework connects to an experimental platform to enable systematic and accumulative vulnerability detection for 5G and NextG protocols through fuzz testing. The RRC protocols and implementations on srsRAN are adapted to serve as digital twin proof-of-concept of the designed system, and a relay model acts as an attacker.

Unlike existing works targeting command level or bit-level fuzzing, the proposed digital twin architecture incorporates both fuzzing dimensions. Correspondingly, the designed digital twin framework provides sufficient automation, scalability, and usability to improve 5G security assurance and enable real-time system vulnerability detection and prediction. Extensive simulation results demonstrated that: 1) LAL strategy detects 129 vulnerabilities with 39 command types, and in particular, the LSTM model efficiently predicts more than 80% connection failure in 0.072 seconds on average; 2) SyAL strategy outperforms traditional fuzzing models and the time cost of detecting vulnerabilities reduces to half; 3) the bit-level SoAL method detects three kinds of man-in-the-middle (MITM) vulnerabilities and validates the integrity of 5G protocols.

Specifically, a digital twin framework is developed enabling systematic and scalable vulnerability detection for 5G and nextG protocols through fuzz testing. By feeding invalid and unexpected inputs and data into network traffic and software stack implementation, fuzz testing is a superb solution for discovering and detecting vulnerabilities, including implementation errors and security vulnerabilities. Unlike existing works targeting command-level or bit-level fuzzing only, the designed digital twin architecture incorporates both fuzzing dimensions. Besides, based on the awareness of prior knowledge and accessibility of physical objects, fuzzing strategies including 'Listen-and-Learn (LAL)', 'Sync-and-Learn (SyAL)' and 'Source-and-Learn (SoAL)', which are analogous to black-box, grey-box, and white-box models, can be employed. The Radio Resource Control (RRC) protocols and implementations on srsRAN are adopted to serve as digital twin proof of concept of the designed system, and a relay model is proposed for digital twins of an attacker.

The virtualization and softwarization of 5G and NextG are enablers of the shift to flexibility, but they also present a potential attack surface for threats. However, current security research in communication systems focuses on specific aspects of security challenges and lacks a holistic perspective. To address this challenge, the novel systematic fuzzing approach is proposed to reveal, detect, and predict vulnerabilities with and without prior knowledge assumptions from attackers. It also serves as a digital twin platform for system testing and defense simulation. pipeline. To this end, the three fuzzing strategies have been proposed.

The LAL strategy is a black-box fuzzing strategy used to discover vulnerabilities without prior protocol knowledge, while the SyAL strategy, also a black-box fuzzing method, targets vulnerabilities more accurately with attacker-accessible user information and a novel probability-based fuzzing approach.

The white-box fuzzing strategy, SoAL, is then employed to identify and explain vulnerabilities through fuzzing of significant bits. Using the srsRAN 5G platform, the LAL strategy identifies 129 RRC connection vulnerabilities with an average detection duration of 0.072 s.

Leveraging the probability-based fuzzing algorithm, the SyAL strategy outperforms existing models in precision and recall, using significantly fewer fuzzing cases. SoAL detects three man-in-the-middle vulnerabilities stemming from 5G protocol vulnerabilities. The proposed solution is scalable to other open-source and commercial 5G platforms and protocols beyond RRC. Results have demonstrated that the proposed solution is an effective and efficient approach to validate 5G security; meanwhile, it serves as real-time vulnerability detection and proactive defense.

In particular, the proposed LAL command-level strategy assumes no prior knowledge of protocols nor access to code stacks. The protocol-independent characteristic of it enables an automatic verification for 5G and nextG protocols and large-scale open programmable stacks release. Then by leveraging some prior and domain knowledge, a more strategic grey-box approach, SyAL command-level fuzzing, is formed to achieve higher efficiency and accuracy in detecting vulnerabilities. In scenarios with access to the source code, the designed SoAL bit-level fuzzing works as a white-box strategy to perform a more sophisticated approach on the identified high-risk commands via LAL and SyAL. The proposed fuzzing system offers sufficient automation and efficiency that could serve as a feasible approach to validate security for 5G protocols and implementations. It also enables real-time system vulnerability detection and proactive defense.

Four main research thrusts are included in the present invention. Thrust 1 involves establishing a framework for abstracting the key information, including assumptions and properties from the two pilot research fields (i.e., Domain Modeling and Protocol Abstraction) This thrust aims to focus on the automation and scalable domain modeling and protocol abstraction.

Thrust 2 focuses on a pick-and-choose strategy between State-Based Fuzz Testing for System Implementation and Assumption-Define Formal Automation in System Design (i.e., State-Based Fuzz Testing for System Implementation and Assumption-DefineD Formal Automation in System Design).

Thrust 3 progresses to a unifying approach with interaction and amplification between Formal Method and Fuzz Testing (i.e., Interaction and Amplification between Formal Method and Fuzz Testing).

Given the foundation of Thrust 1 to Thrust 3, Thrust 4 develops a scalable digital twin framework of domain-driven and user-centered risk detection and mitigation (i.e., Domain-Driven and User-Centered Risk Detection and Mitigation).

The four thrusts are embodied in the following: (1) an automatic framework for the research pilot system key information abstraction to initialize the vulnerability detection, (2) a micro-level vulnerability detection system including formal models, fuzz testing cases, and data collected from the pilot system; (3) amplification and interaction algorithm for formal methods and fuzz testing and the quantitative assessment of system computation complexity; and (4) a scalable digital twin platform for domain-driven and user-centered risk detection and mitigation.

Technology shapes economics and economics shapes technology. Especially for critical infrastructure, the regulations and policies have significant impacts on both scientific research and implementation developments. Meanwhile, the conclusions from research and implementation could forfeit and enhance the policy and regulation. To address the closed loop, the approach of identifying several prototypical scenarios where digital-twin would be deployed 11
12 was proposed, and then the different modalities in which the digital-twin technology might be employed and how that would shape regulation was explored. For example, decisions without digital twin are baseline that result in outcomes that trigger policy concern. Decisions with the digital twin are potentially better but raise concerns for policy changing both enforcement capabilities (e.g., auditability, etc.) and challenges (e.g., liability assignment, etc.). In FIG. 1, a digital twin design (Thrust 4) is shown that hosts the accountable software systems for critical infrastructure. In the inner-loop (Thrust 2 and Thrust 3), the focus is on the software accountability, and it connects to the outer-loop where the focus is to reshape the design, regulation and policy through abstracted application dependency, assumptions and properties (Thrust 1).

An aim of the present invention is constructing a digital twin platform that is not only describable but also actionable for potential or actual attacks in a physical 5G system, from the micro-atomic to the macro geometrical level. Besides, effective fuzzing strategies are also formed on the developed digital twin platform to detect vulnerabilities and unintended emergent behaviors for 5G specifications and implementations.

In summary, leveraging the domain knowledge in target research fields, a heuristic approach between static formal analysis and stochastic fuzz testing analysis to promote their interaction and amplification and provide the assurance of system design and protocol to implementation stacks.

Further, Clearpath Jackal UGV and Vicon system currently are connected through WiFi, which limits the technology transition to industry and scalability. Followed by an independent vulnerability detection of the two pilot projects, integrating 5G open programmable platforms to the two pilot projects demonstrates the process of vulnerability detection into workflow integrity, data sharing, and usable security with sufficient automation, scalability, and usability While focusing on cyber security and advancing computer networks and software systems, the present invention also attempts to address the influence of human errors. To address the human side of the security concerns, XR-based training and university-wide IT Framework are explored for large-scale collaborative research facilities. Domain-driven analysis was constructed with causation inference and inductive reasoning for user-scenario-based security causation, spec transparency, and stack architecture.

A first object of the present invention is to enable an end-to-end system using causality analysis and formal reasoning providing provable verification for 5G protocol design and implementation and enabling critical cybersecurity assessments.

Another object of the present invention is to facilitate automatic discovery and mitigation of vulnerabilities and unintended emergent behaviors.

A further object of the present invention is to allow for the assessment of current 5G security assurance and enhancing its resilience, validating on pilot 5G stack Taking into account the attacker strategies with different levels of prior knowledge, another object of the present invention is to design three fuzzing strategies (i.e., LAL, SyAL, and SoAL). These strategies offer an efficient and comprehensive solution for vulnerability detection in 5G specifications and stacks.

Another object of the present invention is to propose a probability-based fuzzing approach that can reduce the average number of fuzzing cases expected to detect a vulnerability from linear to logarithmic growth, resulting in significant scalability and efficiency improvements for complex systems.

Yet another object of the present invention is to design a renovated 5G cybersecurity digital twin (CDT) platform based on classical 5G cybersecurity modeling. Compared to existing ones, the introduced platform is not only describable but also actionable for potential or actual attacks in a physical 5G system.

An additional object of the present invention is to develop a proof-of-concept of the designed framework piloting Radio Resource Control (RRC) protocols in the srsRAN platform. The discovered vulnerable states and transactions of the RRC protocol provide insights for fortifying 5G and NextG protocols.

A still further object of the present invention is to allow the digital twin solution to directly scale to other existing and future open-source and commercial 5G platforms and protocols other than RRC.

A not-necessarily final object of the present invention is to allow for scalability and usability to extend 5G codebases from the Linux Foundation open source and existing 5G codebases of carriers in national operation.

Further objects of the present invention include designing a renovated 5G cybersecurity digital twin (CDT) platform based on classical 5G cybersecurity modeling. Compared to existing ones, the introduced platform is not only describable but also actionable for potential or actual attacks in a physical 5G system. A proof of concept of the designed framework is also demonstrated for piloting RRC protocols in the srsRAN platform. The discovered vulnerable states and transactions of the RRC protocol provide insights for fortifying 5G and nextG protocols. Additionally, based on the awareness of prior knowledge and accessibility of physical objects, these fuzzing strategies, including LAL, SyAL, and SoAL, are proposed to offer an efficient and comprehensive vulnerability detection solution to 5G specifications and implementations.

Aiming for security, usability, and reliability research that facilitates scientific collaboration and encourages the adoption of security into the scientific workflow, it is an objective of the present invention to improve security assurance and resilience at both infrastructure and domain levels by discovering and mitigating vulnerabilities and unintended emergent behaviors in system design and implementations with sufficient automation, scalability, and usability. Specifically, it is demonstrated how the proposed approach could be applied in three selected pilot scientific projects of the fifth generation (5G) open programmable software defined platform, outdoor multi-agent robotic navigation systems, and indoor drone control research systems for vulnerability and unintended emergent behaviors detection.

Overall, a describable and actionable 5G CDT platform for potential or actual attacks in a physical 5G system has been developed. A proof of concept of the designed framework was also developed based on RRC protocols via the srsRAN platform. Different types of vulnerable states and transactions of the RRC protocol have been discovered through three proposed fuzzing strategies, depending on the awareness of prior knowledge and accessibility of physical objects. The designed framework provides an efficient and comprehensive vulnerability detection solution to 5G and nextG protocols. In future work, real-life network environments with external factors in over-the-air (OTA) scenarios will be integrated for system robustness and resilience.

Further automation in bit-level fuzzing and the connection with command-level fuzzing can be developed to enhance the scalability.

BRIEF DESCRIPTION OF THE DRAWINGS

For a more complete understanding of the present invention, reference is made to the following figures, in which:

FIG. 2 is a schematic diagram showing Dependency Graph Generation Principles from Various Scientific Infrastructures in accordance with embodiments of the present invention;

FIG. 6 is a schematic diagram showing 5G Security and Access Control Simplification in accordance with an embodiment of the present invention;

FIG. 9 is a schematic diagram showing Formal and Fuzzing Triggering and Amplification with GAN based Fuzzing Generator in accordance with an embodiment of the present invention;

FIG. 17A is a table showing a legal command-level fuzzing test distribution in different types according to an embodiment of the present invention;

FIG. 17B is a sample SyAL fuzzing testing algorithm;

FIG. 20A is a table showing a command list;

FIG. 20B is a table showing a comparison of fuzz strategies in different platforms in accordance with an embodiment of the present invention;

FIG. 20C is a table showing results of bit-level fuzzing in accordance with an embodiment of the present invention;

FIG. 20D is a table showing a comparison of different bit-level strategies in accordance with an embodiment of the present invention;

FIG. 23A is a table showing a comparison analysis with different fuzzing strategies in accordance with an embodiment of the present invention;

FIG. 24A is a table showing RRC setup request-IEs Field Descriptions in accordance with an embodiment of the present invention;

FIG. 26A is a table showing the imbalanced nature of formal property data in accordance with an embodiment of the present invention;

FIG. 26B is a table showing model configuration in accordance with an embodiment of the present invention;

FIG. 28A is a table showing the accuracy of different models in accordance with an embodiment of the present invention;

FIG. 28 is a graph showing training results, wherein Suboptimal models, such as those utilizing LLM with LSTM and standalone LSTM, often get trapped in local minima due to Class Imbalance and Specially Designed Loss;

FIG. 32E is a visualization of FIG. 32D;

FIG. 33 is a log file relating to the Experiment Platform;

FIG. 35 is a Fuzzing Log File to Parse Evidence Information in accordance with embodiments of the present invention;

FIG. 36 is an RRC connection flow graph in accordance with embodiments of the present invention;

FIG. 37 is a security mode command flow graph in accordance with embodiments of the present invention;

FIG. 39 is a ground truth security mode command dependency graph;

FIG. 40 is a graphical comparison between predicted and ground truth dependency in accordance with embodiments of the present invention.

FIG. 42A is a dependency table in accordance with embodiments of the present invention;

FIG. 44 is a schematic diagram illustrating user credentials disclosure in accordance with embodiments of the present invention;

FIG. 45 is a schematic diagram illustrating a DoS or Device attack;

FIG. 46 is a schematic diagram showing exposure of NAS;

FIG. 46A is a summary of findings table in accordance with embodiments of the present invention;

FIG. 47 is a schematic diagram showing exposure of AS;

FIG. 51 an algorithm relating to FIG. 50;

FIG. 52 is a log file related to FIG. 51;

FIG. 58 is a schematic diagram illustrating a Real-time Framework for Root Cause Analyses in NextG Vulnerability Detection;

FIG. 59 is a log file relating to the embodiments of FIG. 58;

FIG. 65 is a schematic diagram representing a Squirrel Net System;

FIG. 66 is a graph representing results pertaining to the system of FIG. 65

FIG. 67 is a graph representing results pertaining to the system of FIG. 65;

FIG. 68 is a graph representing results pertaining to the system of FIG. 65;

Figure 1:
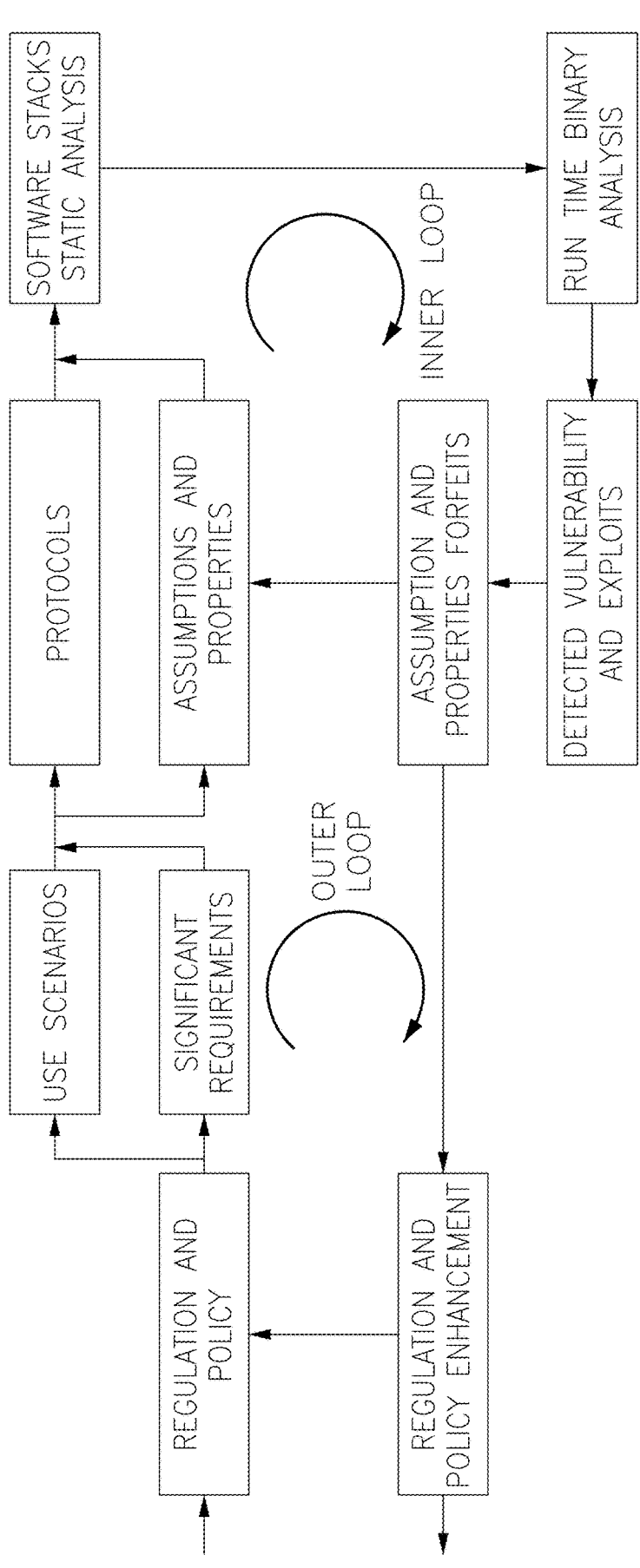
FIG. 1 is a schematic diagram showing the Ecosystem Loop from Regulations to Software Accountability in accordance with an embodiment of the present invention.

DETAILED DESCRIPTION OF THE
EXEMPLARY EMBODIMENT

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms "a", "an", "the", and "one" include the plural referents unless otherwise stated. Additionally, the terms "comprises" and "comprising" when used herein specify that certain features are present in that embodiment, however, this phrase should not be interpreted to preclude the presence or addition of additional steps, operations, features, components, and/or groups thereof.

All examples and conditional language recited herein are intended for pedagogical purposes to aid the reader in understanding the principles of the invention and the concepts contributed thereby to furthering the relevant art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The present invention serves as a fundamental research tool to formulate a solution for unifying static formal methods and stochastic fuzzing methods that could be used for large-scale vulnerability and unintended emergent behavior detection. Two of the essential sub-questions to lay out the solution are how one can increase the efficiency and scalability of both methods and how formal verification and fuzz testing could amplify each other throughout the life cycle of a system. One of the essential areas in the state-of-the-art research of vulnerability detection is comparing the two approaches in various scenarios. Despite some breakthroughs via different kinds of picking and choosing between them, the limitations in large-scale systems and stacks still exist. The present invention proposes the exploration and demonstration of an innovative heuristic approach to achieve scalability. Unifying the two methods could trigger the cycle of formal methods and fuzz testing and enable the discovery of vulnerabilities in the entire search space. The unifying theme should be complementary and mutual amplification. The vulnerability and unintended emergent behaviors detection could be extended with scalability when the amplification happens. The amplification of the formal method and fuzz testing provides a general approach to scientific workflow. In addition, leveraging domain knowledge is useful to refine the system target in describing the validity of specific system behaviors. The causality and attack graph analysis in the desired domain is proposed to connect use scenarios, domain knowledge, protocol, and implementation and enable a focused system-level risk assessment of various applications scenarios.

A hierarchical Bayesian Network Model (BNM) platform is proposed for adversary events causal inference in the system, identifying root causes, learning the techniques and model areas with high-risk vulnerabilities over time and prioritizing these areas of the general approach to apply.

Example 1: From Informal Domain Knowledge to Formal Modeling Schema Via Pilot Research Projects Researchers and scientists in critical scientific or critical infrastructure domains rely on software and information and communications technology (ICT) to conduct transdisciplinary and interdisciplinary research. The openness, flexibility, and agility requirements for general research infrastructures present a potential transition pathway for further testing, evaluating, and deploying such CI and reshaping the strategy of the fundamental research in Cybersecurity Innovation for Cyberinfrastructure. Meanwhile, improving the robustness of scientific CI through operational an data-scale deployment, testing, and evaluation provides cyber assurance for trans-disciplinary and interdisciplinary research and accelerates their technology transitions. The objective of Thrust 1 is converting the essential domain information, including technical specification (TS), technical requirements (TR), and communication protocols, into a formal expression automatically, combined with the binary domain software, to enable vulnerability and unintended emergent behavior detection.

For most scientific projects and industry applications, protocols constitute the backbone of communication systems upon which there is an increased reliance to provide distributed, reliable, and safety-critical communication services. Protocol analysis and binary analysis are both used for vulnerability detection. The proper utilization of protocol analysis leads to more efficient testing and vulnerability detection. Without protocol analysis specific to the domain knowledge, testing and vulnerability identification rely heavily on general binary-based testing, which is computationally expensive and impractical. In addition, the assumptions and properties abstracted from TR, TS, and protocols define the boundaries of legal but invalid system behaviors and allow the detection of domain-specific vulnerabilities. To accelerate researchers' ability to have industry-applicable projects be deployed and tested without the necessity for external deep communication knowledge, an intelligent protocol synthesis and verification engineering approach is proposed, leveraging existing methodologies, through the exploration of three research projects. The outcome of the proposed approach includes the protocol modeling, domain assumptions, and properties, which will combine with available run-time resources of source code and binaries to enable the comprehensive vulnerability and unintended emergent behavior detection in Thrusts 2 and 3.

Protocols deal with complex issues related to distribution, such as communication, concurrency, and synchronization. Protocol synthesis attempts to formalize and automate the process of designing communications protocols. Existing works range from the stepwise refinement of high-level requirements specification to the automatic generation starting from a formal service specification. Behavior modeling has proven successful in helping uncover design flaws of con-current and distributed systems.

Nevertheless, it has not had a widespread impact on practitioners because model construction remains a difficult task and because the benefit of behavior analysis appears at the end of the model construction effort. In contrast, scenario-based specifications have a wide acceptance in the industry and are well suited for developing first approximations of intended behavior.

To date, the existing protocol synthesis methods follow a top-down approach, from specification and requirements to developing protocols. In practice, many of the scientific solutions have been applied without a well-documented protocol, and it requires reverse engineering for protocol synthesis from existing implementations, collected data and/or project history of development and updates. Thus, a dependency graph-based bi-directional protocol modeling that allows the top-down specification-to-protocol modeling and a bottom-up implementation-to-protocol modeling is proposed.

Figure 3:
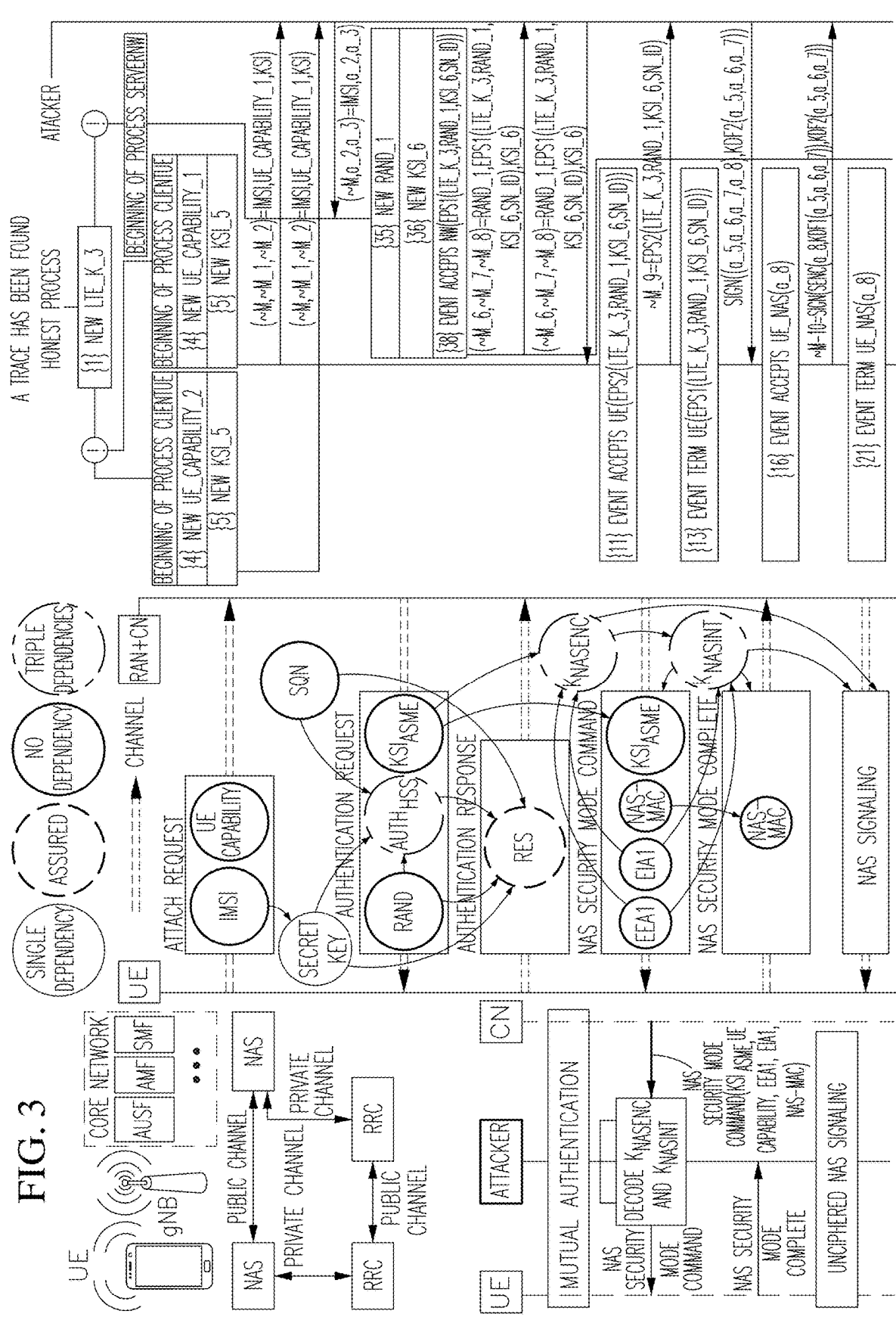
FIG. 3 is a schematic diagram showing the conversion from Informal Description to Formal Verification and Attack Trace in accordance with embodiments of the present invention.

A dependency graph is a structure formed by a directed graph that describes the dependency of an entity in the system on the other entities of the same system. Each node points to the node on which it depends. In the presently proposed solution, multi-nodes and the organized communication among them are described by a dependency graph. This dependency graph represents the relational information, assumptions constraints, and requirements from protocols. As shown in FIG. 3, in the block of 'Thrust 1: Protocol Abstraction', the framework for converting the domain knowledge to the dependency graph is formed. On the right side, the formal verification is automatically derived from the dependency graph. The assumptions and properties are extracted to scale the formal verification through the hieratical re-layer for the dependency graph. It also provides an interaction channel between the domain researcher and cyber-infrastructure researcher. Depending on a specific research project, the conversion from confirmation and project information to the dependency graph could be categorized into four categories as shown in FIG. 3.

In the first category of scenarios, C1, the critical component(s) of a scientific project or infrastructure's dependency graphs or formal descriptions are available. These are the most straightforward conditions that could directly interface with Thrust 2 and Thrust 3. In the pilot applications' A15G open-source testbed, RRC authentication protocols and NAS protocols in 5G standards were converted into the formal descriptions, which can directly use C1 channels. In Thrust 2 and Thrust 3, the example of A1 is used to further illustrate the details of the design process and demonstrate the effectiveness through the preliminary results.

In the second category of scenarios C2, the formal descriptions are not available, but the protocols and technical specification are pre-defined. An automation approach is proposed for converting the technical specification to formal description, assumptions, and properties.

A third category is a data-driven approach in that the application models, assumptions and properties are abstracted from the data messages and communications.

In the fourth category, only informal description through natural language is proposed (scientific papers, system documentation, etc.). Thus, the application models, assumptions, and properties are generated through NLP-aided human expertise.

For Unmanned Aerial Vehicles Network Infrastructure: Existing formal methods approaches have to be entirely devoted to a large software stack and are often impractical, not being effective and efficient. Without systematically addressing scalability and automation concerns, the cost to apply formal specification reasoning, verification, and validation even to a partial stack is significant.

Additionally, it is within the assurance goal to identify assumptions required for each security property from standards and make explicit recommendations with security fixes. To date, research on performing formal analysis on 5G protocols for detecting vulnerabilities in Authentication, Confidentiality and Integrity (CIA) heavily focused on initial registration procedure and the analyses without considering unintended emergent behaviors and their interaction with further procedures. Given the complexity of both specification and implementations of 5G stacks and large sizes and considerable investment into existing codebases precluding clean-slate redevelopment, there lacks a synthesized knowledge of unintended emergent behavior and its consequences. Particularly, the existing work rarely investigates the impact of unintended emergent behaviors under different external scenarios for system risk assessment.

FIG. 6 shows the conversion of simplified models similar to the 5G security and access control into the formal description. Each UE is identified by Universal Subscriber Identity Module (USIM) with a unique identified Subscription Permanent Identifier (SUPI) and International Mobile Subscriber Identity (IMSI). The Access and Mobility Management Function (AMF) in 5Gcore manages registration, detach procedures, paging, and services related to registration, connection, and mobility. The authentication and key agreements for the registration procedure are completed by Authentication Server Function (AUSF), which stores the UE's identities, keys, and subscription data. UDM (Unified Data Management) is responsible for generating AKA credentials. Radio Resource Control (RRC) and Network Access Stratum (NAS) contribute to a single state machine. The RRC layer state machines residing on different components communicate through a public, adversary-controlled channel. The NAS layer protocol packets are considered payloads of RRC layer protocol packets. The packet payloads impacting the security and privacy-specified behavior of the NAS and RRC layer protocols are critical in the formal analysis of the protocol and implementation. From the protocol information, dependency graph (b) is generated and the formal description (b) will be automatically generated, which results the attack trace (d).

The objective of Thrust 1 is to automate the conversion from informal description or protocols to the dependency graph, and formal description and generate the attack trace.

For Unmanned Aerial Vehicles Network Infrastructure: Unmanned aerial vehicles (UAVs), or so-called drones, are becoming ubiquitous, with diverse civilian and military applications ranging from aerial inspection, delivery, surveillance, and mapping, emergency responses, and search and rescue missions, to name a few. Many of these applications have traditionally relied on large, expensive aircraft. A team of cooperative UAVs that efficiently communicate and share their limited onboard resources can be advantageous by significantly reducing the costs per unit, scalability in mission coverage, reliability, and fault tolerance due to their distributed task execution. In the last several years, government agencies, including the Federal Aviation Agency (FAA), as well as private companies, such as Amazon and Google, have led the effort to realize the concept of Unmanned Aerial Systems Traffic Management (UTM). One of the recent UTM advancements is the UAV-to-UAV and UAV-to-ground communication infrastructure, similar to ADS-B1 surveillance systems for manned aircraft, to enable greater cooperation among UAVs and ground control stations. In fact, FAA has rolled out a new regulatory rule in 2021 that will require all registered drones to have a remote identification (Remote ID) capability to provide identification and location information that other parties can receive. However, traffic management systems, particularly UTM and surveillance systems (ADS-B), are susceptible to a wide range of cyber-physical attacks and intrusions. Numerous studies have shown vulnerabilities of the wireless communication links that allow intercepting, hijacking, or crashing UAVs via jamming, spoofing de-authentication, and false data injection. The cooperative nature of multi-UAV networks and the uncontrolled environment at low altitudes where they operate make it possible for malicious nodes to join and disrupt the routing protocols. While multi-node networks such as flying ad-hoc network (FANET) can extend the operational rage of UAVs, several security and privacy threats have been identified in these networks. To perform safety-critical tasks at scale, swarms of autonomous aerial drones should be capable of rapidly reconfiguring and adapting in degraded conditions and reliably detecting and recovering from adversarial attacks.

For Requirements for UAV-Based Research Infrastructure: The societal and economic impacts of UAV-based solutions in a wide range of applications have compelled researchers at universities, companies, and government entities to develop research infrastructure for aerial drones. Indoor and outdoor UAV test sites could be targets of cyber criminals due to the sensitivity of drone technologies and the implications for data privacy, national security, and the safety of people and property. The unique nature of drone networks requires cybersecurity measures beyond the standard support provided by the IT departments of large and small organizations.

For Additional Requirements/Assumptions for the Security of UAV networks: UAV networks have distinct characteristics that require security solutions different from other networks. For instance, the mobility of nodes (UAVs), possible data link breaks, and evolving flight formations result in intermittent connectivity and network topology changes. The evolving dynamics of these networks and the limited resources onboard UAVs for communication and computation necessitate advancing new algorithms and mathematical tools for modeling, monitoring, and control. It is speculated that the next generation of highly autonomous UAVs will be equipped with advanced monitoring algorithms capable of detecting anomalies in their local environment and efficient communication with other UAVs and ground control stations. In the present disclosure, a framework was developed for detecting non-cooperative and malicious agents leveraging the physical dynamics and constraints of UAVs without requiring the full knowledge of the network model. It is an objective of the present invention to extend the theoretical results on monitoring for multi-agent systems and to address intermittent and switching network typologies, local information exchange, and partially available measurements and models, such as real-time performance of drone operations, light-weight encryption model-based detection and mitigation, etc.

For Testing and Evaluations using Multirotor Drones: A multi-UAV flight test setup can be used to evaluate the effectiveness of the proposed detection methods, wherein a peer-to-peer communication was developed in accordance with embodiments of the present invention between UAVs and also with the ground station using radio/WiFi links. This test setup can measure the project's success based on the quantity and severity of attack scenarios and the effectiveness of the proposed approaches in timely attack detection and mitigation. It is worth mentioning that the experimental setup allows for a comprehensive study of the UAV networks from different aspects, such as investigating the effect of communication delays, data encryption, and limited computation resources for supporting real-time missions. As for evaluation scenarios, a few of the UAVs can be selected as malicious agents that share manipulated data with their neighboring UAVs through the network while trying to remain undetected for as long as possible. The attack signal, which may appear to be legitimate data, intends to bring the multi-agent system to unsafe states, such as mid-air collisions between UAVs, crashes into obstacles and the surrounding environment, perturbations in the multi-UAV system's dynamics. The proposed attack detection and mitigation algorithms were implemented and tested against worst-case stealthy attacks, such as the zero-dynamics attack (ZDA) or covert attack, which are hard to detect. Upon exploiting the system model and compromising input-output channels, a ZDA excites the zero dynamics of a system by injecting malicious signals in the direction of the system's invariant zeros. A covert attack cancels out the effect of injected attacks on actuator channels by modifying the measurements in output channels. In both cases, the adversarial attacks are not observable in the system outputs. Privacy preservation was also evaluated in the present detection methods.

Figure 4:
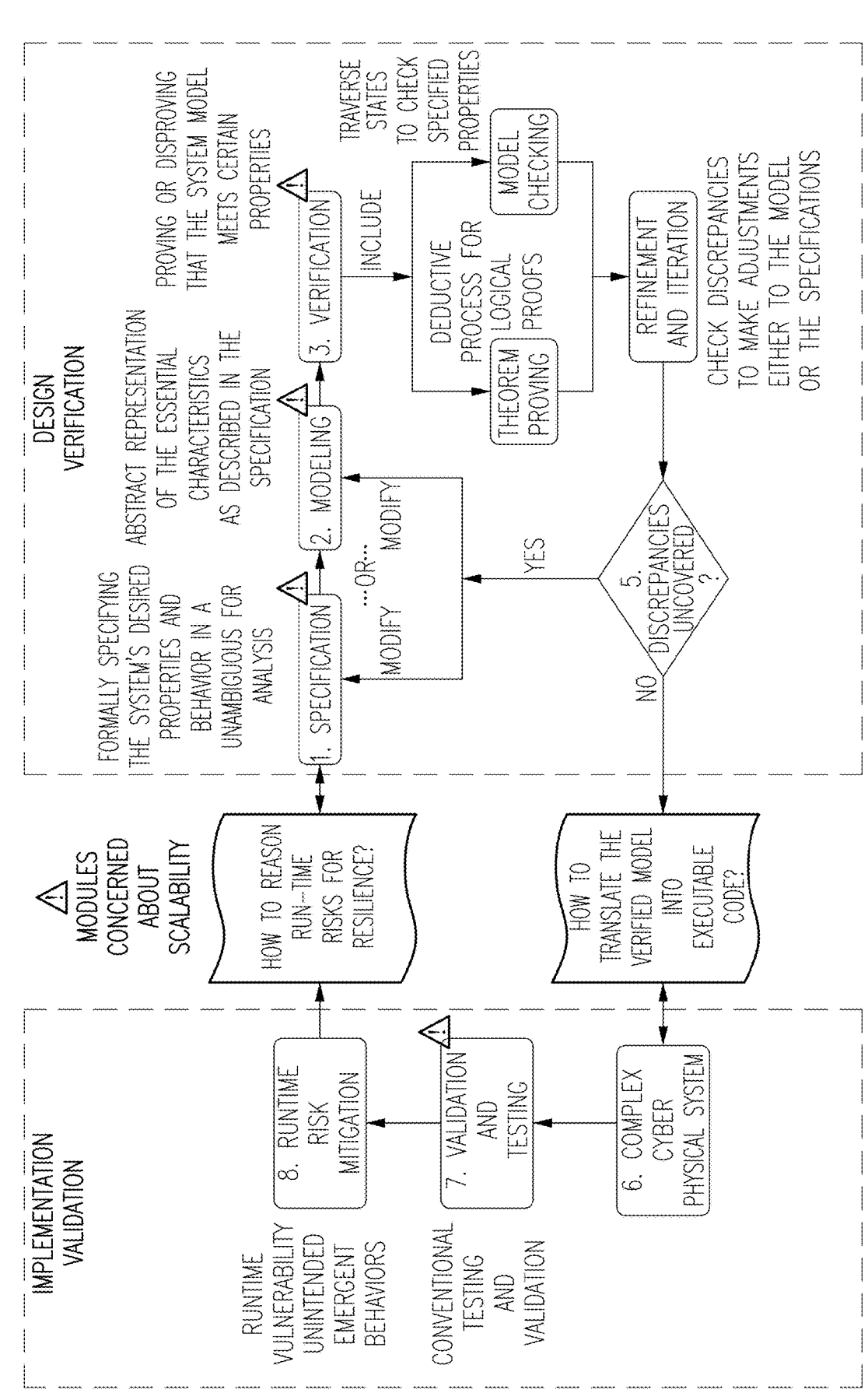
FIG. 4 is a schematic diagram demonstrating the structured stages of design verification and implementation validation in cyber-physical systems in accordance with embodiments of the present invention.

FIG. 4 demonstrates the structured stages of design verification and implementation validation in cyber-physical systems. For example, a UAV Swarm Ground Control System, from specification through modeling and verification, to refinement, implementation and final testing. Its curved shape highlights the challenging process of the transition from design and implementation. The triangle marker identifies the modules that are difficult to scale in the current state of art. Formal methods comprise a set of mathematical and logical tools used to specify, develop, and verify system design, especially in domains where correctness is crucial, such as aerospace, automotive, finance, and critical infrastructure. In contrast, experimental-based testing methodologies, such as fuzz testing, focus on executable code stacks or systems. In the context of cyber-physical systems, the structured stages of design verification and implementation validation in the current state of the art range from specification through modeling and verification to refinement, implementation, and final testing, as illustrated in FIG. 4. A review of these stages reveals scalability issues in stages 1, 2, 3, 4, and 7. Furthermore, two critical questions arise: How can verified formal models be translated into executable code stacks, and how can runtime risks be assessed for system resilience?

Figure 5:
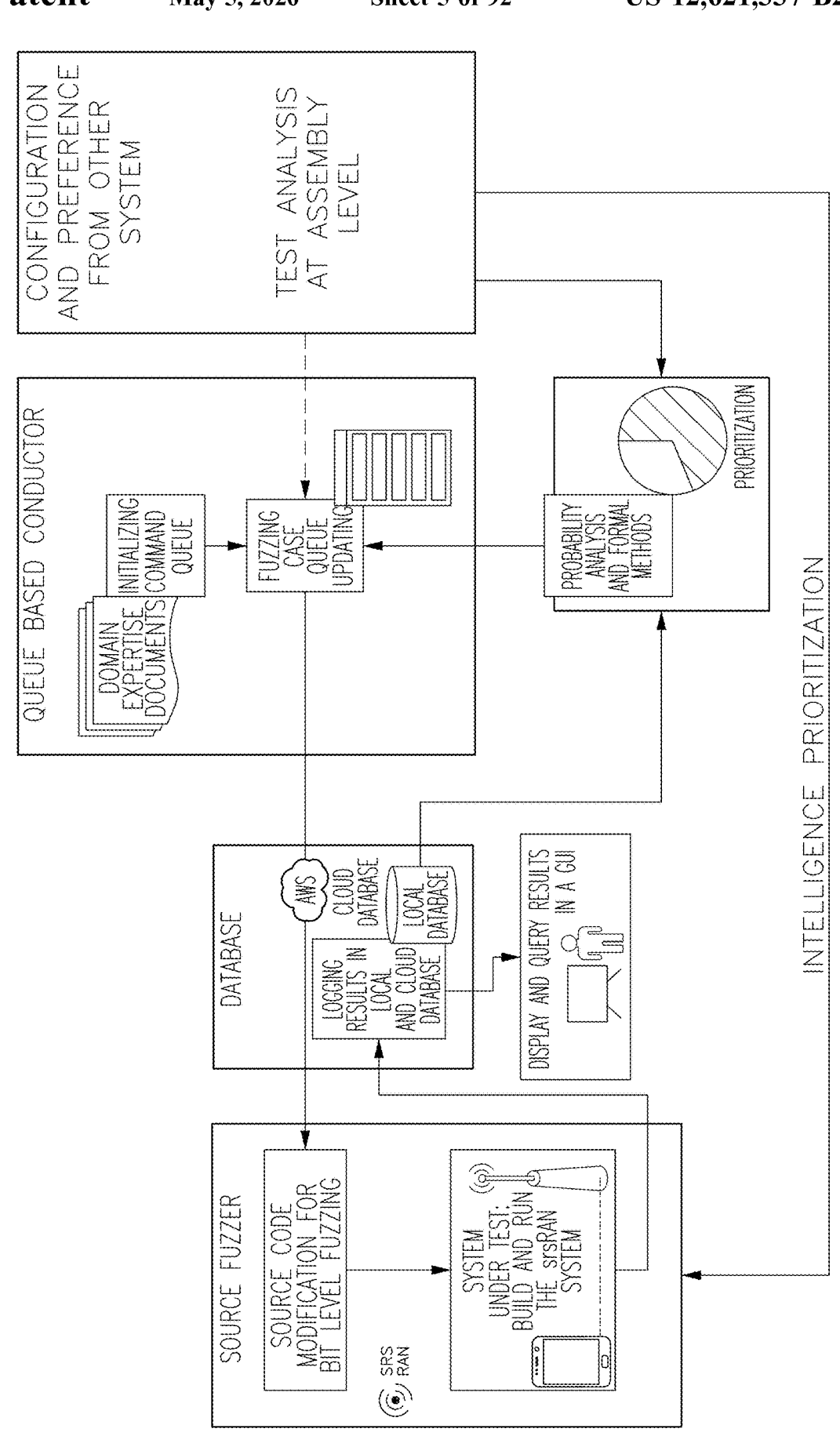
FIG. 5 is a schematic diagram showing the implementation of fuzzing and formal processes connected with a digital twin testbed in accordance with embodiments of the present invention.

FIG. 5 is a description of the implementation of fuzzing and formal process connected with a digital twin testbed. It shows an overview of the framework. Based on the assumptions detected by the hybrid formal methods, test cases are created to violate the assumptions fed into the system for data analysis. The data will also be used to build intelligent machine learning-based models that can detect patterns for various software stack implementations. The formal methods specification created in a flagship stack can be replicated to multiple implementations and stacks.

Figure 10:
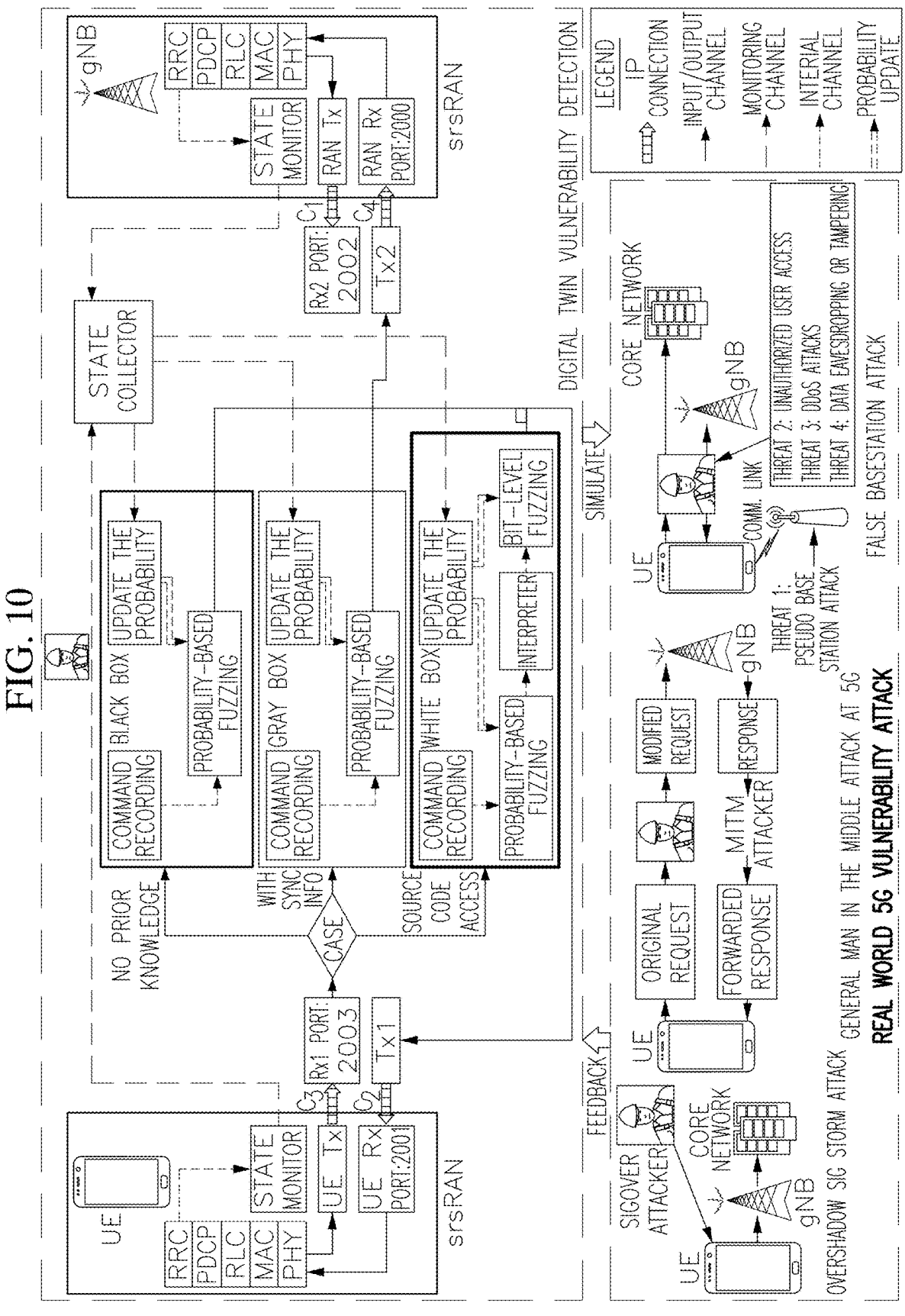
FIG. 10 is a schematic diagram showing a Digital engineering view for 5G vulnerability and unintended emergent behavior detection in accordance with embodiments of the present invention.
Figure 11:
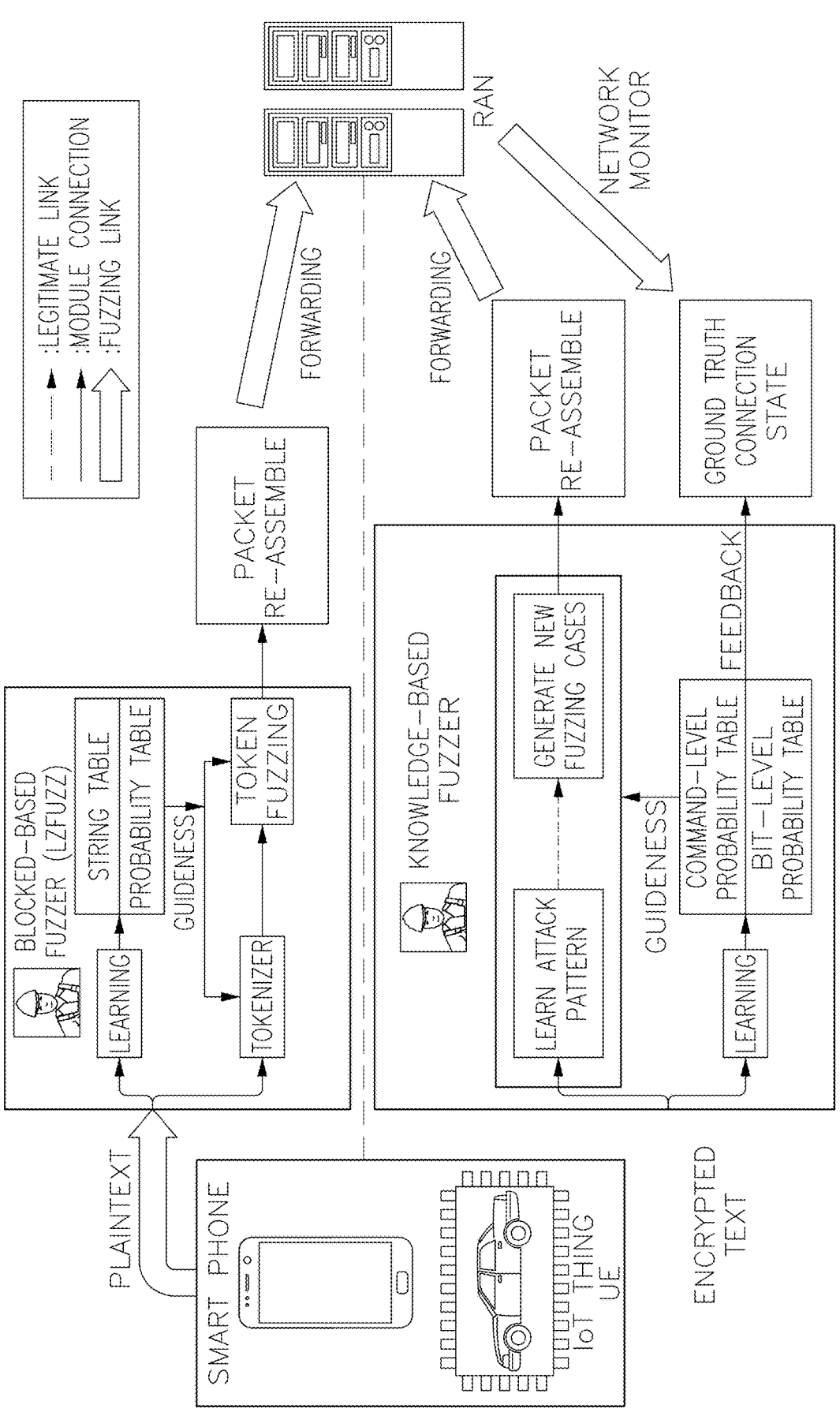
FIG. 11 is a schematic overview of 5G fuzz testing methods.

Example 2: Pick and Choose: State-Based Fuzz Testing for System Implementation and Assumption-Defined Formal Automation in System Design Thrust 2 aims to enable micro-level autonomous fuzz testing for implementation stack and auto-assisted formal methods for the supporting platform, so as to detect and mitigate vulnerabilities and unintended emergent behaviors in critical infrastructures. A novel state-based efficient fuzzing method is proposed with high efficiency and linear computation complexity. On the other hand, an assumption-defined formal method is proposed for a controlled scale of a micro-level formal model for automation. The proposed formal method automatically converts informal protocols, designs and regulations to relevant assumptions, models, and properties that are compatible with formal methods platforms. The preliminary validation has been demonstrated through a 5G pilot infrastructure system. The deliverable of this thrust is a micro-level vulnerability detection and unintended emergent behaviors for software systems as well as formal models, fuzz testing cases, and data collected from the experimental platform The proposed system is scenario-adaptive to different levels of knowledge background, from no knowledge (black-box) to thorough knowledge (white-box) about protocols and FIG. 10 shows the architecture of the proposed scenario-adaptive fuzzing system. First, attack model configuration is required as input, where the security goals and target high-risk protocols or modules in a specific software stack were defined based on contextual information and domain knowledge. Given the input, the system identifies fuzzing locations and generates appropriate attack models. For example, for 5G infrastructure, the model will take the black-box protocol-independent strategy without any knowledge about the attack configuration. When the attack configuration is thoroughly known, the model selects the white-box bit-level fuzzing strategy as the attack model. Finally, based on the attack model, the fuzzing strategy function will generate the fuzzing sequences ordered by the priorities. The output of the system contains the identification of high-risk states and transactions, the detected vulnerabilities, and the prediction of the vulnerable path.

Figure 12:
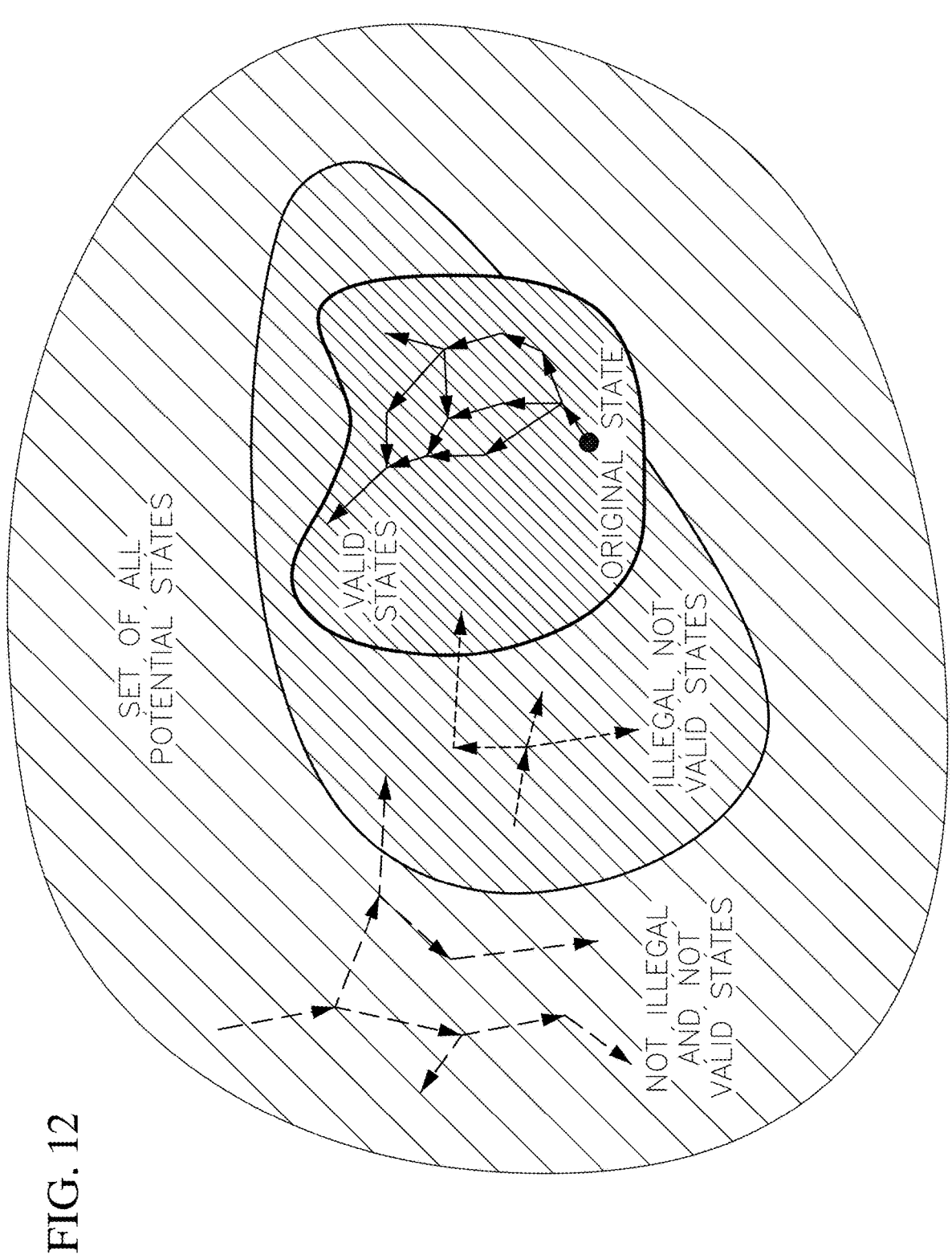
FIG. 12 is a schematic illustration of the definition of a fuzz testing region in accordance with an embodiment of the present invention.

Based on the format and impact, an emphasis was placed on the validity and legitimacy of commands. Legitimacy indicates whether the command will pass protocol and cryptographic checkers, and validity represents whether the command will lead to a threat. Correspondingly, commands mainly fall into three classes: valid states, illegal or invalid states, and other logical states, the relationship of which is shown in FIG. 12. Most command-level fuzzing states can be regarded as legal states because all command-level states are collected from regular connections. However, the validity of command-level fuzzing states can only be decided based on the result of connections, in which valid means fuzzing state has no influence on protocol stack, and invalid means fuzzing state will lead to a threat or vulnerability. On the contrary, bit-level fuzzing states contain both illegal and legal states. Therefore, the source code interpreter can be used as the integrity checker to identify whether the bit-level fuzzing states are legal or illegal. As for the validity of bit-level fuzzing states, the same measurement approach is taken with command-level fuzzing states to label.

Figure 18A:
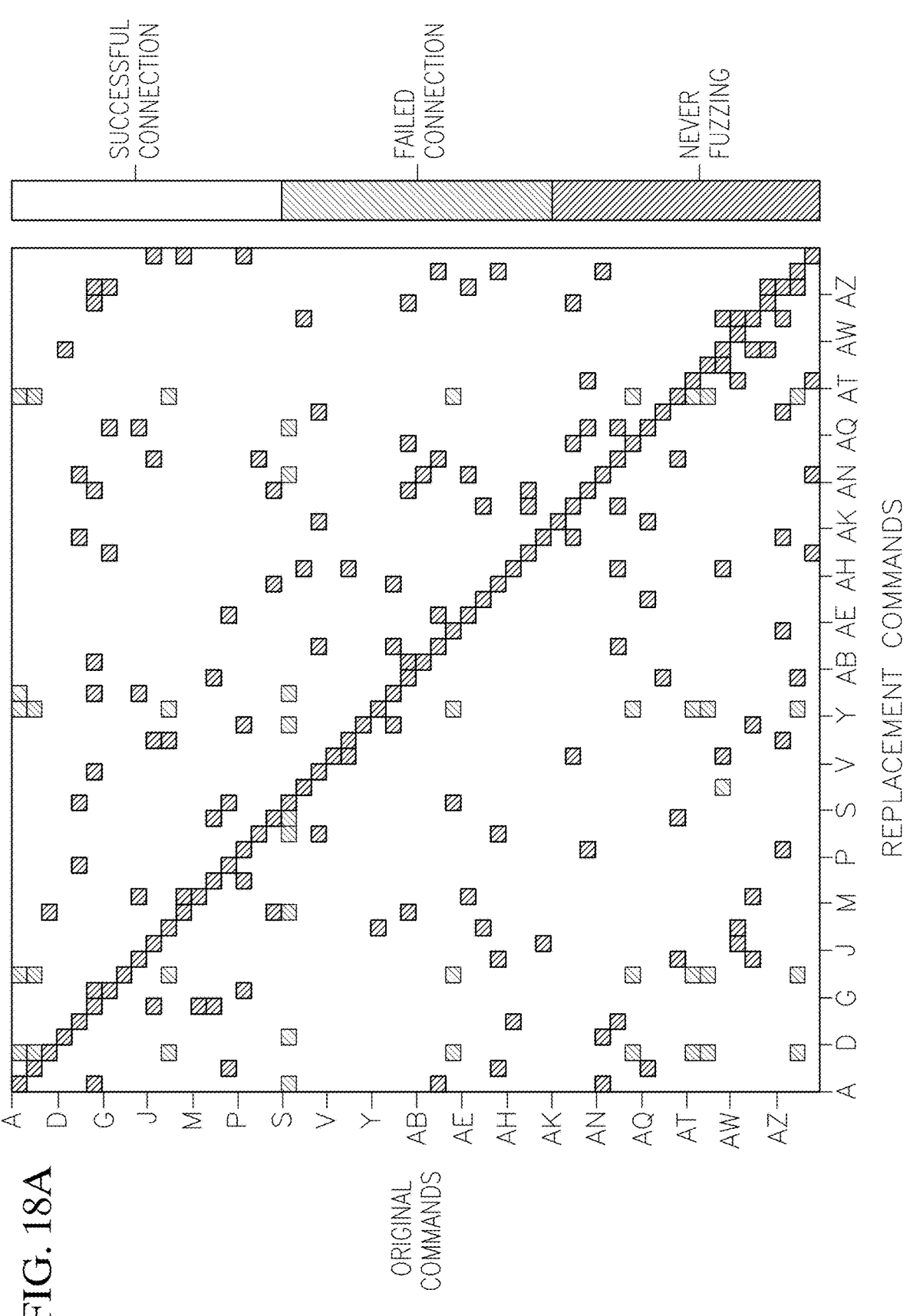
FIGS. 18A and 18B are a graphical illustrations of fuzz testing tracks on downlink channels of random fuzzing (18A) and probability-based fuzzing (18B)

Probability-Based Fuzzing Strategy For 5G Infrastructure: First the 5G infrastructure is used as a case example to show how the domain knowledge can be utilized to efficiently locate vulnerable areas. With the domain knowledge of message types for Radio Resource Control (RRC) protocol in 5G, a probability-based command-level fuzzing system was proposed to learn the vulnerability pattern efficiently and prioritize high-risk command-level fuzzing cases. The probability-based fuzzing system started from building a database to store all transition probabilities between commands of the downlink channel in 5G connections. The command-level fuzzing probability matrix is then updated with the fuzz testing results. 43 vulnerabilities were found out of 3080 possible fuzzing cases in the preliminary work. In FIG. 9, the present fuzz testing tracks of two fuzzing strategies were presented: random fuzzing and probability-based fuzzing, until all vulnerabilities are found. In FIG. 18A, there are 2811 fuzzing cases fuzzed by a random fuzzing strategy until all vulnerabilities were found. However, the probability-based fuzzing strategy takes only 1027 fuzzing cases to get all vulnerabilities in FIG. 18B. Therefore, the proposed probability-based fuzzing strategy can locate the vulnerabilities much more efficiently than the random fuzzing strategy.

For Domain Driven Micro-Scale Formal Methods Connected With Fuzz Testing: Security properties in a software stack are often more challenging to express mathematically and verify formally compared to reliability or other properties. Because the conditions or vulnerabilities in a system that could lead to security violations are often more exotic and it is complex to identify the goal and express the assumptions. When applying formal methods to the 5G software stack, two main challenges exist: complexity for applying formal methods and in-completion to assess unintended emergent behaviors. Existing formal methods approaches to be entirely devoted to a large software stack like 5G system often are impractical, not being effective and efficient. Without systematically addressing scalability and automation concerns, the cost to apply formal specification reasoning, verification and validation even to a partial stack is significant.

Additionally, it is within the 5G assurance goal to identify assumptions required for each security property from 3GPP standards and make explicit recommendations with security fixes. To date, research on performing formal analysis on 5G protocols for detecting vulnerabilities in Authentication, Confidentiality and Integrity (CIA) heavily focused on initial registration procedures and the analyses without considering unintended emergent behaviors and their interaction with further procedures. Given the complexity of both specification and implementations of 5Gstacks and large sizes and considerable investment into existing code bases preclude clean-slate redevelopment, there lacks a synthesized knowledge of unintended emergent behavior and its consequences. Particularly, the existing work rarely investigates the impact of unintended emergent behaviors under different external scenarios for system risk assessment.

FIG. 6 shows a simplified model of the 5G security and access control, explaining the relevant components and protocols. Each UE is identified by Universal Subscriber Identity Module (USIM) with a unique identified Subscription Permanent Identifier (SUPI) and International Mobile Subscriber Identity (IMSI). The Access and Mobility Management Function (AMF) in 5G core manages registration, detach procedures, paging, and services related to registration, connection, and mobility. The authentication and key agreement for the registration procedure are completed by Authentication Server Function (AUSF), which stores the UE's identities, keys, and subscription data. UDM (Unified Data Management) is responsible for generating AKA credentials. Radio Resource Control (RRC) and Network Access Stratum (NAS) contribute to a single state machine. The RRC layer state machines residing on different components communicate through a public, adversary-controlled channel. The NAS layer protocol packets are considered payloads of RRC layer protocol packets. The packet payloads impacting the security and privacy-specific behavior of the NAS and RRC layer protocols are important in the formal analysis of the protocol and implementation.

Some registration and access control protocols, including Authentication and Key Agreement (AKA), RRC etc. have been applied formal methods in various frameworks. Based on the 5G security design, necessary lemmas are verified and include helping lemmas, sanity-check lemmas, and the lemmas that check the relevant security properties against the 5G protocols. Several formal analysis frameworks in the existing research are Tamarin, LTE inspector, and 5G reasoner that determine precisely which security guarantees are met in 5G protocols by applying formal methods and automated verification in the symbolic model.

To address the challenges of complexity and in-completion, a Vulnerability Detection and Unintended-emergent-behavior Assessment System (VDUAS) is proposed. Three major functions are included in VDUAS: (1) automated formal reasoning methods for vulnerabilities detection; (2) formal-model-based fuzz testing for unintended emergent behavior discovery and assessment in a pilot stack; (3) automated recognition and discovery of relevant models and properties from extant code bases using the machine-learning models that are trained from the fuzz testing results from the pilot stack.

Figure 7:
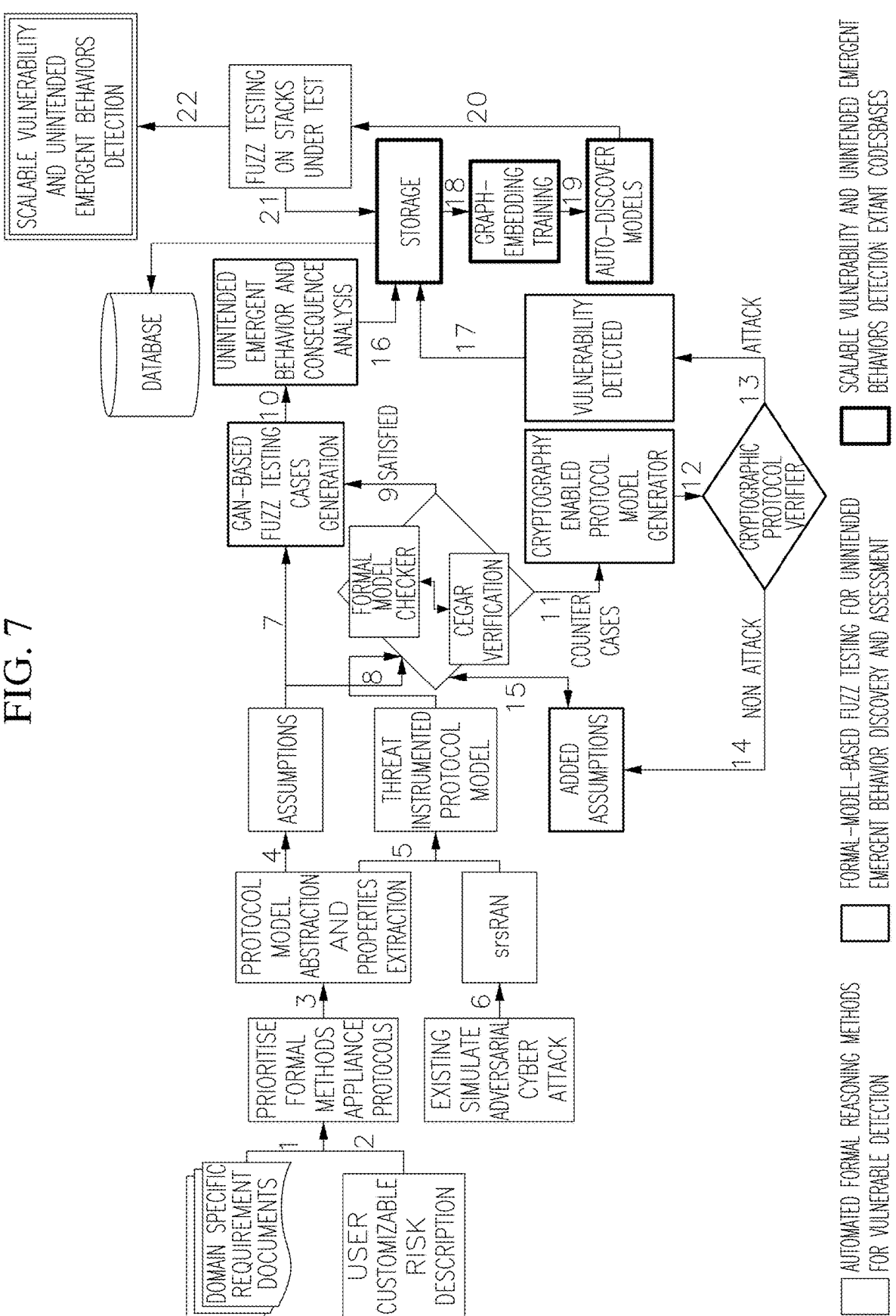
FIG. 7 is a schematic diagram showing Formal Analysis Architecture in accordance with an embodiment of the present invention.

This architecture for VDUAS can be viewed in FIG. 7. Protocol abstraction is performed based on the specification of 3GPP TS and TR. Properties extractions are through the conformance requirement document and 3GPP TS and TR, including both liveness and safety properties. Applying formal specification and formal reasoning to the entire software stack is resource-consuming. To prioritize the key components and protocols in the stack, a hybrid design of formal methods and use cases is proposed to be applied to different parts in the software stacks prioritized to reduce the complexity. The high-risk protocols or components that require high reliability and security are identified in Objective 1 and issued as high priorities in VDUAS. For the selected protocols and components, as defined in the publication by E. Clarke et al., titled Counterexample-guided Abstraction Refinement," Tech. Rep., the entire disclosure of which is incorporated herein by reference and made a part of the present application wherever appropriate, to check the protocol model and property, all encrypted messages are replaced with their plain text counterpart in both the model and the property, and a general-purpose model checker is used to determine whether the model satisfies the property. Existing cyber-attack simulation tools provided additional implicit properties in the standards and created threat instrumented protocol models. Leveraging the framework of 5G Reasoner from the publication by C. Cremers et al. entitled "Component-Based Formal Analysis of 5G-AKA: Channel Assumptions and Session Confusion" Internet Society, 3, the entire disclosure of which is incorporated herein by reference and made a part of the present application wherever appropriate, selected protocols are abstracted into states and transitions of state machines. NuXmv is used as the formal model checker to verify whether the abstracted protocol models satisfied the relevant properties meeting the condition of assumptions, and it is open to other model checkers to be evaluated in the execution of the proposal. Combined with the counterexample-guided abstraction-refinement principle (CEGAR) of Clarke, abstracted models are verified as to whether they accurately represent the protocols for counter cases in step 8 and 9 in FIG. 7.

Assumptions are made when validating the protocols meeting the properties. For example, in FIG. 6, it is shown that the channel between NAS and RRC layers and between the core network and the base station are private channels with the assumption of being free of adversarial influence. The communication channels between the UE and base station and between the UE and 5G core are public channels that are subject to adversarial impact and adhere to secure cryptographic assumptions. Additionally, with the assumption of core network and UE, USIM being secure, current protocols are vulnerable to compromising the master secret key and symmetric session keys of the USIM along with network operators' public keys in both physical layer attack or upper layer attacks. In the execution of the proposal, all assumptions will be listed for each procedure of RRC, NAS, and Paging protocol validations.

Until step 9 in FIG. 7, with the conclusion from the formal method checking, it leads to the question of whether satisfied protocols are secure and counter-cases are insecure. Emergent behavior is a core trait of systems and large-scale software stacks; agent-based simulations are used widely to detect the emergent behaviors in real-time. However, it is challenging to predict the emergence before its appearance. Emergent behavior in general falls into a deterministic domain or a stochastic domain. While the deterministic domain can be detectable by the formal methods, the stochastic domain appears more frequently in the 5G software stack due to complexity encompasses hierarchical component structures, multi-layered network interactions, spatial-temporal autonomous and semi-autonomous component behaviors, especially with the recent adoption of O-RAN that characterized by machine learning algorithms.

Thus, a formal-model-based fuzz testing is proposed that explores random variations of a scenario guided by formal constraints. The protocols satisfying the properties are passed to a fuzz testing case generator for unintended emergent behavior monitoring by designing test cases that violated the corresponding assumptions for verified protocol models. By applying fuzz testing guided formal methods to 5G software stacks, it is viable to not only identify the unintended emergent behavior through evaluating by the assumptions, but also to enable further reveal of the unintended emergent behaviors' consequences and expected responses from the system under test at various environments and provide the capability of provably secure fixing for the attacks and weaknesses detected.

Formal methods specify a system's entire desired behavioral and structure, providing the means of precisely defining notions like consistency and completeness and, more relevantly, specification implementation and correctness. Meanwhile, use-case methods provide a use case based testing and are common during requirements engineering, even though they offer limited support for eliciting security threats and requirements. In this section, a systematic approach to complement formal methods with use-case methods is presented, with emphasis on description and method guidelines to reach both effectiveness and efficiency.

Fuzz testing is the use-case strategies that are used to complete the proving circle by revealing the consequence of the unintended behaviors. Fuzz testing is integrated into the hybrid formal methods design guided by its result to describe unintended emergent behaviors and evaluate their consequences under various attack environments. Based on the assumptions detected by the hybrid formal methods, test cases are created to violate the assumptions feed into the system for data analysis. The data will also be used further to build intelligent machine learning based models used to detect the patterns for various implementations in software stacks, where the formal methods specification created in a flagship stack can be replicated to multiple implementations and stacks.

Example 3: Unifying Approach: Interaction and Amplification Between Formal Method and Fuzz Testing This thrust aims to trigger the formal models and fuzz testing case sets to amplify the effects of the two methods to discover and mitigate vulnerabilities in scale. Compared to Thrust 1, it also allows for a more sensitive unintended emergent behaviors detection and assessment by leveraging the amplification and other methods. The assumption-divided formal approach sets the size of the formal model searching space and divides the space into potential attack trace, attack derivative and clean area. Based on the results, fuzz testing is performed and further extended to an out-of-assumption space searching. Data collected in the in-space are used for classification model training. The trained model is used to identify a high risk out-space region to trigger the next round of formal models or eventually forfeit the design assumptions. To this end amplified and interactive formal methods and fuzz testing and the quantitative estimation of computation complexity were developed.

A 5G software stack is selected as the pilot software. Automated formal reasoning methods for vulnerabilities detection, build generative adversarial network (GAN) based fuzz testing case auto generation for unintended emergent behavior discovery and assessment, and application of both formal reasoning and fuzz testing in a open source pilot stack were used to collect data.

Formal reasoning is applied for vulnerability and protocol assumption detection. Model-based fuzz testing is used for unintended emergent behavior assessment by performing in the out-of-assumption domains on pilot software stacks or prototypes. Graph embedding-based models trained from the fuzz testing data associating the patterns with vulnerabilities and unintended behaviors were employed, which offer automation and scalability when feedback to formal method to identify the high risk vulnerable areas applied on other software available in the field.

Design graph Embedding-based models trained from the fuzz testing results from the pilot stack to associate fuzz test data with protocol reasoning models and build an automation scheme that can apply the models to other software stacks for scalability can be used.

Figure 8:
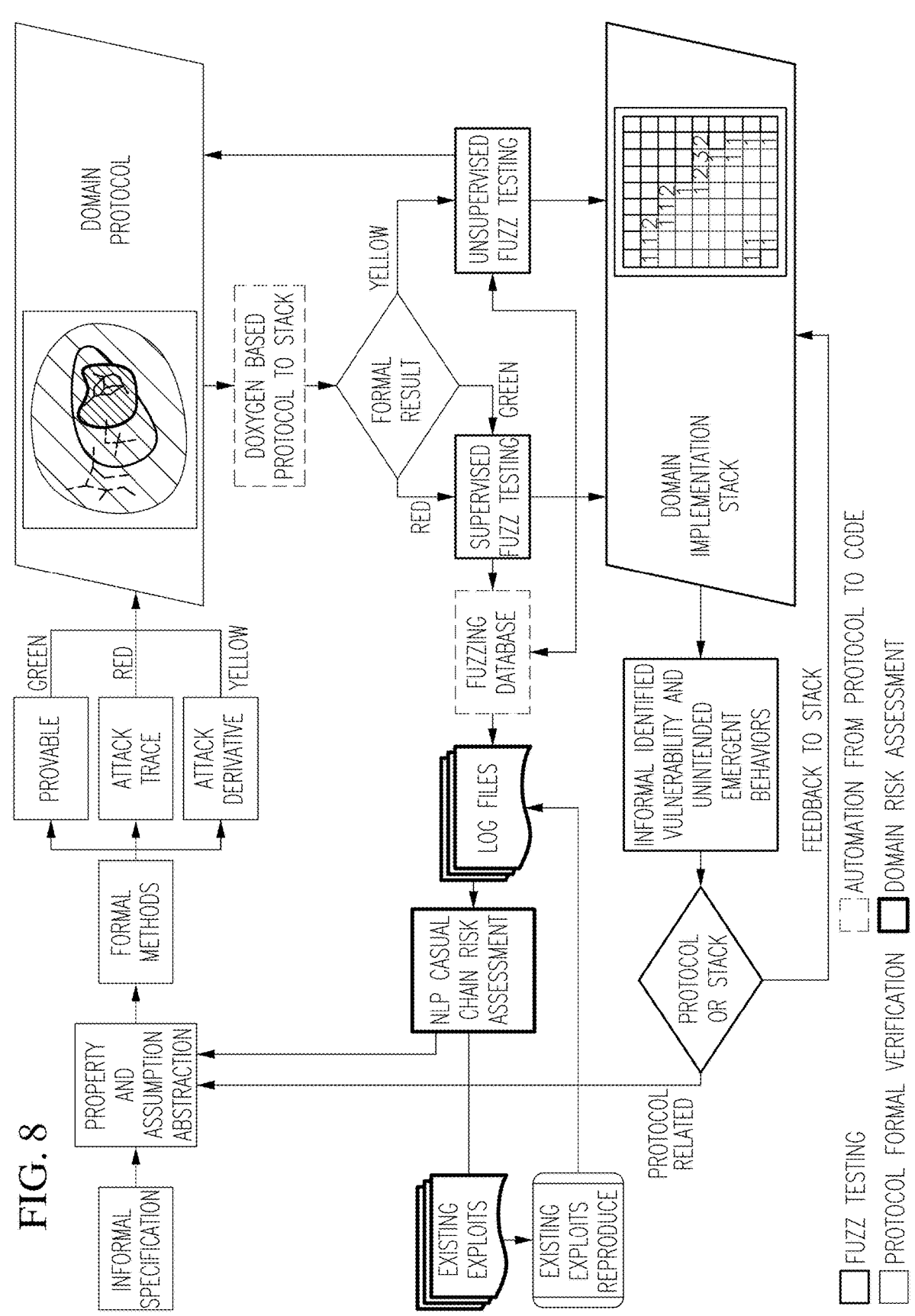
FIG. 8 is a schematic diagram showing a System Module View of Integrated Formal and Fuzzing in accordance with an embodiment of the present invention.

FIG. 8 shows the system module view of a general approach integrated formal and fuzzing testing. Four layers are included in the system: a fuzz testing layer, formal methods, the interface between the fuzz testing and formal methods layer, and the domain and risk assessment layer. The four layers with distinct responsibilities and flexible interface allow a parallel development among the four layers. The proof of concept example in 5G protocols and stacks has been developed. The interaction between fuzz testing and formal verification is performed in the supervised fuzz testing and unsupervised fuzz testing blocks. The three types of output from the formal method include attack trace, clean states and attack derivative.

Further, an inter-amplified system is designed to empower both fuzz testing and formal verification through the loop of seven steps, formal space identification formal vulnerability searching, formal guided fuzzing classification high risk space detection, GAN based high risk fuzz case generator, and fuzzing vulnerability detection that fuzzing output guided formal assumption forfeits. The details are shown in FIG. 9.

Example 4: Digital Twin Framework:
Domain-Driven and User-Centered Risk Detection
and Mitigation This thrust aims to develop a digital twin framework that could generalize the approach described in Thrust 1 and Thrust 2 and apply to the domain field in the desired research field considering the user-requirements to prioritise the risk detection and mitigation and achieve the agility in various use-scenarios. An innovative scheme was proposed to enable the integration of the domain knowledge via the interactive refinement for formal methods assumptions and properties, as well as probability re-distribution for fuzz testing. A goal was demonstrating the interaction and enhancement of the general approach and domain digital twin through a proof of concept detecting the vulnerabilities and unintended emergent behaviors in the multi-robot system where the critical decisions are made via the generated and communicated common understanding of the environment and relative poses between robots.

FIG. 10 shows the designed srsRAN-based man-in-the-middle (MITM) digital twin model to simulate emergent behavior and wildly unexpected emergent behaviors usually occurring during legitimate physical communications. In the digital twin model, fundamental functions of UserEquipment (UE) and gNodeB (gNB) are implemented by srsRAN. Furthermore, ZeroMQ (ZMQ) was used, an asynchronous socket message-transfer framework implemented with TCP protocol, as the substitute for wireless communications between UE and gNB in the digital twin. Then an MITM relay was set up, which can listen and forward the socket messages between UE and gNB, to represent attackers in the proposed digital twin model. As for core network (CN), Open5GS was used to achieve all necessary functions of 5G protocols.

As a part of the proposed digital twin model, MITM relay is responsible for message listening, modification, and recording. The following is the detailed structure of the proposed MITM relay implementation: Messaging listening: in the Up_link channel, the proposed MITM relay can listen to messages from UE by port 20023 following TCP protocol and forward the UE messages to gNB by port 2000. Same in the downlink channel, the proposed MITM relay can listen to port 2002 to get messages from gNB and forward them to port 2001 of UE. Message modification: Based on the fuzzing probability system, illustrated in the following section, the relay will take command-level and bit-level fuzzing strategies to modify the message to detect vulnerabilities. Message recording: a database was built, shown in FIG. 13, to store the history of messages, which are listened to from UE and gNB chronologically. And the database also records fuzzed cases and the status of each connection attempt.

With the updated probability system by status monitors in UE and gNB, the relay can efficiently learn the threat patterns and detect the vulnerabilities. Not limited to MITM attacks, the relay can also simulate overshadowing attacks or false Base Station (BS) attacks by message modification. The proposed relay can simulate any physical wireless attacks, which proves our relay is qualified for the digital twin of attackers in the real world.

Figure 21:
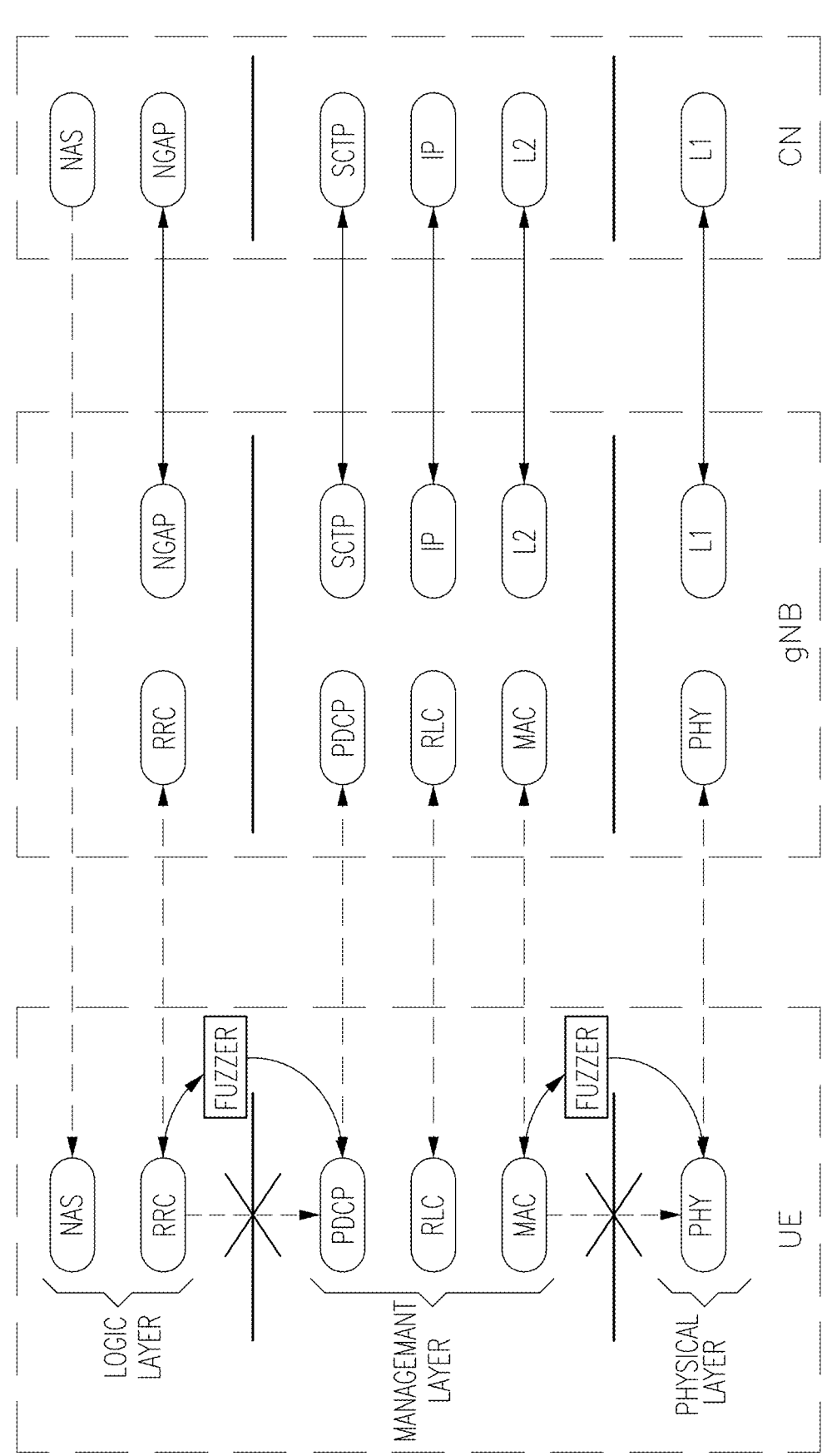
FIG. 21 is a schematic diagram illustrating fuzzing across different layers in accordance with an embodiment of the present invention.

As shown in FIG. 21, the relay model was applied across different layers. In particular, the fuzzing strategies were applied to the RRC layer and the MAC layer. The RRC layer represents the logic layer connected to the management layer, while the MAC layer represents the management layer connected to the physical layer. Fuzzing was conducted in the RRC layer on a simulation platform, where all identifiers can be modified at the function level. However, fuzzing in the MAC layer was performed on an over-the-air platform to directly change commands at the bit level. By comparing results from these layers, a more detailed mechanism analysis of the attack model based on the inherent nature of different layers can be provided. For instance, the RRC layer regenerates the checksum for integrity checks after command-level or bit-level fuzzing, whereas the MAC layer directly forwards the fuzzed message without generating the corresponding new checksum.

The virtual relay mode in the platform enables the detection of vulnerabilities through abstract and agile methodologies. It's also vital to evaluate real-world performance and potential vulnerabilities for a thorough assessment. The platform's realistic testing environment allows for detailed analysis of vulnerabilities, their impacts, and the system's resilience to various attack scenarios. In the OTA mode, depicted in FIG. 22, srsRAN was used, configured as the UE to control the USRP B210 device, facilitating communication with the Amarisoft Call Box, which acts as both the gNB and CN components. The Amarisoft Call Box can be substituted with srsRAN for an open, programmable Radio Access Network (RAN) and Core Network. However, current challenges with the stability and lack of performance benchmarks in open-source software-defined radio platforms like srsRAN, which hinder the practical application of research in industry are seen. Instead, the Amari Call Box was chosen as the benchmark framework. Communications are retrieved from the Amarisoft Call Box via SSH through a switch, ensuring no impact on connection quality and performance during tests. This setup ensures seamless integration of components, efficient data exchange and analysis, and provides a reliable, comprehensive environment for the experimental investigations.

Human errors factor in the context of error causation have been extensively studied. To address the human side of the security concerns, XRbased training and university wide IT Framework are explored for large scale collaborative research facility. Domain-driven analysis were constructed with causation inference and inductive reasoning for user-scenario based security causation, spec transparency and stack architecture. In this thrust, hierarchical Bayes Network Models (BNMs) were designed to describe security vulnerabilities and their activation, build a digital twin platform to reproduce and quantify profiles of existing protocol exploits, collect the side channel data, and automate the conversion of the profile into the BNM. The result of this thrust is macro level vulnerability detection for software stacks, decision-making with conditional assurance maximization, and prioritization of the high-risk components and protocols.

Example 5: Command Level Strategy

When the proposed system has no prior knowledge or understanding of protocols, the system will try to detect and predict vulnerabilities without any domain knowledge. All commands received by the relay will be encrypted and Fourier transformed. Even under such conditions, the system proves the ability to detect vulnerabilities in black-box environments. Especially to discover and mitigate vulnerabilities and un-intended emergent behaviors in the 5G stack with sufficient automation and adequate scalability, a protocol-independent Listen-and-Learn (LAL) based fuzzing system was designed.

The proposed LAL fuzzing system is designed to target the RRC protocols, which are recognized as one of the most critical cellular protocols for radio resources management. The RRC protocol configures the user and control planes according to the network status and allows the implementation of radio resource management. The RRC protocols are fuzzed with the srsRAN 5G platform and the tunneled Non-Access Stratum (NAS) protocols through message reorder, injection, and modification. Two-dimensional fuzzing is implemented command-level and bit-level. High-risk attack paths are identified by generating the state-Transaction graph from the command-level fuzzing results. Further timely high-risk scenarios prediction is performed with state Transaction based Long Short-Term Memory (LSTM).

By embedding the message exchange sniffer and the LSTM based prediction model in virtual wireless simulation, the LAL fuzzing system is capable of automatically and efficiently determining the command-level fuzzing message according to the states of UE and gNB. Besides, as the designed framework is protocol independent, it can be quickly adapted and transferred to new-released code stacks and protocols. For example, it can be easily turned into a hybrid design to provide assurance and formal threat detection for 5G software stacks by combining deterministic detection approaches such as formal methods. Finally, an LSTM model is incorporated based on rapid vulnerability detection. This prediction model enables proactive defenses against potential attacks through learning the early-stage abnormal state transaction paths. In short, the designed LAL fuzzing system can be applied to 5G and nextG architectures (e.g., ORAN) for real-time vulnerability and unintended behavior monitoring, prediction, detection, and tracking.

State recording: The authentication and authorization scheme in 5G, being viewed as a finite state transaction, enables the graphics-based analysis to identify the pattern of the risks. During the fuzzing, the recorded states include the following information: 'message time', 'original bytes', 'RRC channel', 'message type', and 'physical channel'. 'Message time' represents message sending time, and 'RRC channel' indicates which protocol should be used for message decoding. The RRC procedure of the UE can be uniquely identified with the 'Message type'

Due to a lack of domain knowledge about encryption and transformation, a general 5G protocol is used, pycrate, to interpret the first six hex values and select the cross mapping of interpreted 'message type' as the identifier to a state. Even though this interpretation approach cannot provide the correct translation of command, the feasibility of vulnerability detection and prediction can still be proven hereinbelow. Besides, the 'rrcConnectionSetupComplete' message is used as the identifier of the successful completion of RRC establishment. When the monitor in gNB detects the 'rrcConnectionSetupComplete' message, the testing case will be terminated and labeled as a successful connection. When the monitor in gNB cannot detect the 'rrcConnectionSetupComplete' message within a predefined timeout limit (600 seconds in the proof of concept experiments), it is considered a failed connection.

Figure 13:
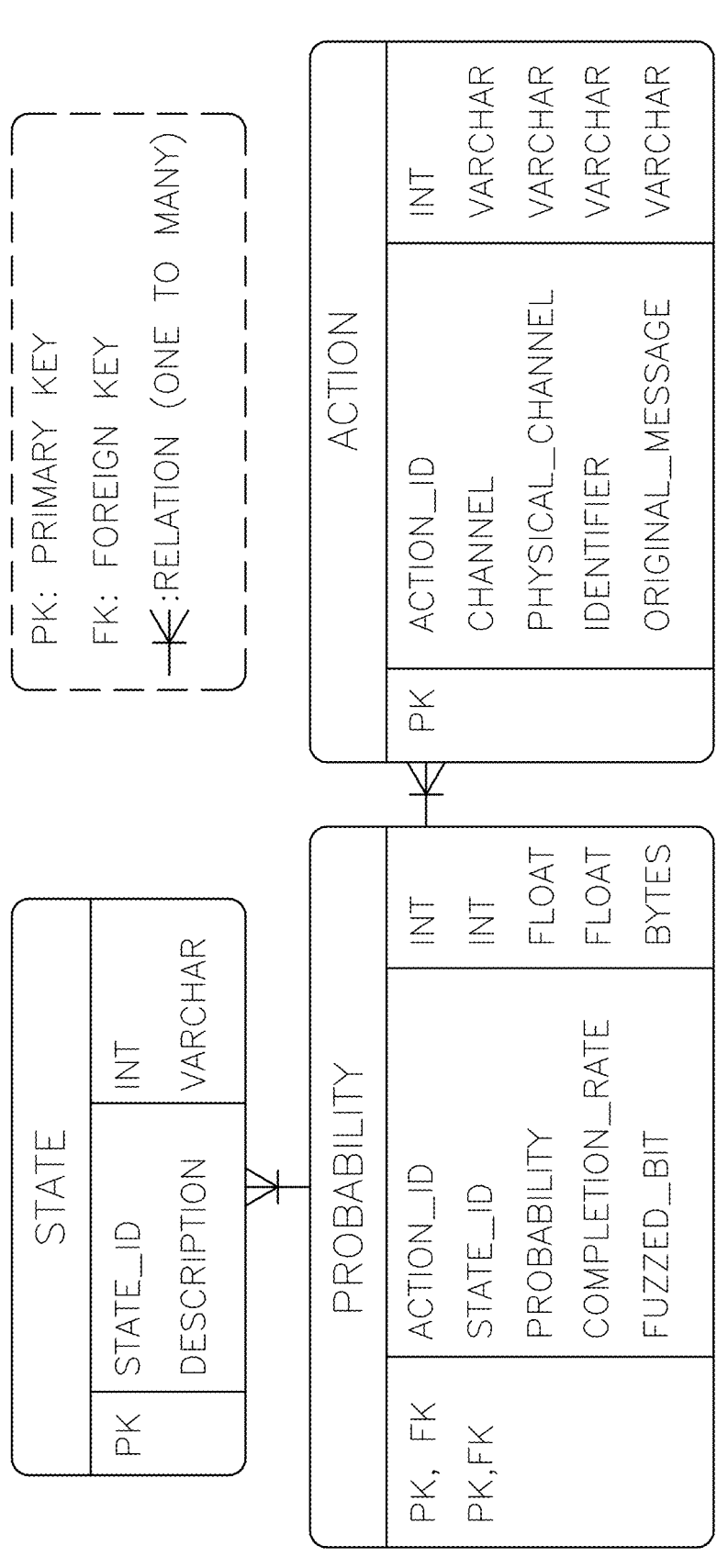
FIG. 13 is a schematic illustration of a database in accordance with embodiments of the present invention.

A database was built to record the state and fuzzing cases. FIG. 13 illustrates the structure of the database. The foreign keys in FIG. 13 are generated from the primary keys of the refereed table like 'action id' is generated from the primary key 'action id' in table Action. The statements of each table are described in the following:

State: Each state represents the state of RRC status. For each message sent from either UE or eNB, the system will update the description of sent commands in the table state.

Action: Each action item records the parsed message, whose channel and physical channel represent where the commands come from.

Probability: Each probability item records the probability of fuzzing cases for corresponding states and actions. If one fuzzing case leads to RRC connection failure, the probability increases. The completion rate indicates the record of bit-level fuzzing and will be none if there is only command-level fuzzing.

Command-level Fuzzing Strategy:

Command-level and bit-level fuzzing are two primary protocol fuzz testing approaches. They are also common approaches for protocol attacks. Compared to bit-level attacks, which require time and frequency synchronization along with information in UE profiles, command-level attacks are usually low-cost and less information is needed. Hence, command-level fuzzing to detect vulnerabilities under a black-box environment is emphasized herein.

For fuzzing purposes, the LAL observes and collects the exchanged legitimate messages and saves them to the fuzzing message candidate pool. At the command level, commands are replaced by other commands in the same physical channel to test whether any communication error state occurs. More specifically, fuzz testing is implemented iteratively through each case in the pool. Within each loop, UE and gNB for connection initialization is simulate. Then the observed message type is decoded to get two primary RRC identifiers: 'interpreted message type' and 'interpreted RRC Transaction Identifier'. If the message in this physical channel has never been observed before, the message is recorded and marked with the corresponding channel. Moreover, if there is still any unapplied message replacement, this replacement is adapted and deleted in the recording. Due to the change of temporary identifiers, such as rnti, most of the replaced messages are illegal for UE or gNB. In this way, the fuzz testing framework replaces messages with not only regular ones but also abnormal messages since the number of message permutations grows with the increasing number of cases. Due to no requirement of prior knowledge, LAL can be quickly adapted and transferred to newly-released code stacks and protocols.

Figures 14, 14A:
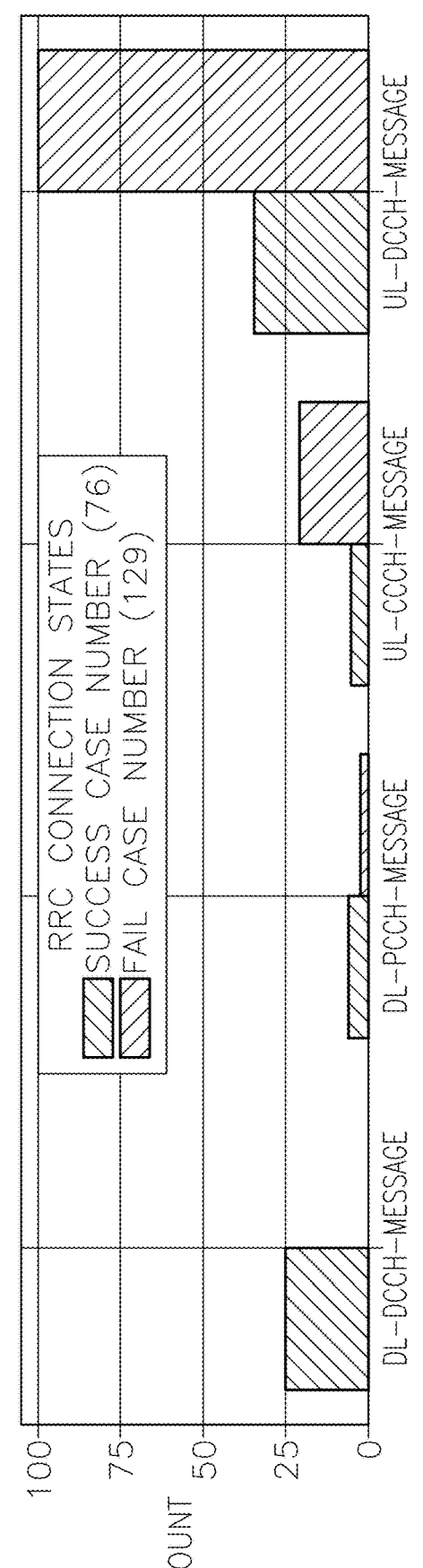
FIG. 14 is a graph illustrating RRC connection state fuzzing distribution.
FIG. 14a is table showing a fuzzing testing and state distribution in different types according to an embodiment of the present invention.

Result Assessment:

For the State Based Vulnerability Prediction Model: as commands are listened to and selectively added to the candidate pool during operation, the system needs to traverse the commands in the pool with priority orders to perform command-level fuzzing. As an initial step to command priority exploration, the RRC connection state distribution of commands fuzzing at various channels in FIG. 14 is shown, where Downlink (DL) and Uplink (UL) in the x-axis represent downlink and uplink channels, respectively. Among a total of 205 collected fuzz testing cases with RRC procedures, there are 76 successful connections and 129 failed connections. The majority of the failed RRC connections are through uplink fuzzing. The failures in the downlink fuzzing channel are primarily caused by PCCH Messages, which are used for paging the UEs whose cell location is not known to the network.

From the distribution, it can be concluded that the downlink channel protocols are more robust with unintended messages, and uplink channels are more vulnerable than the downlink.

However, due to PCCH-Messages' broadcast and explicit content nature among the downlink channel, its vulnerability could affect a more extensive range of communications and potentially cause a DoS attack for all UEs within the cell of the BS.

For the 129 failed connection in FIG. 14, high-risk states are identified as those with high frequencies in failed connections. The results show that no state only appears in failed connections but not in successful ones. 7 high-risk states with higher frequencies than the average were identified. However, the RRC connection failure cannot be fully covered with those high-risk states solely as rule-based detection. Therefore, a transaction-based detection waws introduced using the sequenced states to enhance vulnerability identification.

For Vulnerability Identification via State Transaction: With the sequence of fuzzing tests being executed, the system automatically generates a state transaction probability map. The probability map predicts the connection risks, and further rerouting strategies can be developed to avoid certain states and transactions that may potentially lead to RRC connection failures. The RRC state changes from one to another are defined and recorded as a transaction. It can be graphically represented to show the state and transaction during the RRC procedures as the vertex and edge to ease further graphics-based analysis for risk identification and prediction.

Figure 15A:
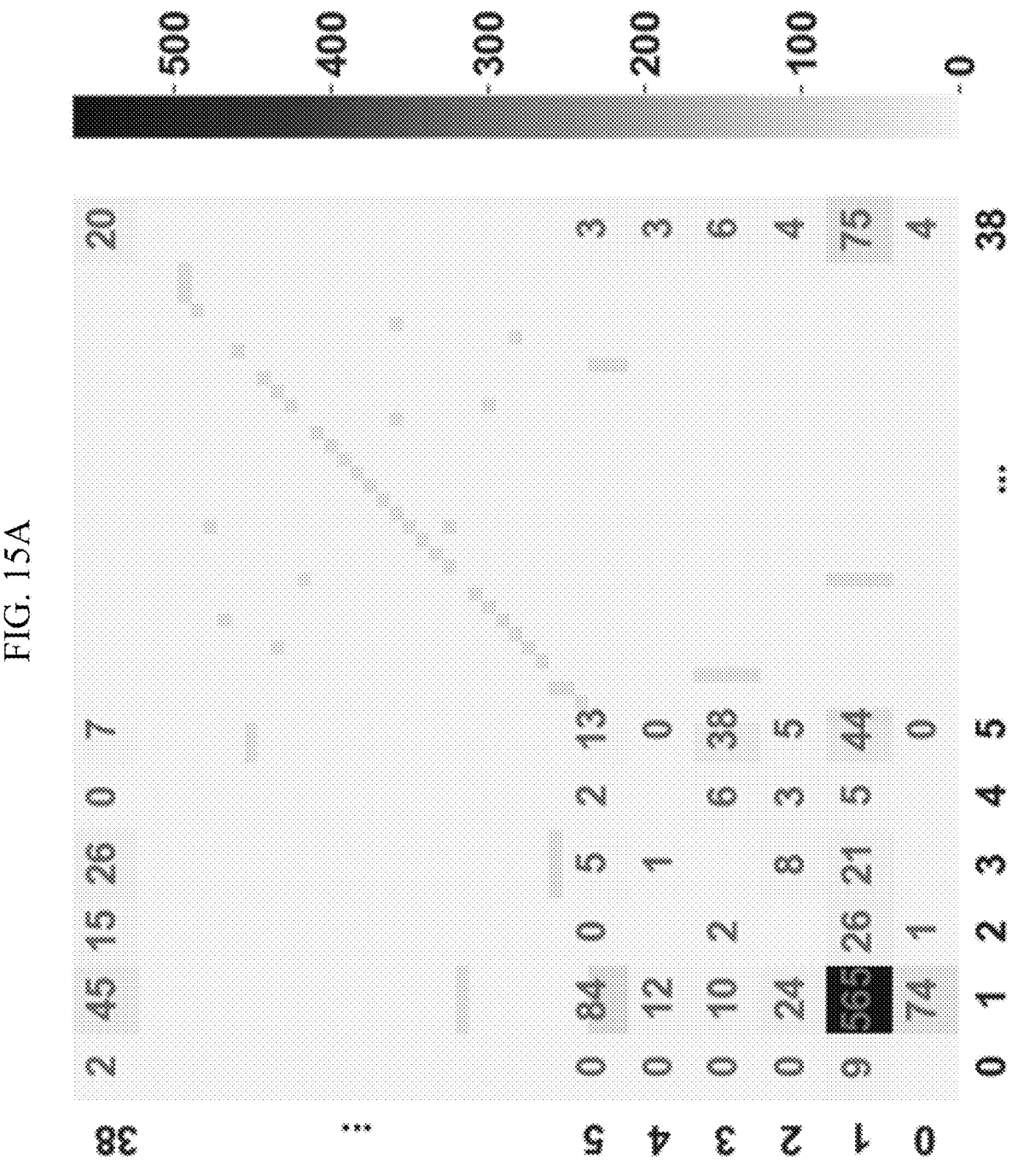
FIGS. 15a and 15b are graphical illustrations showing state transaction frequency on a successful connection (15a) and a failed connection (15b)
Figure 15B:
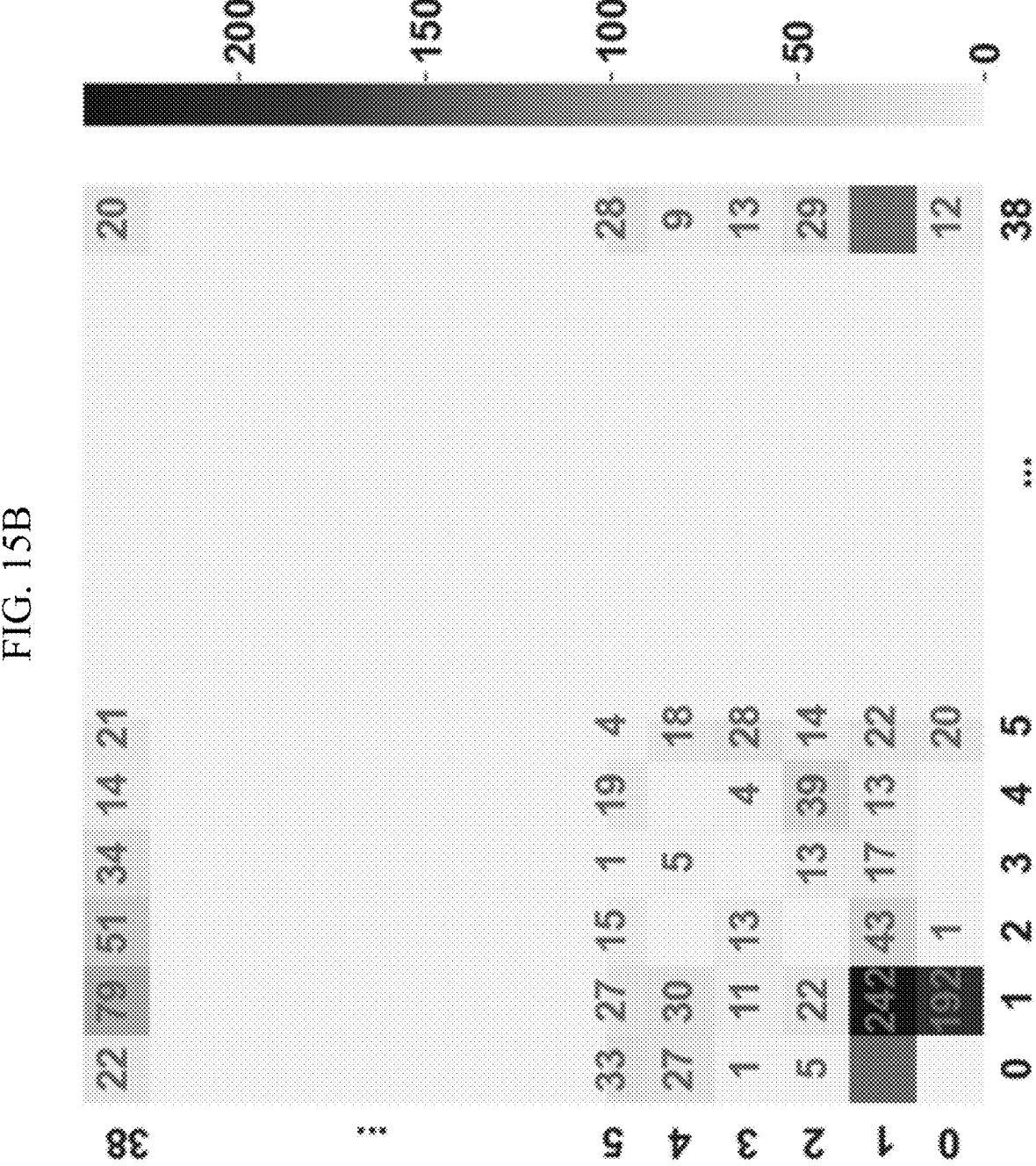

The occurrence of the state-transaction cases can be used for the rule-based prediction of failed connections. FIG. 15 shows the state transaction frequency on successful (15A) and failed (15B) connections, from which we can observe 7 high-risk state-transaction cases that almost only occur in failed connections. This rule-based prediction using transaction frequency is more trustworthy compared to the prediction based on state frequency. Because among all 7 high-risk state transactions, there is only one transition: from state 0 to state 2, occurring in a total of 76 successful connections for only one time. By further looking into the results of FIG. 7, it is observed that 70.54% failed connections include at least one high-risk transaction. Hence, given that recall equals 70.54%, a more accurate algorithm is necessary to identify and predict RRC connection failures. In the following, an LSTM based vulnerability prediction on providing high-confidence predictions is presented.

Figure 16A:
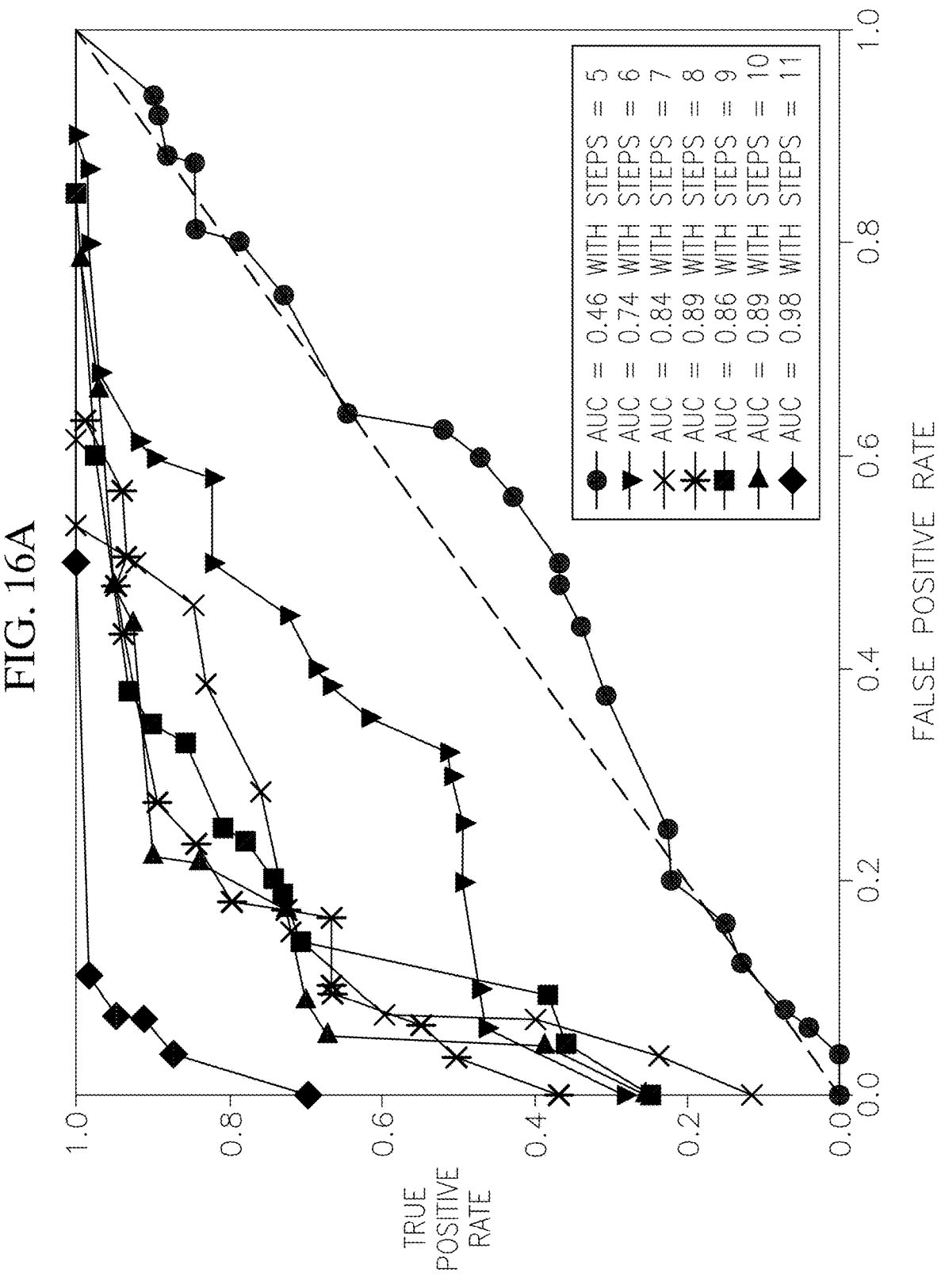
FIGS. 16a and 16b are graphs showing receiver operating characteristics (ROC) analysis of LSTM over steps (a) and duration (b)
Figure 16B:
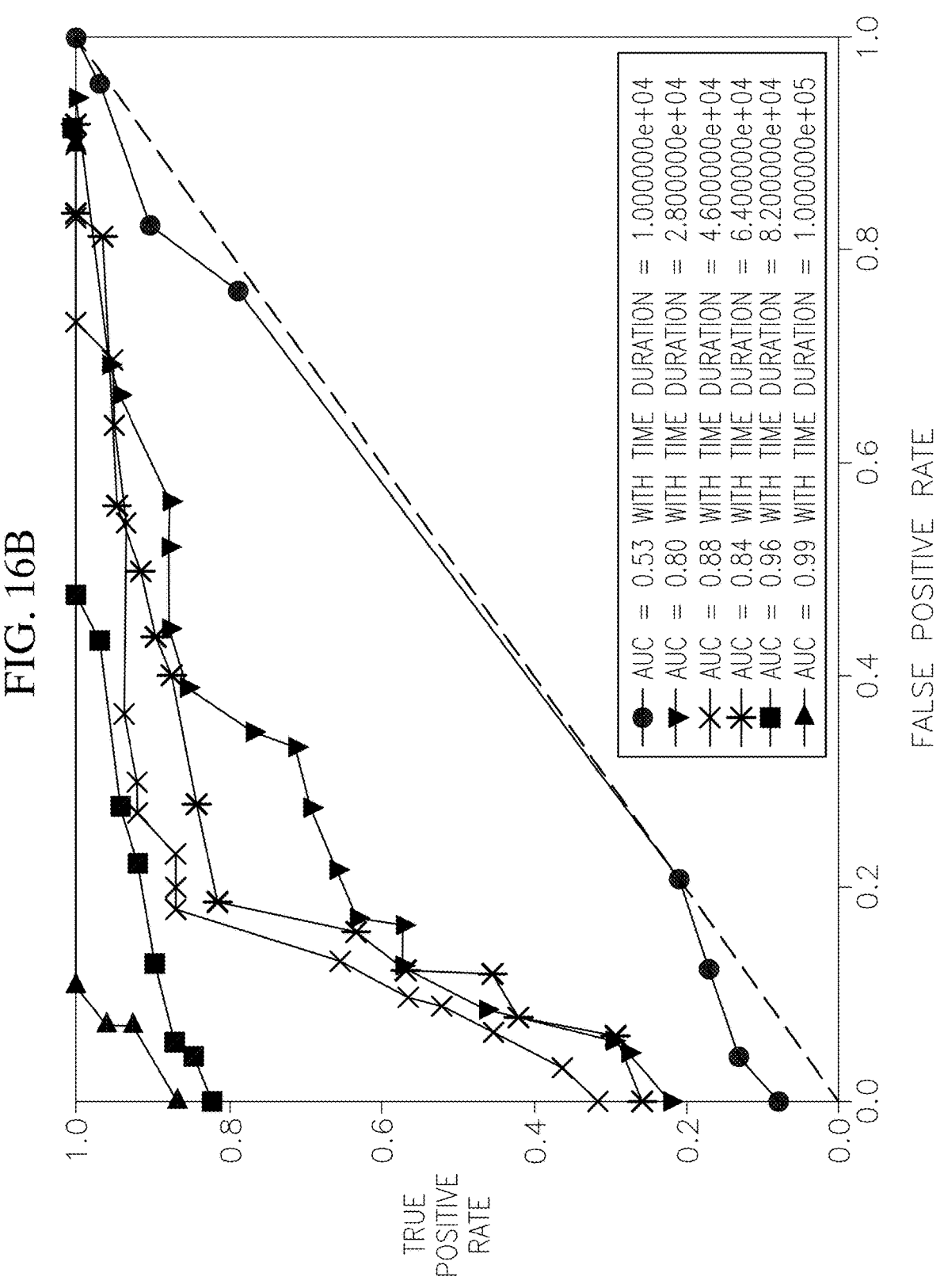

For LSTM Based Vulnerability Prediction: The results show that the statistical and rule-based classification can only achieve recall of up to 70.54%, which is unreliable in practice. Therefore, an LSTM based vulnerability prediction model for reliability enhancement and early prediction was designed. With the early prediction of RRC connection failures, an RRC state rerouting strategy can be employed to avoid the failures. The input of LSTM is defined as the sequenced states from the fuzzing occurrence and the length of the sequenced states as the cut-off length. The cut-off length determines how long a state transaction path can be to be sufficient to meet the expected accuracy. Two approaches are used to specify the cut-off length: duration from beginning and number of states from beginning. To avoid overfitting, 20% of the dataset is used as testing data and 0.001 as the learning rate of the model. Moreover, for each input size, the accuracy, precision, and recall are averaged over 100 runs. Each run includes 30 epochs, and each epoch includes 10 batches. As shown in the performance evaluation of both approaches in FIGS. 16A-16B, accuracy grows with the increasing number of steps or times and increases sharply after the 8th step.

To balance the performance and reaction time, Receiver Operating Characteristics (ROC) curves were generated over steps and duration to find the strategy with the least cut-off length and almost 90% Area Under the ROC Curve (AUC). From FIG. 16A, 10 steps is the optimal strategy that achieves stable 89% AUC. And it appears that 0.08 s is the optimal strategy that achieves 96% AUC. Therefore, we 10 steps and 0.08 s are taken as the input to do deeper analysis on the converge performance of LSTM. From converge performance of LSTM, it was found that LSTM can learn the optimal parameter in 2 or 3 epochs. The fast convergence suggests that the presently disclosed system has the ability to learn the pattern of failed connections. The average cut-off duration of 10-th steps was 0.072 seconds with the accuracy achieving 89%, which is consistent with setting the cut-off length as 0.08 seconds through the duration cut-off approach. The accurate and timely prediction also provides sufficient time for proactive defense before RRC connection completion or failure, with an average of 3.49 seconds.

With an average performance of LSTM meeting the accuracy expectation, the failed predictions can be analyzed, including False Positive and False Negative ones, for further improvements. The following patterns are summarized as misclassified cases.

False Positive: When there are three messages, which are interpreted as paging messages, sent by gNB within the first ten states in connections, the model may misclassify this connection as a failed one. Because most of the failed connections also have three paging messages in the first ten states. This pattern can be addressed by a finer definition of paging messages in future work.

False Negative: The cases with multiple times of interpreted active set update messages in downLink channels are classified as failed connections and lead to false alarms. A high frequency of interpreted active set update messages occur more frequently in successful connections. Cross-layer or side channel information could be applied to improve the false alarm rate in future work.

Figure 17:
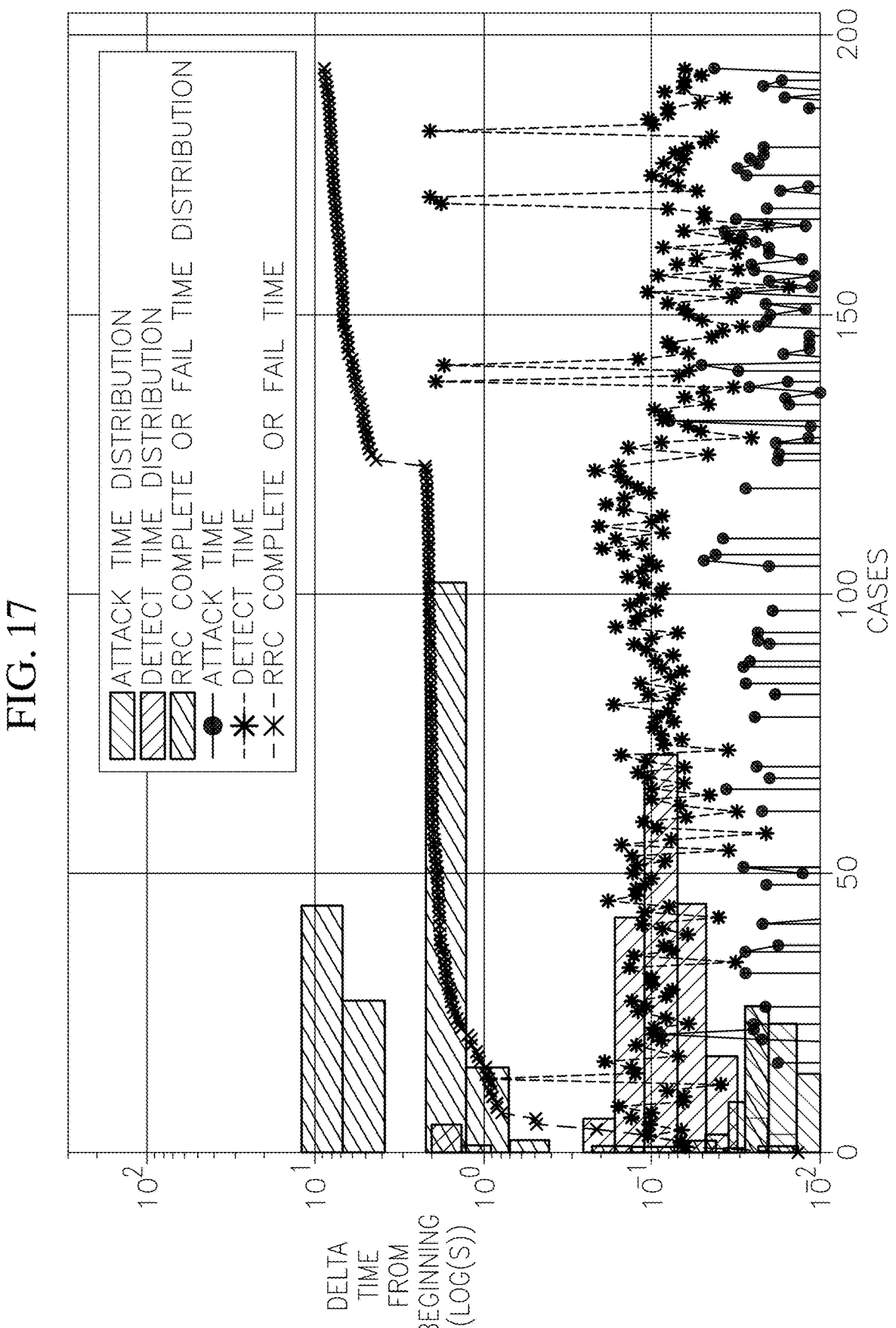
FIG. 17 is a graphical comparison of detection time and completion time in accordance with embodiments of the present invention.

The proposed vulnerability and unintended behavior detection system could also be applied in real-time, in compliance with O-RAN architecture. When deployed for real-time monitoring, timing in detection is beneficial to mitigate the vulnerabilities and provide assurance and high-quality communications. There are sufficient intervals, an average of 3.49 seconds, between successful detection time and RRC connection success/failed time, as shown in FIG. 17, which gives enough defense time for potential attacks. Moreover, there are smaller gaps between fuzzing occurrence time and successful detection time.

Example 6: SyAL Domain Assisted Strategy

Synchronization in the generated random identifier of each fuzzing case enables more domain information background available for an MITM attacker, including command type and critical identifier values. Leveraging the domain knowledge, a probability-based command-level fuzzing system is proposed that helps the digital twin MITM attacker be more efficient in prioritizing and locating the more vulnerable areas. In the proof of concept of this study, the Radio Network Temporary Identifier (RNTI) of UE is fixed to keep commands synchronized in different fuzzing cases. RNTI is the cyclic redundancy check (CRC) mask, which is generated in synchronization procedure and required to encode and decode the Downlink Control Information (DCI) message. The synchronized commands provide domain-assisted background knowledge for the digital twin MITM attacker. Furthermore, the proposed probability-based command-level fuzzing system takes a Sync-and-Learn strategy to learn the vulnerability pattern efficiently and prioritize high-risk commend-level fuzzing cases. The result of this study proves the significance of timing in the 5G Authentication and Key Agreement (AKA).

For Not Illegal Command-level Fuzzing in the Not-illegal Not-valid Set: Besides the illegal command-level fuzzing in LAL, the illegal command-level fuzzing merits further work, which contains correct identifiers and can be appropriately interpreted by UE and gNB. Through changing the occurrence timing of not illegal commands, a path can be found that can transfer from 'green zone', valid states, to 'yellow zone', not illegal and not valid states, in FIG. 12. This part of the experiment provides substantial proof of the feasibility of the listen-and-replace relay attack directed by a part of the communication context. Due to the limitation of the large capacity for command-level fuzzing permutations, the downlink channel was emphasized, which is sent from gNB and is more vulnerable than the uplink. All messages in the downlink channel are duplicated with the same RNTI and belong to legal or not illegal commands (the 'green zone' or 'yellow zone' in FIG. 12).

For Probability-based Fuzzing Strategy: With the domain knowledge of message types, a probability-based command-level fuzzing system is proposed to learn the vulnerability pattern efficiently and prioritize high-risk command-level fuzzing cases. The efficiency of the proposed probability-based command-level fuzzing system outperforms traditional fuzzing systems, like brute force fuzzing.

Algorithm 1 describes the detailed process of a probability-based fuzzing system. First, a database is built up to store all commands in the downlink channel. Then a command-level fuzzing probability matrix D.p is initialized, with the size of n×n, wherein n is the number of commands, to represent the probability of command fuzzing cases. The value of $D.p_{i,j}$ means the probability of the fuzzing case, which changes from command i to command j, is high-risk. After initialization, the system updates the command-level fuzzing probability matrix based on the fuzzing result after each fuzzing test. The command-level fuzzing probability matrix update follows the independent rule: the system can only update the row and column corresponding to fuzzed commands. Moreover, in each fuzzing case, the system uses the proposed digital twin MITM attacker to generate fuzzing cases based on the value of the command-level fuzzing probability matrix D.p.

Figure 18B:
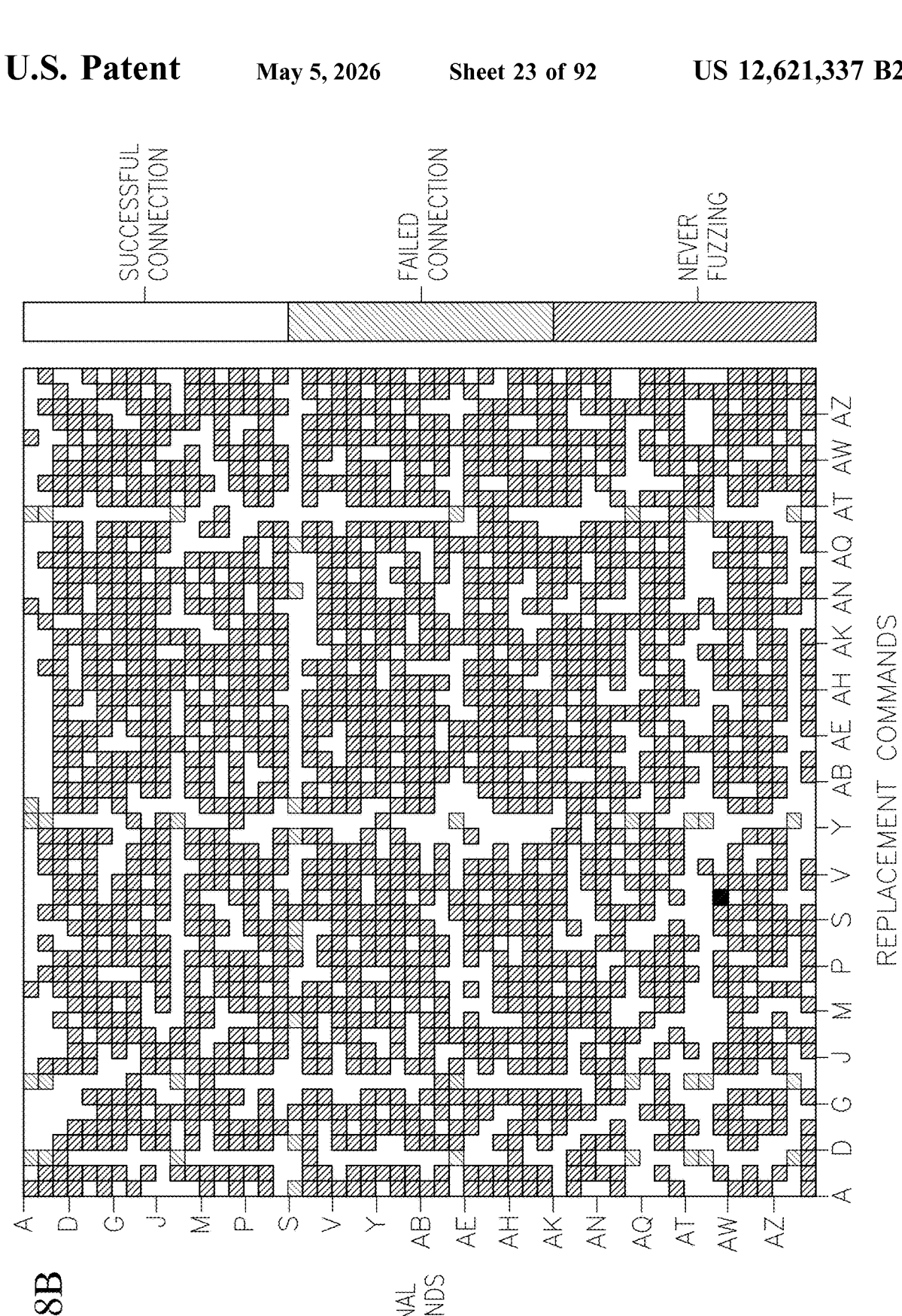

For Result Assessment: As mentioned in FIG. 17A, there are 3080 possible fuzzing cases and only 43 vulnerabilities. In FIG. 18, fuzz testing tracks of two fuzzing strategies are presented: random fuzzing and probability-based fuzzing, until all vulnerabilities are found. In FIG. 18A, there are 2811 fuzzing cases fuzzed by the random fuzzing strategy until all vulnerabilities are found. However, the probability-based fuzzing strategy takes only 1027 fuzzing cases to get all vulnerabilities in FIG. 18B. Therefore, it can be easily concluded that the probability-based fuzzing strategy can locate the vulnerabilities much more efficiently than the random fuzzing strategy.

Figure 19:
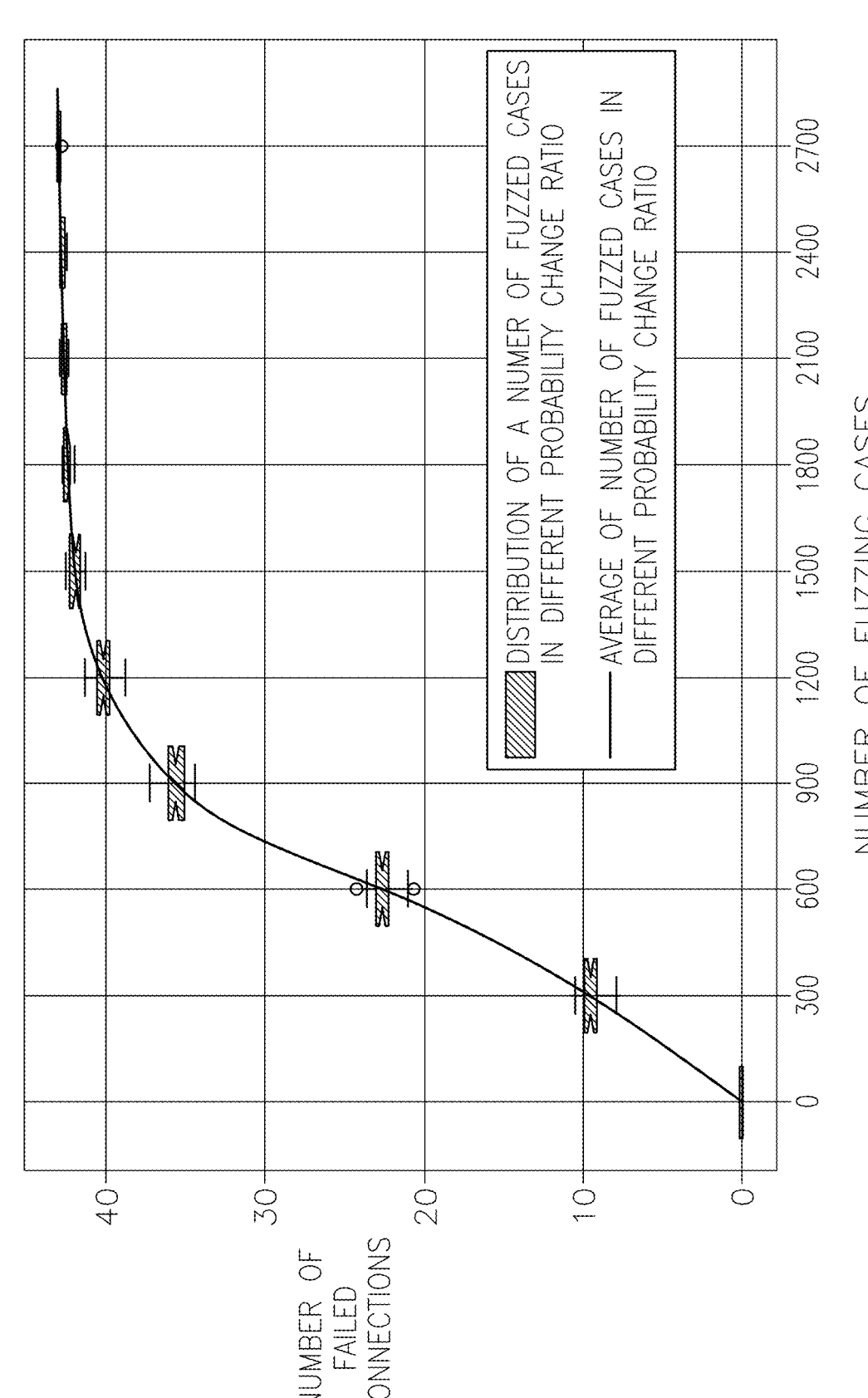
FIG. 19 is a graph illustrating sensitivity analysis of different probability ratios.

Further, we the hyper-parameter strategy was used with the permutation of change percentage a from 0.1 to 2 and failed attenuation ratio from 0.9 to 0.1 to get the optimal parameter set for probability-based fuzzing strategy. However, the result of the hyper-parameter, which is shown in FIG. 19, provides an intuition that the modification of the probability ratio makes no difference in the gradients of the vulnerability detection ratio curve. Even a larger increasing probability ratio may speed up the detection in the first period; the final estimated number of steps to detect all vulnerabilities is almost indistinguishable.

Figure 20:
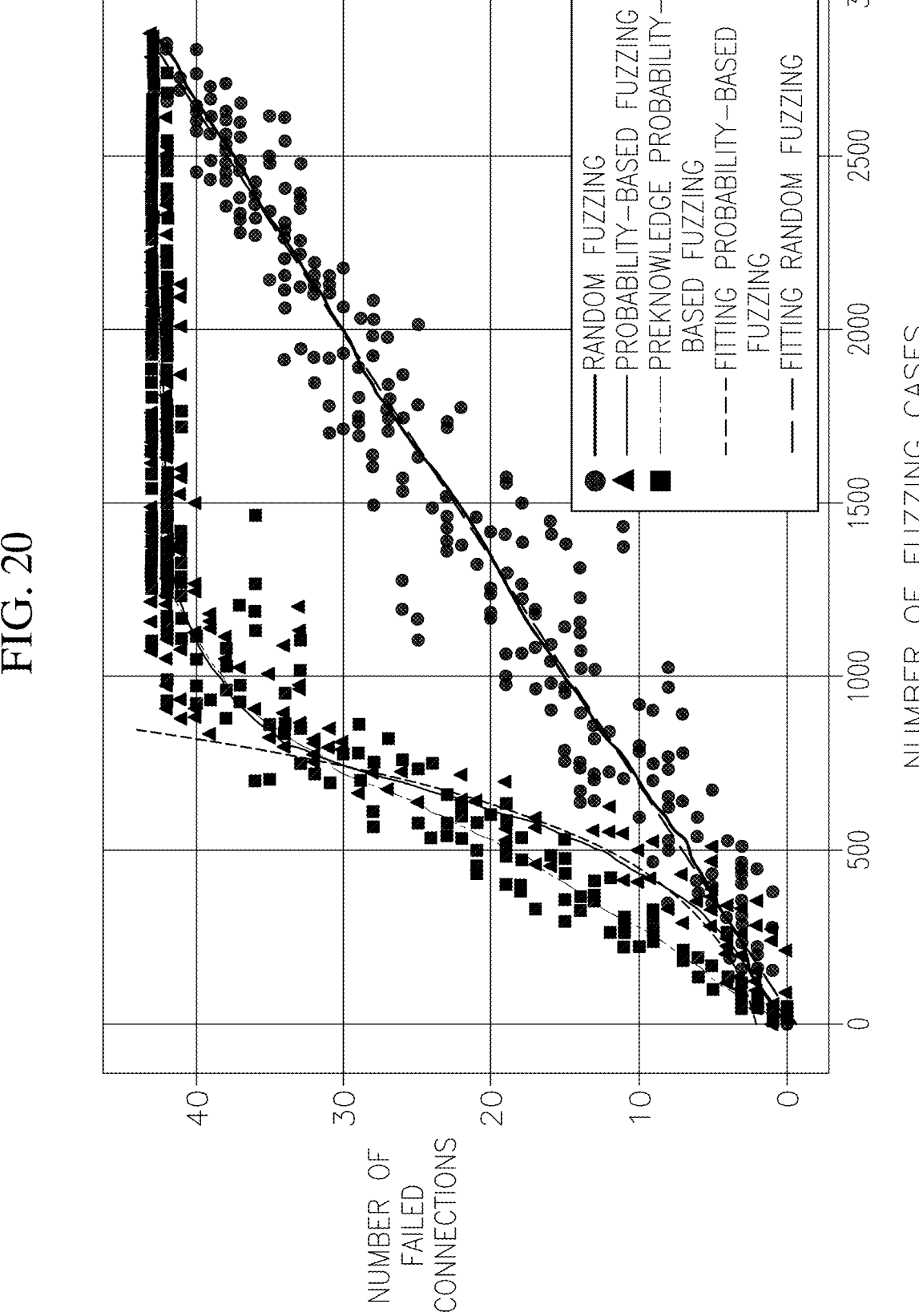
FIG. 20 is a graph comparing fully and probability based fuzzing methods.

Several algorithms are used to fit strategies and generate the best representations for each strategy. With the assumption that the number of fuzzed cases is i, it is found that the regress exponential algorithm, $2.072 \times e^{0.004i}$ line in FIG. 20, is the best fitting algorithm to the beginning period of probability-based fuzzing with R2 value of 0.972. And for the end of probability-based fuzzing, vulnerabilities that do not follow the learned pattern are the primary reason for slowed-down growth, like the case which changes command AV to command U shown as the black square in FIG. 18B. Furthermore, for random fuzzing, the linear algorithm, 0.015i-0.617 line in FIG. 20, is the best fitting algorithm with R2 value of 0.987.

To accelerate the speed of vulnerability detection in the beginning period, a probability-based fuzzing strategy with extra prior knowledge was designed. In the pre-knowledge probability-based fuzzing strategy, two arbitrary vulnerabilities are assigned as the extra prior knowledge to skip the pattern collection procedures in the beginning period. Each strategy was run 20 times, and the average and part of random points are plotted in FIG. 20. The random fuzzing strategy has the worst performance among the three strategies, and the other strategies have similar performance except for the beginning period. In the beginning period, the prior knowledge can provide a local gaudiness for the probability fuzzer to efficiently locate the vulnerabilities, which is twice faster than the probability-based fuzzing strategy, especially in the first 500 fuzzing cases. The extra prior knowledge can be exploited to speed up the short-term efficiency of vulnerability detection.

To better understand the detected vulnerabilities in the proposed probability-based fuzzing strategy, some commands were chosen as samples, listed in FIG. 20A, to analyze and evaluate their impacts on both the RRC layer and the MAC layer. The results, as shown in FIG. 20B, indicate that reactions vary between different layers. For instance, replacing command A with command B in the RRC layer will pass the integrity check at the gNB but lead to a failed connection due to the inconsistency caused by the command substitution. However, replacing Command A with Command B in the MAC layer will lead to repeated transmission of commands from the UE, effectively resulting in a Denial of Service (DoS) attack.

Example 7: SoAL Bit-Level Strategy

Source-and-Learn (SoAL) Bit-level Strategy provides a digital twin of some active attacks such as overshadowing, which can change part of identifier values of communicated commands. In this strategy, two approaches are taken, before-encryption and after-encryption, to represent two different scenarios: with domain knowledge and without domain knowledge. Compared to the traditional psychical overshadowing test, the proposed bit-level strategy achieves efficient vulnerability detection, which helps the fuzzing of more vulnerable cases and allows for focus on the protocol.

For Risk Prioritized Fuzzing strategy: Bit-level fuzzing involves randomly changing the value of different identifiers in the specific command to generate different fuzzing cases. Following the guidance of command-level fuzzing, more efficient bit-level fuzzing can be undertaken to locate vulnerabilities. For instance, based on the result of command-level fuzzing, bit-level fuzzing can first be done on these high-risk commands, e.g., command C and command H in FIGS. 18A-18B.

During the bit-level fuzzing procedure, a message detection and multi-lists of identifiers were set which cover the value range. For any specific message, the system takes a random value which has never been used to replace the identifier. There are two replacement strategies on bit-level fuzzing: before-encryption and after-encryption. The before-encryption approach is to change the identifier values before the protocol encryption while after-encryption approach is implemented in a reserved way. In this way, all possible fuzzing cases can be tried to specific identifiers in special commands.

For Result Assessment of Bit-level Fuzzing: Based on the result of Qpaque command-level and domain probability-based command-level fuzzing, as shown in FIG. 20A, three high-risk commands, 'RRC Setup Request,' 'RRC Reconfiguration,' and 'RRC connection,' are selected as the bit-level fuzzing target.

In the 'RRC Setup Request' command, fuzz is conducted with both the before-encryption and after-encryption approaches. For the before-encryption approach, there were three identifiers: 'ue-Identity', 'Establishment Cause', and 'spare'. Since the 'spare' identifier never contains critical information and only occupies 1 bit, only do bit fuzzing is done on 'ue-Identity' and 'Establishment Cause'. As shown in FIG. 20A, any value for 'ue-Identity' will not affect the connection. However, a different value of 'Establishment Cause' can make connection transfer into different service types. For example, if the 'Establishment Cause' us changed from bit 0110 to bit 0000, UE can only request an emergency call.

Moreover, with the after-encryption approach, all fuzzing cases lead to disconnection. This shows the integrity check for 5G protocol can identify whether the message is modified or not. To further analyze the mechanism of the attack model across different layers, the 'RRC Setup Request' command was used as an example, as detailed in FIG. 20D. In the MAC layer, all fuzzing attempts, regardless of the command identifier, result in failed connections. This outcome clearly indicates that an integrity check is important during the authentication process, as bit-level fuzzing without regeneration of the integrity check-sum effectively simulates a Denial of Service (DoS) attack.

Except for the 'RRC Setup Request' command, the other two downlink commands, 'RRC Reconfiguration' (command C in FIGS. 18A-18B) and 'RRC Connection' (command H in FIGS. 18A, 18B) can be fuzzed. In 'RRC Reconfiguration' command, 'sr-ConfigIndex' is chosen as the target because this identifier is responsible for radio scheduling and important for connection establishment. However, no matter how the 'sr-ConfigIndex' was modified, the connection between UE and gNB can still be established. On the contrary, the identifier 'srbl srn id' is fuzzed in the 'RRC Connection' command with different values, UE rejects the connection establishment. Therefore, it can be concluded that UE may have alternative methods to negotiate the 'sr-ConfigIndex', but cannot accept a new 'srb id'.

Figure 23:
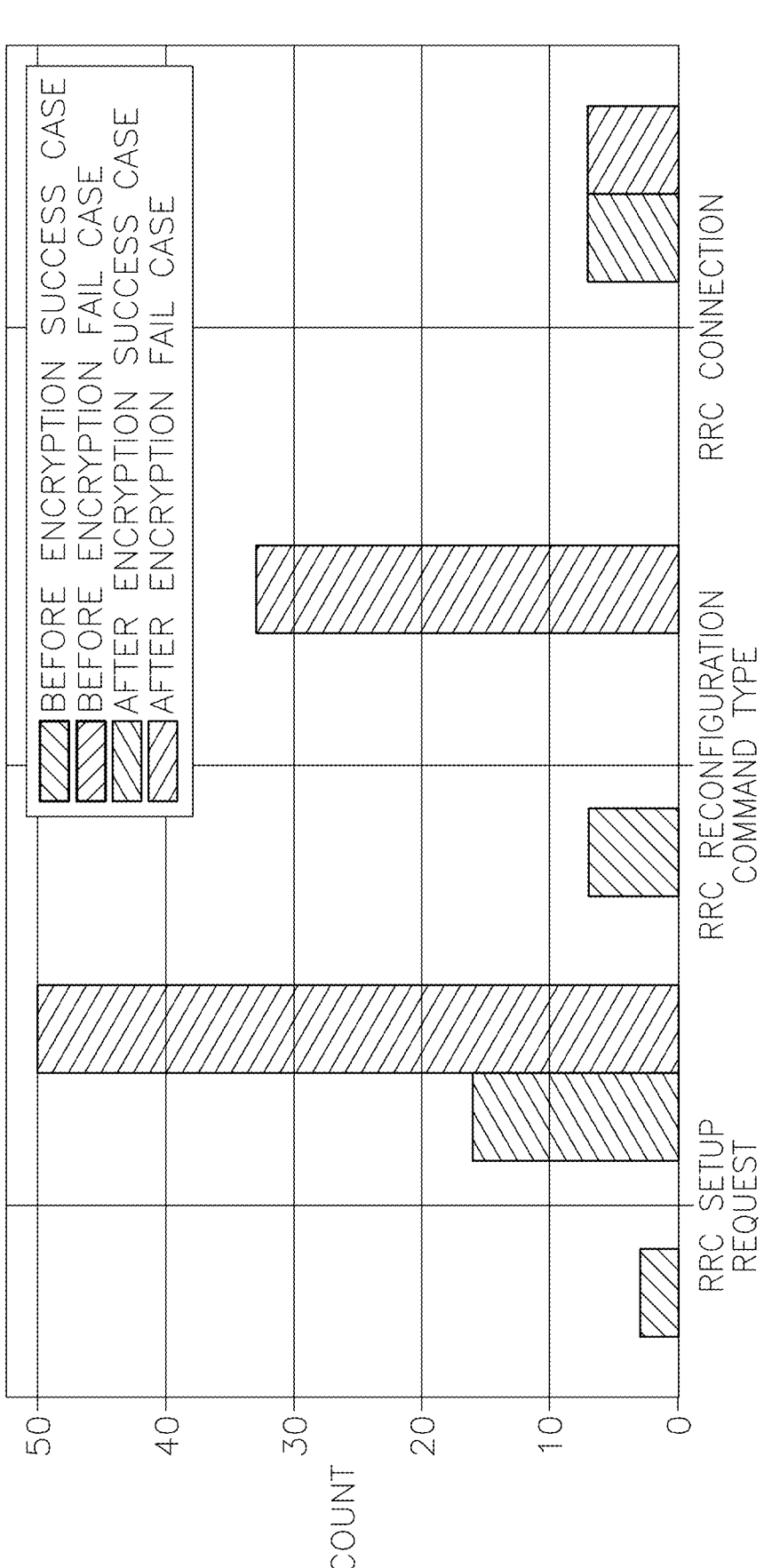
FIG. 23 is a graph, illustrating an RRC Command Level Fuzzing Distribution in accordance with an embodiment of the present invention.

In FIG. 23, the system shows the ability to detect vulnerabilities efficiently. Among all 33 possible before-encryption cases, the system detects 10 vulnerabilities. As for the after-encryption approach, it was found that it is unlikely to find a successful case because of the integrity check. Hence, it is concluded that only fuzzing before-encryption is the appropriate way for vulnerability detection in bit-level fuzzing.

Example 8: Comparison Analysis

As shown in FIG. 23A, in the landscape of fuzzing methodologies, the models of Examples 5-7 (LAL, SyAL, SoAL) emerge as a sophisticated evolution from existing paradigms represented by BASESAFE, BaseSPEC, FIRMWIRE, LTE-Fuzz, LTEInspector, and Directfuzz. Each model is characterized by a specific approach that dictates the required level of pre-knowledge and the degree of automation in the fuzzing process. Adopting a black box approach, the LAL model eliminates the requirements for complex system knowledge and gets the capacity of automatically command-level fuzzing. This model enables an extensive evaluation of the system's external interfaces, independent of the internal architecture. This black box approach contrasts sharply with the semi-automated, white box strategies of models like BASESAFE and BaseSPEC, which require comprehensive internal system understanding for testing baseband and conducting non-task boundary fuzzing, respectively. On the other hand, the SyAL model is categorized within the grey box domain, denoting a moderate level of protocol structure comprehension, thereby refining the precision of the fully automated bit-level fuzzing capabilities. This model offers a compromise, bridging the extensive system insight required by white box models—such as LTEInspector, which engages in rule-based, command-level fuzzing with full access to LTE source software—and the no-prior-knowledge approach embodied by LAL.

Lastly, the SoAL model parallels the white box strategies by employing an exhaustive knowledge-based, semi-automated strategy with bit-level fuzzing. Compared to FIRMWIRE's prerequisite of baseband initialization through boot procedures, this approach can thoroughly examine the system's vulnerabilities without root privilege. Various models are collectively presented with different automation levels and knowledge prerequisites, enabling them to be flexibly deployed across various testing scenarios. The LAL model is notable for its operational independence from system pre-knowledge; SyAL strikes a balance with limited insight into the protocol structure; and SoAL aligns with traditional white box methods in its detailed approach but surpasses them in automation efficiency.

Overall, Examples 5-7 embody a novel fuzzing approach that systematically and cumulatively detects vulnerabilities for 5G and NextG protocols. The approach is designed to detect, characterize, predict, and reveal vulnerabilities with varying levels of prior knowledge assumptions for attackers, beginning from no prior knowledge to full source code access. A digital twin framework was proposed and three fuzzing strategies were developed: LAL (black-box fuzzing), SyAL (gray-box fuzzing), and SoAL (white-box fuzzing). In black-box scenarios where no prior knowledge of the platform is known, the LAL strategy randomly arranges the sequence of commands. In gray-box scenarios where partial access to information is allowed, the SyAL strategy randomly replays the record commands with access to critical synchronization information for potential user information collection, which is similar to RNTI. When the system is a white-box that supports full access to source code, the SoAL method performs bit-level fuzzing guided by the command-level fuzzing of LAL and SyAL for risk analysis transparency and reasoning.

In particular, the LAL strategy detected 129 vulnerabilities with 39 command types using only transmitted messages, and the embedded LSTM model efficiently predicted over 89% of connection failures in 0.072 seconds on average. Then a probability-based vulnerability detection method in the SyAL strategy was proposed, which achieves a linear growth of time cost with system size and allows for the detection of all vulnerabilities with partial user privacy information. This outperforms traditional fuzzing models with exponential growth of time consumption. In addition, based on the results of the SyAL strategy, the proposed SoAL method not only validates the integrity mechanism of 5G protocols but also detects three types of man-in-the-middle (MITM) vulnerabilities that are critical to protocol security. Extensive simulation results demonstrated that the designed fuzzing system is an efficient, automated approach that supports real-time vulnerability detection and proactive defense for existing 5G platforms and future released protocols.

Example 9: Auto-Modeling of Formal Verification for NextG Protocols: A Multimodal Cross- and Self-Attention Large Language Model Approach This example introduces Auto-modeling of Formal Verification with Real-world Prompting for 5G and NextG protocols (AVRE), a novel system designed for the formal verification of Next Generation (NextG) communication protocols, addressing the increasing complexity and scalability challenges in network protocol design and verification. Utilizing Large Language Models (LLMs), AVRE transforms protocol descriptions into dependency graphs and formal models, efficiently resolving ambiguities and capturing design intent. The system integrates a transformer model with Large Language Models (LLMs) to autonomously establish quantifiable dependency relationships through cross- and self-attention mechanisms. Enhanced by iterative feedback from the HyFuzz experimental platform, AVRE significantly advances the accuracy and relevance of formal verification in complex communication protocols, offering a groundbreaking approach to validating sophisticated communication systems. CAL's performance was compared with state-of-the-art LLM-based models and traditional time sequence models, demonstrating its superiority in accuracy and robustness, achieving an accuracy of 95.94% and an AUC of 0.98. This NLP-based approach enables, for the first time, the creation of exploits directly from design documents, making progress in scalable system verification and validation.

AVRE differs from existing techniques by integrating a transformer model with the LLM, allowing quantifiable dependency relationships to be generated under supervision and enabling transformative learning without human involvement. This system, enhanced by iterative feedback from an experimental platform: Hy-Fuzz, fills a research gap by combining experience-based and logical dependency analyses in protocol documentation, thereby significantly improving the accuracy and relevance of formal verification in complex communication protocols.

To address the non-determinism and iterative formal verification, distinct from current formal verification methods that utilize prompt engineering, an open-access LLM, integrated with a transformer model was designed, to achieve supervised dependency. A formal-guided fuzzing testing approach was developed to bridge design verification and system validation. This approach complements the scalability limitations of formal verification and addresses the impacts of detected vulnerabilities. Additionally, a fuzzing digital twin was introduced to provide an open and automated platform for systematically that enables an autonomous detection of vulnerabilities and unintended emergent behaviors in 5G infrastructures.

The present example introduces a novel approach that utilizes LLMs to address challenges in formal verification, specifically in clarifying ambiguities and capturing design intent. This approach combines experience-based prior-probability distribution with logical dependency analysis in protocol documentation and leverages experimental-based posterior-probability to enhance the accuracy and relevance of the dependency graph by the cross-attention-based LLM (CAL) model.

The present example presents a new systematic solution (i.e., AVRE) is equipped with CAL, a continuously-learning, cross-attention-based LLMs. CAL is designed to interpret and transform protocol descriptions into dependency graphs, which can then be converted into formal models. CAL is enhanced by incorporating iterative feedback from an experimental platform, HyFuzz, to focus on refining the capture of intentions and resolution of ambiguities.

In CAL, a novel multi-session detection method is introduced that bypasses traditional token count barriers. By segmenting comprehensive protocols into manageable sections and concurrently processing them, it can output detailed and quality analysis without token constraints. CAL incorporates refined cross-attention mechanisms instead of a prompting based scheme and achieves high efficiency to identify and interpret complex formal relationships with enhanced accuracy and insight.

Additionally, a scalable cross-sessions dependency graph has been designed that supports the hierarchy of formal analysis, facilitating the revelation of in-depth relationships embedded within protocols to systematically pinpoint and counteract vulnerabilities.

Figure 24:
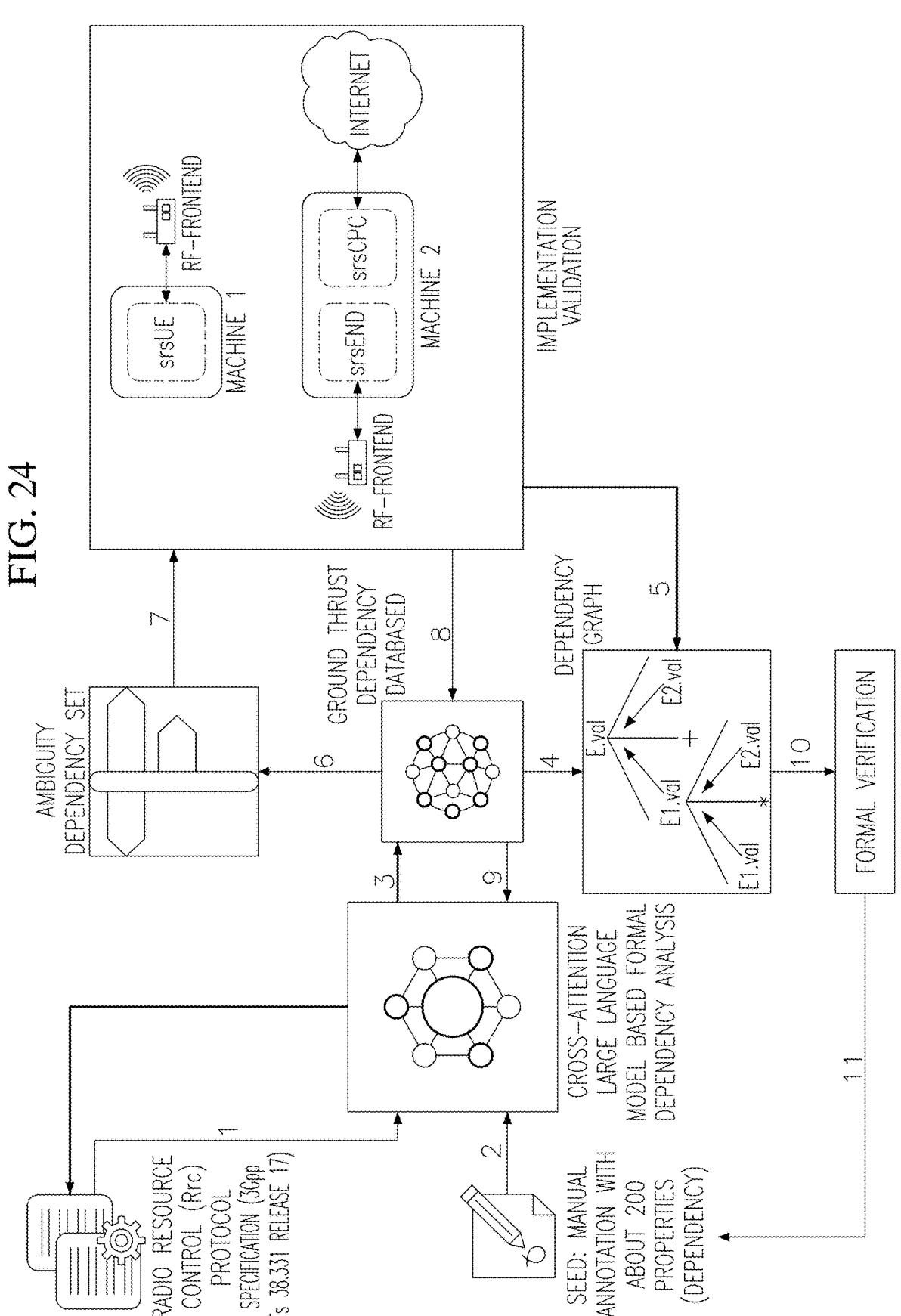
FIG. 24 is a System Overview of Auto-Modeling and Trustworthy for Formal Verification and Validation in 5G and NextG Security Protocols, wherein the Red line shows the process from informal system protocols to dependency graph and formal expression, and green line shows the formal guided fuzz testing feedback to the CAL and refine the results.

For AVRE: In addressing the need for scalable formal verification in the rapidly evolving domains of 5G and NextG protocols and specifications, a pioneering approach is presented that utilizes LLMs to overcome key challenges of clarifying ambiguities and capturing design intent. A novel systematic solution AVRE as shown in FIG. 24.

For Prompting for 5G and NextG protocols: At the heart of AVRE is a continuously-learning, CAL designed to interpret and transform protocol descriptions into dependency graphs, which are subsequently converted into formal models. Differing from the current state of the art in using LLM prompting for formal verification, the present approach integrates the transformer model with the LLM model, enabling it to generate a quantifiable dependency relationship under supervision. This facilitates the transformative learning of the LLM without human involvement, meeting the requirements for formal explicitness. This system is further enhanced by incorporating iterative feedback from the experimental platform: HyFuzz, aimed at refining intention capture and ambiguity resolution.

CAL is trained on labeled identifiers (step 1 and step 2) and formal properties, designed to predict formal properties (step 3) with more controlled environments. The design of cross-attention mechanisms utilization the LLM model improve the capability of the model in complex protocol.

The experimental platform serves as two purposes: intention and the trustworthy. As shown in step 4 and step 5 in FIG. 24, it provides relevancy and design intention information, which is used together with the dependency relationships detected by CAL to form the dependency graph. For trustworthy, as shown in step 6 and step 7, the low confident prediction is set to the experimental platform to return evidence that could be added to ground truth dependence database. With multiple iterations, a robust dependency graph will be generated to send to formal method verification. The detected vulnerability will be further used in protocol fortification.

The design of the system AVRE uniquely fills a gap in the existing research landscape by integrating experience-based prior-probability distribution with logical dependency analysis in protocol documentation using LLMs. Moreover, by leveraging experimental-based posterior-probability through real-world prompting, AVRE establishes an iterative learning loop, significantly enhancing the accuracy and relevance of the intention of the CAL model. This advancement marks a pivotal contribution to the field, offering new directions in the formal verification of complex communication protocols.

Figure 25:
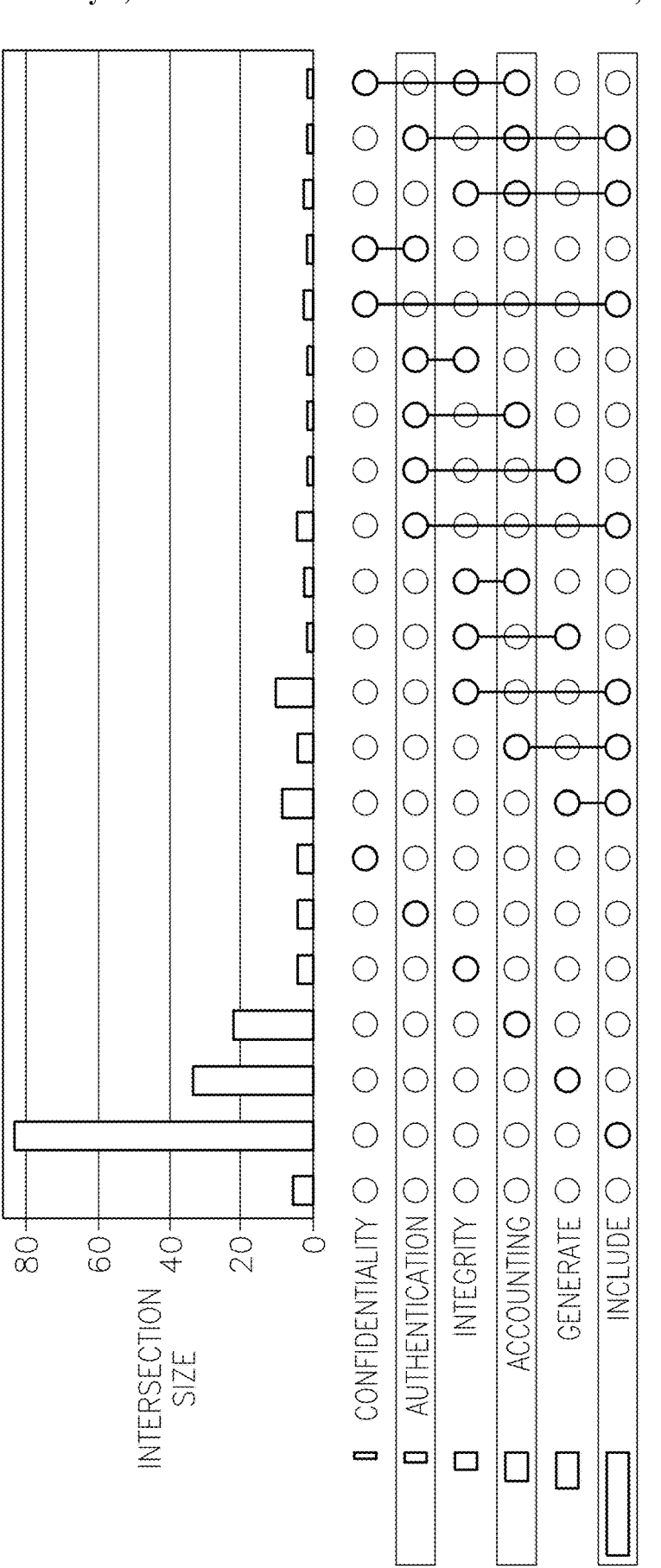
FIG. 25 is a table and graph showing formal properties, statistical counts and intersections.

For PROTOCOL ANALYSIS AND FORMAL PROPERTIES DEFINITION: 3GPP Release 17 Radio Resource Control was used as an example to illustrate AVRE. Two fundamental elements were identified: procedures and identifiers. Procedures are defined as sequences of actions and interactions among different entities. Identifiers in the protocols are specific labels or names used to uniquely recognize various elements within mobile telecommunications networks. For instance, IMSI (International Mobile Subscriber Identity) is a unique number associated with all cellular networks, used primarily for identifying individual subscribers for billing and identification purposes. IMEI (International Mobile Equipment Identity) is defined as a unique number to identify mobile devices, primarily used for identifying the device itself, rather than the subscriber. The procedures define the structure of a set of identifiers that are connected dependently. The dependent relationship between the identifiers, framed by the structure defined in the procedures, generates the dependency graph, which is then converted for formal analysis. As shown in FIG. 25, while the extraction of entities from protocol identifiers is straightforward, the classification of their dependency is a problem that CAL targets. However, the procedures include intricate interactions and designs, with unspecified space for various vendors to implement based on their existing infrastructures and devices. In the present disclosure, real-world or simulated experimental platforms were innovatively connected to aid in procedure formulation.

Considering confidentiality, integrity, and availability (CIA) triad which is a widely accepted security model, along with the Dolev-Yao model for communication protocol formal verification, four essential properties were proposed to describe the dependency among identifiers. These properties, each addressing a distinct facet of security augmentation within the specifications, are defined as follows:

1) Confidentiality: the capability of source to prevent private information from leakage of the destination. The source should be the selected encryption algorithm or the key of an encryption algorithm, and the destination should be command or specific identifier, which are confidentiality protected by source.

2) Integrity: the capability of source to keep the destination information unmodified. Similar to confidentiality, the source should be the selected integrity algorithm or the key of integrity algorithm, and the destination should be the command or specific identifier, which are integrity protected by source.

3) Authentication: the ability of source to help User Equipment (UE) or gNodeB (gNB) to identify where and when the destination was sent from. The source should be the distinctive identifier, which can uniquely represent an entity (like gNB) or a communication session (like UE id).

4) Accounting: the source of accounting relationship is the counting identifier which can sequentially track and distinguish each transmitted command. The destination should be the sequence-protected command.

5) Include: the destination identifier is included in the source identifier.

6) Generate: the destination identifier is generated by the source identifier.

For Data Preparation: dependencies (formal properties) of identifiers were identified in the 5G Radio Resource Control (RRC) protocol, focus. Approximately 16,428 samples were annotated, including source, destination, and dependency relationships. Out of these, 1,218 samples were identified by domain experts who analyzed the documents to determine relationships. The remaining samples comprised source and destination pairs lacking a dependency relationship. In the proposed model, it is treated as a classification problem for all potential source-destination pairs, encompassing both relevant and non-relevant ones. Consequently, the large number of source and destination pairs results in highly imbalanced data.

Figure 26:
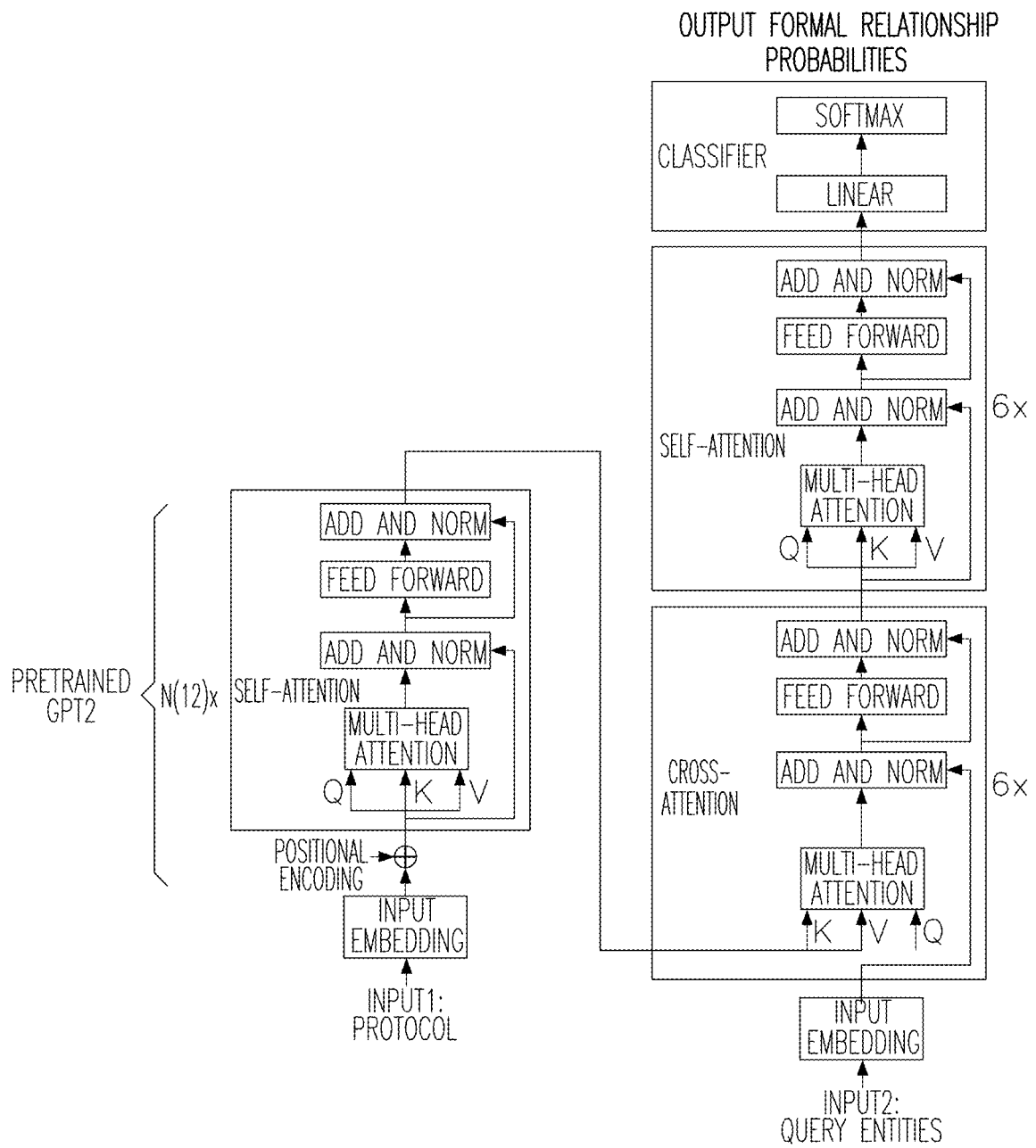
FIG. 26 is a schematic diagram showing the Attention Driven Formal Identifier and Property Abstraction Model.

In the analysis of the annotated data samples, an imbalance in the distribution between positive and negative samples was identified. To address this issue and improve the model's performance, a weight-balanced binary cross-entropy loss was proposed. FIG. 26 illustrates the size of each property type and the intersection sizes among them. It is clear from FIG. 26 that 'include' has the largest number of detections. Furthermore, the intersections of 'include' with 'account' and 'integrity' represent the two largest intersection counts, indicating a strong correlation between these properties. It is also important to note the significant presence of 'integrity' in multiple intersections, which is consistent with the importance of integrity in RRC protocols 3GPP in release 17.

Figure 27:
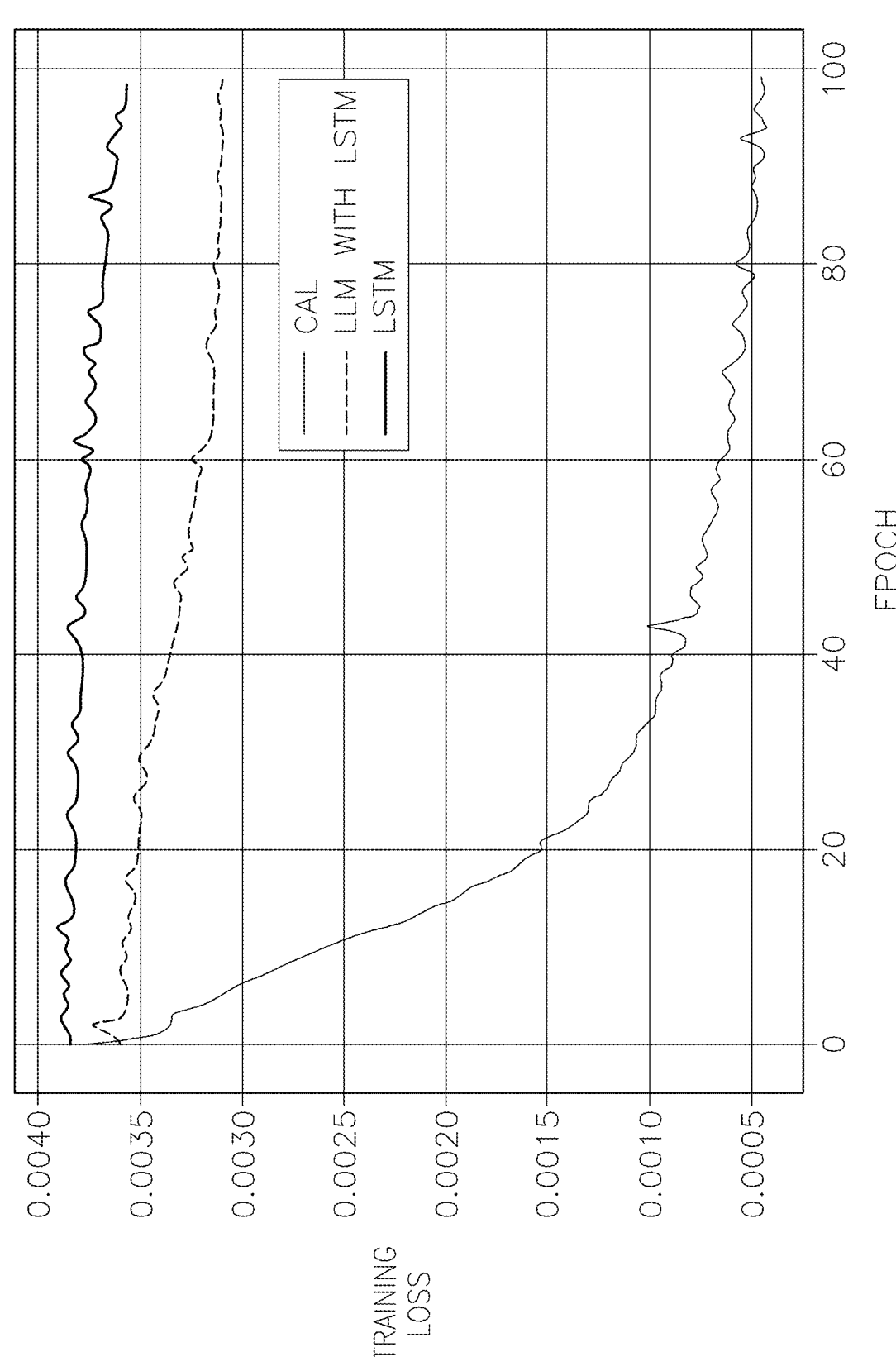
FIG. 27 is a graph showing training loss indicating the incapability of traditional models like LSTM in processing complex dependency and text.

For Building Multimodal Cross- and Self-Attention Large Language Mode:

CAL, an LLM embedded with cross- and self-attention model, as delineated in FIG. 27 was proposed, considering both the contextual information from the original protocols and the learned defined dependency relationships among identifiers. The CAL model employs a pretrained LLM (GPT-2), which consists of N transformer layers, to extract hidden insights from protocol descriptions. Here, considering the scalability of training and the performance accuracy, N=12 was selected.

Cross-attention mechanisms were incorporated to discern the relationships between the extracted latent information and query entities. To further enrich the contextual understanding, self-attention frameworks were employed that evaluate inter-relations among all positions from the preceding stage, guided by weighted considerations. In the final stage of the presented model, a linear classifier is implemented to infer probabilities associated with distinct formal attributes. Self-attention generates contextual representations for a single sequence by computing weighted averages of all tokens, while cross-attention evaluates interdependent contextual relationships between the query sequence and the context sequence in transformer models. In the proposed CAL model for converting complex contextual protocols into explicit dependency graphs, self-attention serves as the mechanism to understand the context within the protocols, while cross-attention understands and recognizes the relationships across the identifier sequences.

Self-attention calculates a weighted average of feature representations, where the weight represents the similarity score between pairs of feature representations. As defined in the publication entitled "Attention is all you need," Advances in Neural Information Processing systems, vol. 30, 2017, by Vaswani et al., the entire disclosure of which is incorporated herein by reference and made a part of the present application wherever appropriate, an input sequence of n tokens of dimensions d, $X \in R^{n \times d}$, is extracted by three projection matrices $W_Q \in R^{d \times dq}$, $W_K \in R^{d \times dk}$ and $W_V \in R^{d \times dv}$ ($d_q = d_k$). The input includes queries and keys with dimension $d_k$, and values with dimension $d_v$. Three different feature representations $Q = XW_Q$, $K = XW_K$, and $V = XW_V$, where $Q \in R^{n \times dq}$, $K \in R^{n \times dk}$ and $V \in R^{n \times dv}$. Intuitively, Q, K and V are separately regarded as query, key and value. The normalized dot-product of query and key is used to represent the attention score $A \in R^{n \times n}$ of each query and paired keys as $$A = SOFTMAX(A) = QK^T / \sqrt{d_q} \tag{1}$$

where division by $\sqrt{d_q}$ normalizes the dot-product of Q and $K^T$, ensuring that the distribution of the dot-product aligns with expectation E=0 and variance Var=1. Ultimately, attention value is calculated as follows:

$$Self\text{-}attention\ (Q, K, V) = SOFTMAX(QK^T / \sqrt{d_q})V = AV \tag{2}$$

where output Self-attention (Q, K, V)$\in R^{n \times dv}$ is the weighted forward layer is incorporated to further distill the acquired knowledge represented by the weighted average features.

Utilizing the self-attention mechanism, cross-attention takes two input sequences with different sequence length $X1 \in R^{n1 \times d}$ and $X2 \in R^{n2 \times d}$ as inputs. Subsequently, $Q = X_1 W_Q$, $K = X_2 W_K$, and $V = X_2 W_V$ are derived from $X_1$ and $X_2$ respectively and the dimension of attention value can be succinctly expressed as $R^{n \times dv}$ Balanced Loss Function:

It was observed above that there is an imbalance in the data distribution of relationships amongst entities, and it is evident in FIG. 28. In response to this challenge, a weight-balanced binary cross-entropy loss was adopted, and articulated in Equation (3) below. In this equation, N signifies the total number of cases, yi represents the ground truth, p(yi) is the predicted probability, and n(yi) denotes the proportion of class yi within all cases. Utilizing the inverse class ratio amplifies the impact of the underrepresented class while tempering the dominance of the majority class, offering a balanced approach to mitigate the skewed data distribution.

$$L_i = -[y_i * \log(p(y_i)) + (1 - y_i) * \log(1 - (p(y_i)))] \tag{3}$$

$$L = \frac{1}{N} \sum_{i=1}^{N} L_i * \left(1 - \frac{n(y_i)}{N}\right)$$

Connection to Experimental Platform

Figure 22:
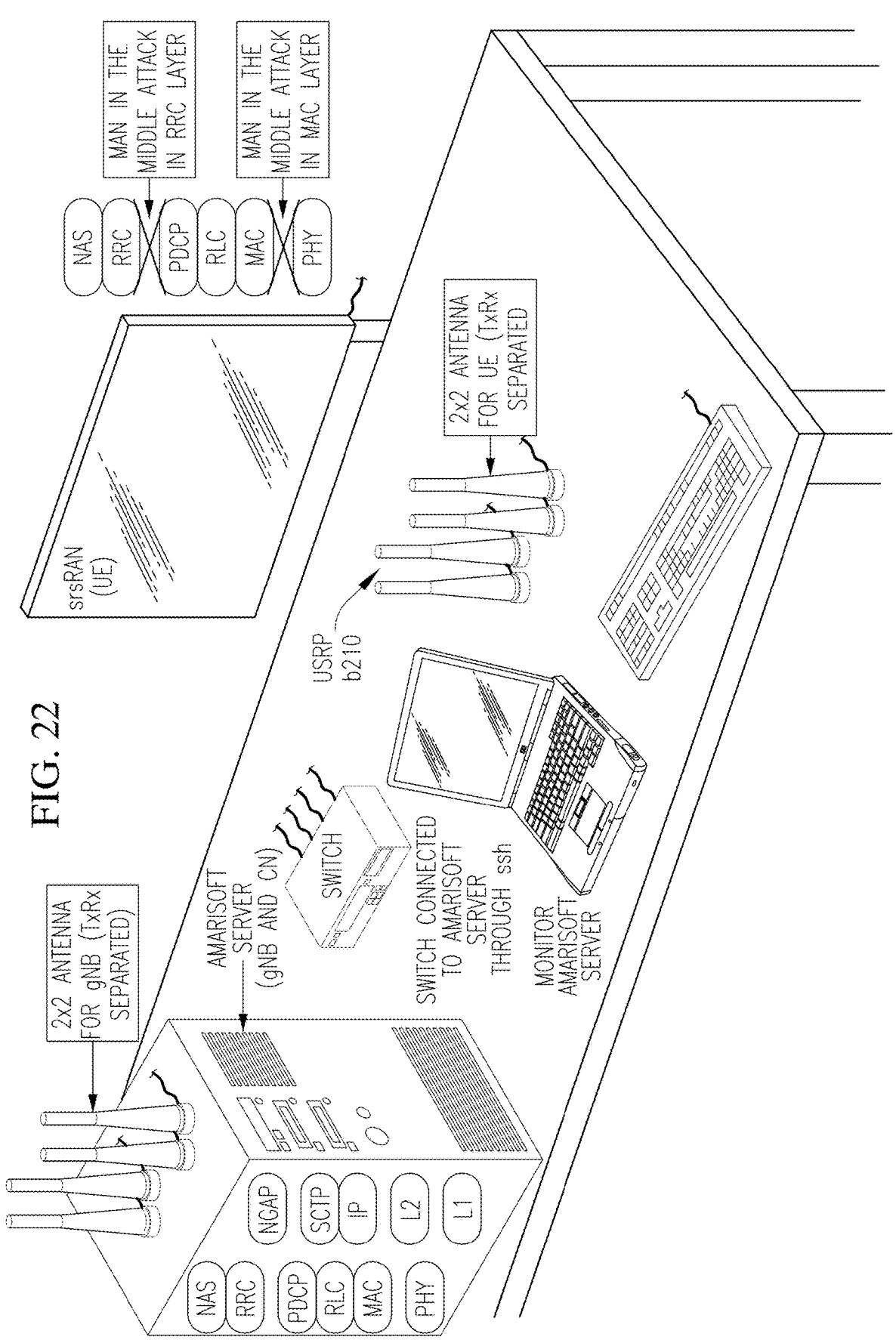
FIG. 22 is an Over The Air (OTA) Mode experimental setup and configuration.

Inspired by the iterative prompting to the LLM, the experimental platform serves as the prompting server in the real world. In order to clarify the ambiguity in the LLM model, the counterpart experiments configuration could be auto-generated and performed, in which the results generated are feedback to the LLM to improve the trustworthiness. Through the digital engineering module, which facilitates connections to available real-world execution platforms or digital twins, the process effectively bridges the gap between design intentions and real-world operations for mission-critical infrastructures. The experimental platform, HyFuzz, employs a hybrid system model that incorporates two distinct platforms: a ZeroMQ virtual model and an Over the Air (OTA) physical model. In addition to running 5G tests in various scenarios, the uniqueness of the HyFuzz platform is its ability to serve as relay nodes to perform various fuzzing tests. The relay node is capable of modifying and permutating commands and accessing messages exchanged between the UE and the gNB. HyFuzz facilitates multi-step Man-In-The-Middle (MITM) attacks, enabling the identification and analysis of vulnerabilities and the detection of various prompts due to the uncertainty of CAL model outputs and providing an accurate real-world ground truth. An overview of the HyFuzz is shown in FIG. 22.

As illustrated in FIG. 24, the experimental platform is seamlessly integrated with the CAL model, supporting it from two key aspects: design intention and trustworthiness. Regarding design intention, the platform supplies relevant information and design intents to the CAL model, enabling it to continue training based on novel evidence of dependency relationships, thus effectively constructing an accurate dependency graph. In terms of trustworthiness, low-confidence predictions are referred back to the experimental platform for further validation, potentially contributing new data to the ground truth dependency database. This iterative process aims to create a robust dependency graph, which will be utilized for formal method verification. Detected vulnerabilities will then be leveraged in protocol fortification.

Figure 29:
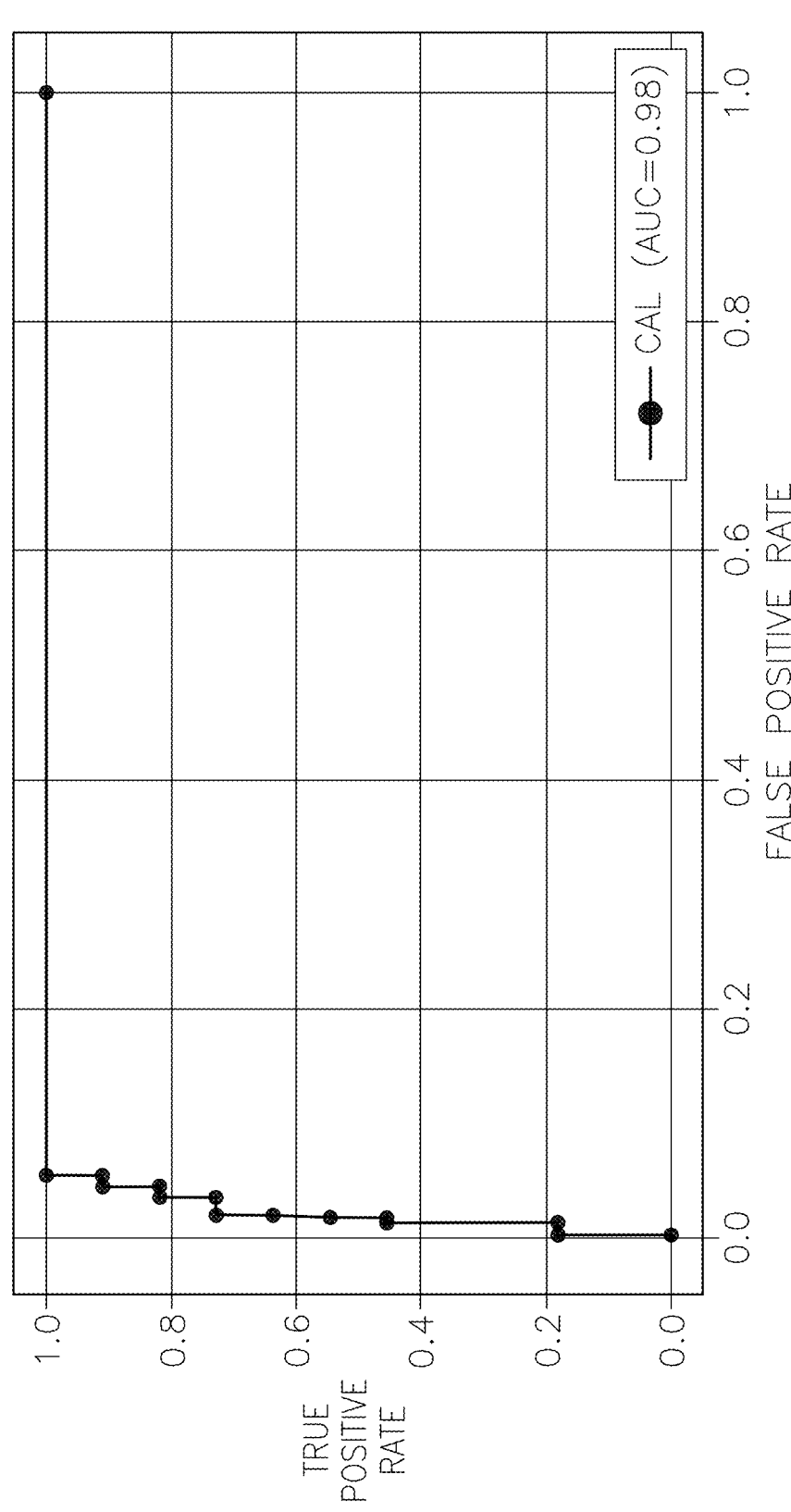
FIG. 29 is a graph showing the Receiver Operating Characteristic (ROC) curve of the CAL Model.

CAL Experiment Setting:

Considering the openness and accessibility of the LLMs, in this example, the pre-trained GPT-2 model with 12 transformer layers and 12 attention heads was selected as embedded pre-trained LLM included in CAL. The GPT-2's embedding size is set to 768, and the sequence length is configured to 1024, allowing for the effective extraction of hidden information from the extended protocols. Subsequent to the application of the LLM, the extracted hidden information is processed through 6 layers of self-attention with 6 attention heads and 6 layers of cross-attention with 6 attention heads. This structure aids in recognizing and processing the comprehensive relationships between the protocols and the associated query entities. Further details of the model's configuration are presented in FIG. 29.

Figure 30:
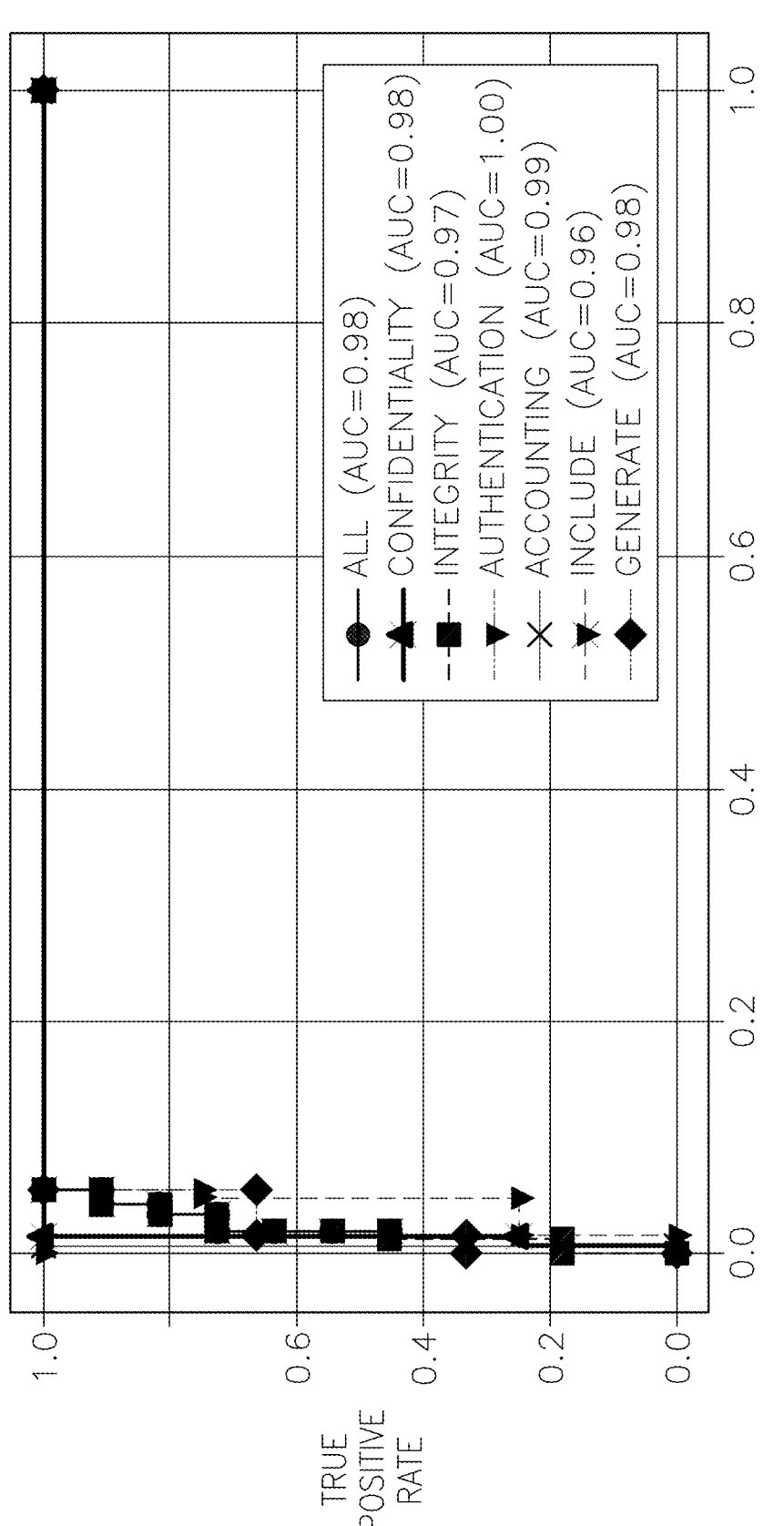
FIG. 30 is a graph showing dependency relations specific to the ROC curve of the CAL Model.

AL Experiment Result Analysis:

As depicted in FIG. 30, the consistent trends in both training and validation accuracy of CAL underscore the model's proficiency in extracting the dependency relationship information from the examined protocols and entities. In the experimental setting, formal properties are designated as positive, while their absence is categorized as negative. As presented in FIG. 32, the model performs with stable accuracy of 95.94%, and achieves 100% accuracy in recall, indicating the high and stable performance in formal property prediction and the trustworthiness of the model.

Figure 31:
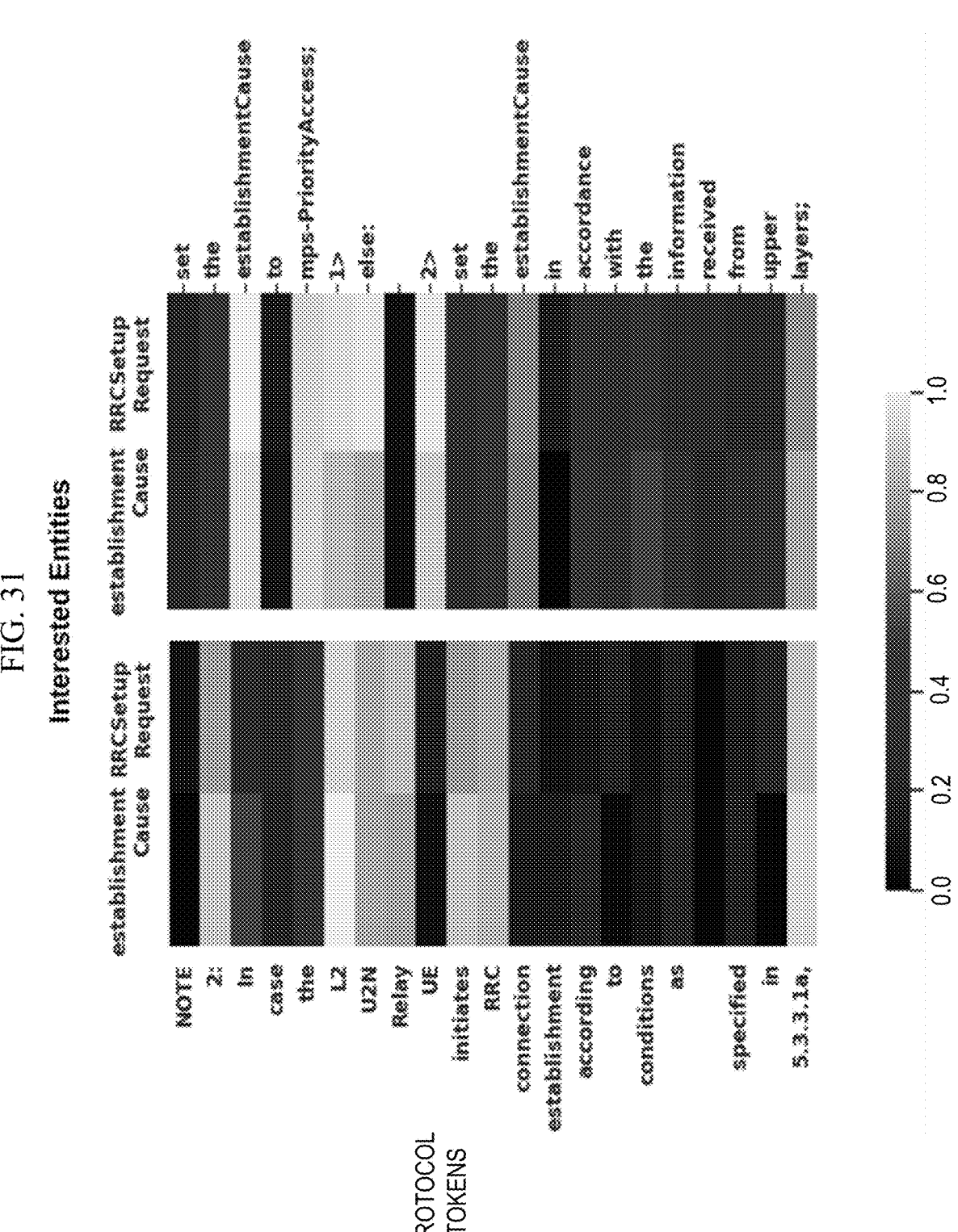
FIG. 31 is an attention map depicting Average Attention Scores across layers, wherein lighter shades indicate higher attention; darker shades signify reduced attention.

The model was further compared with other state of the art model performance. FIG. 32 leads to an explicit conclusion that the CAL significantly outperforms all other compared models. FIG. 31 reveals that only the LSTM model and the hybrid LLMs with LSTM model exhibit a deficiency in the efficient extraction of information during the training phase, resulting in trapping in local optima. The result also indicates the necessity of LLMs in processing complex protocols and standards.

To compare the performance of transformer-based models with traditional non-transformer models, the LSTM, known for effectively capturing long-range dependencies and typically performs better than CNN and RNN, is chosen to replace the cross-attention and self-attention. To ensure consistency of experimentation, the LSTM is set with a hidden state size of 768 and 6 recurrent layers. Additionally, the LSTM alone was used to directly process natural language to predict formal properties, also with a hidden state size of 768 and 6 layers.

The Area Under the Curve (AUC) is commonly described as a statistical measure used to evaluate the performance of a classification model. As shown in FIG. 33, it can be seen that via the True Positive Rate (TPR) against the False Positive Rate (FPR), CAL has an AUC value of 0.98, indicating excellent performance.

Then, the AUC was further analyzed for each type of dependency, as shown in FIG. 30. Confidentiality: This curve appears to be the closest to the top-left corner, suggesting it has the best performance among the four criteria. Integrity, Authentication, Accounting: These curves are further from the top-left corner compared to Confidentiality. While they still demonstrate good performance, they are not as effective as the Confidentiality curve. To better visualize the interactions between relevant entities and protocol procedure descriptions, the Actions related to the transmission of the "RRCSetupRequest" message are utilized as an example. This verification process aims to determine whether the model can effectively extract valuable information from the human-written protocol procedure descriptions.

In transformer-based models, each transformer layer has the capability to extract distinct information through different attention scores. The average score of cross-attention layers was leveraged to visualize the interactions between relevant entities and protocol procedure descriptions. Taking the entities "establishmentCause" and "RRCSetupRequest", along with their corresponding procedure as an example, an attention map was generated (FIG. 31). The attention map clearly reveals that these two entities place more emphasis on specific terminologies, such as "establishmentCause", "mps-PriorityAccess", and "RRC", as well as the levels of indentation, such as "1>" and "2:". This observation highlights the cross-attention component's ability to effectively focus on and extract essential information from key terms within the input text.

Figure 32A:
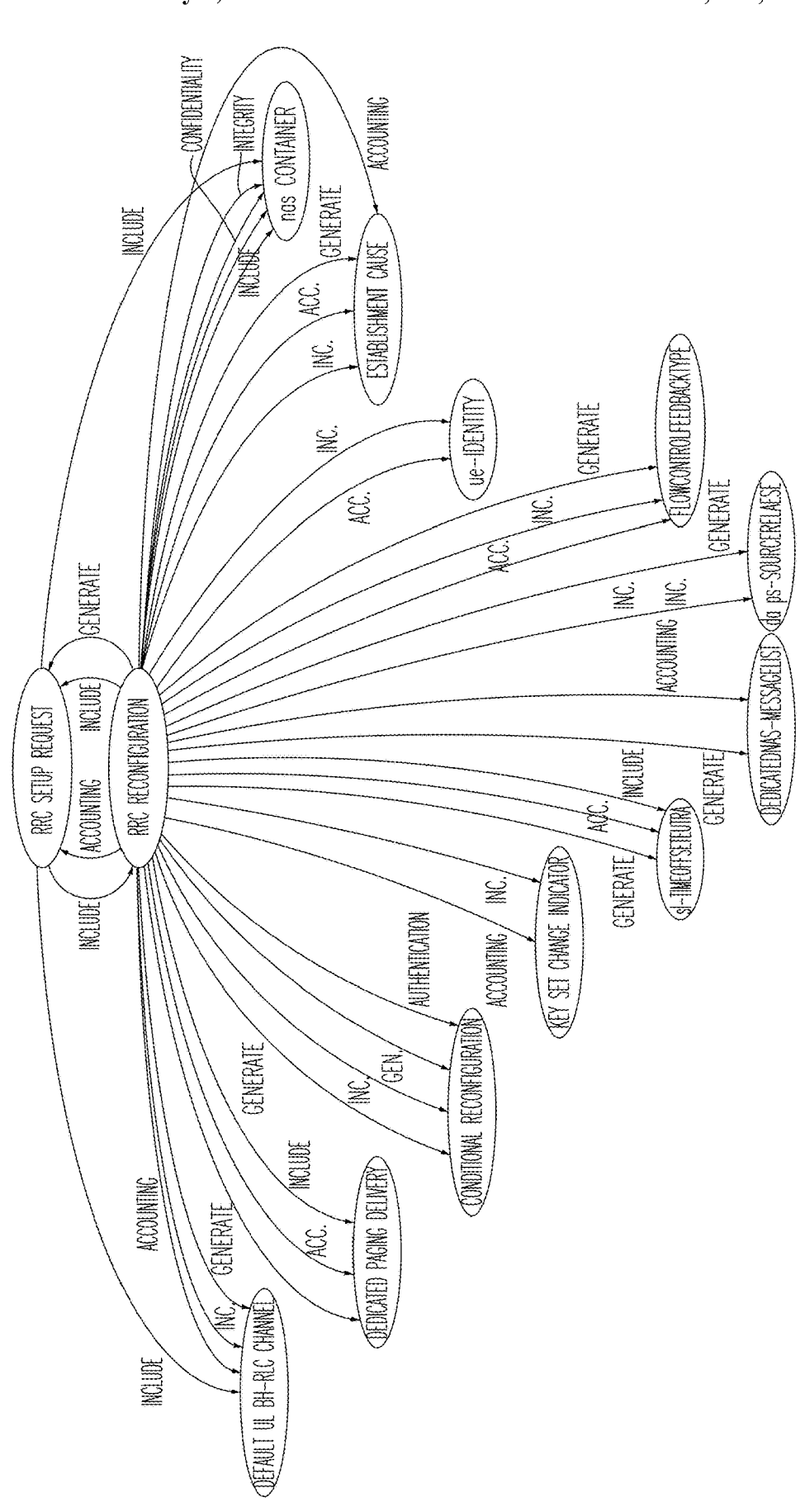
FIG. 32A a is a schematic diagram showing raw dependency relationships detected by CAL.
Figures 32B, 32C:
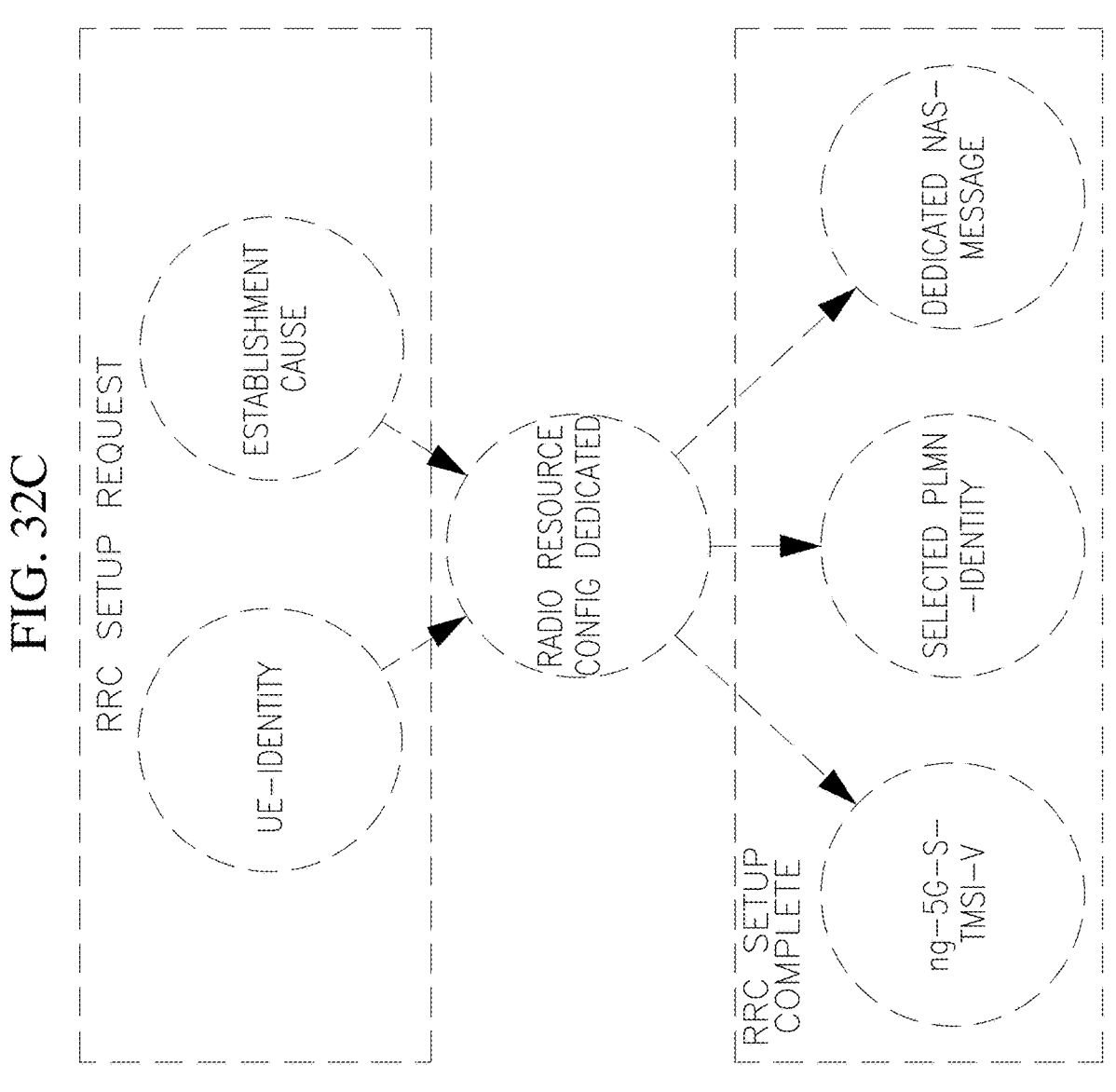
FIG. 32B is the experiments' filtered design intended dependency graph.
FIG. 32C is a visualization of FIG. 32B.
Figure 32D:
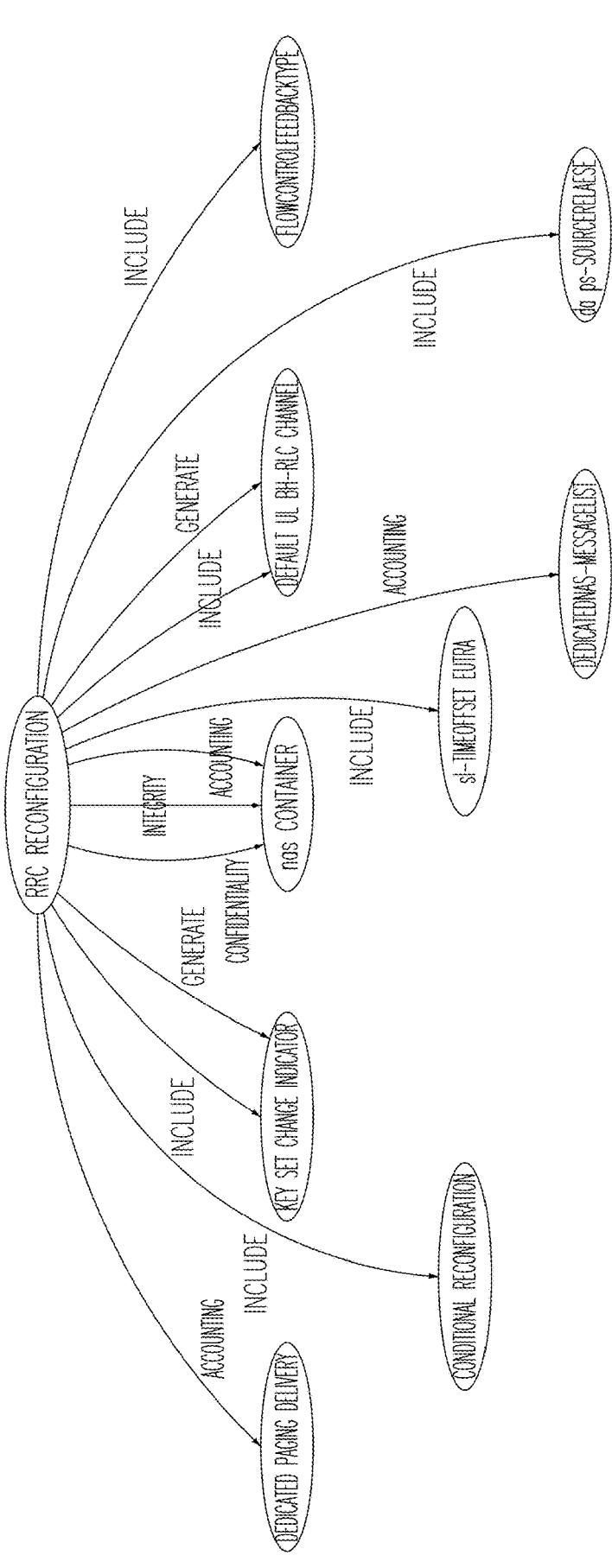
FIG. 32D is a schematic diagram illustrating design intended for Security Mode Command.
Figure 34:
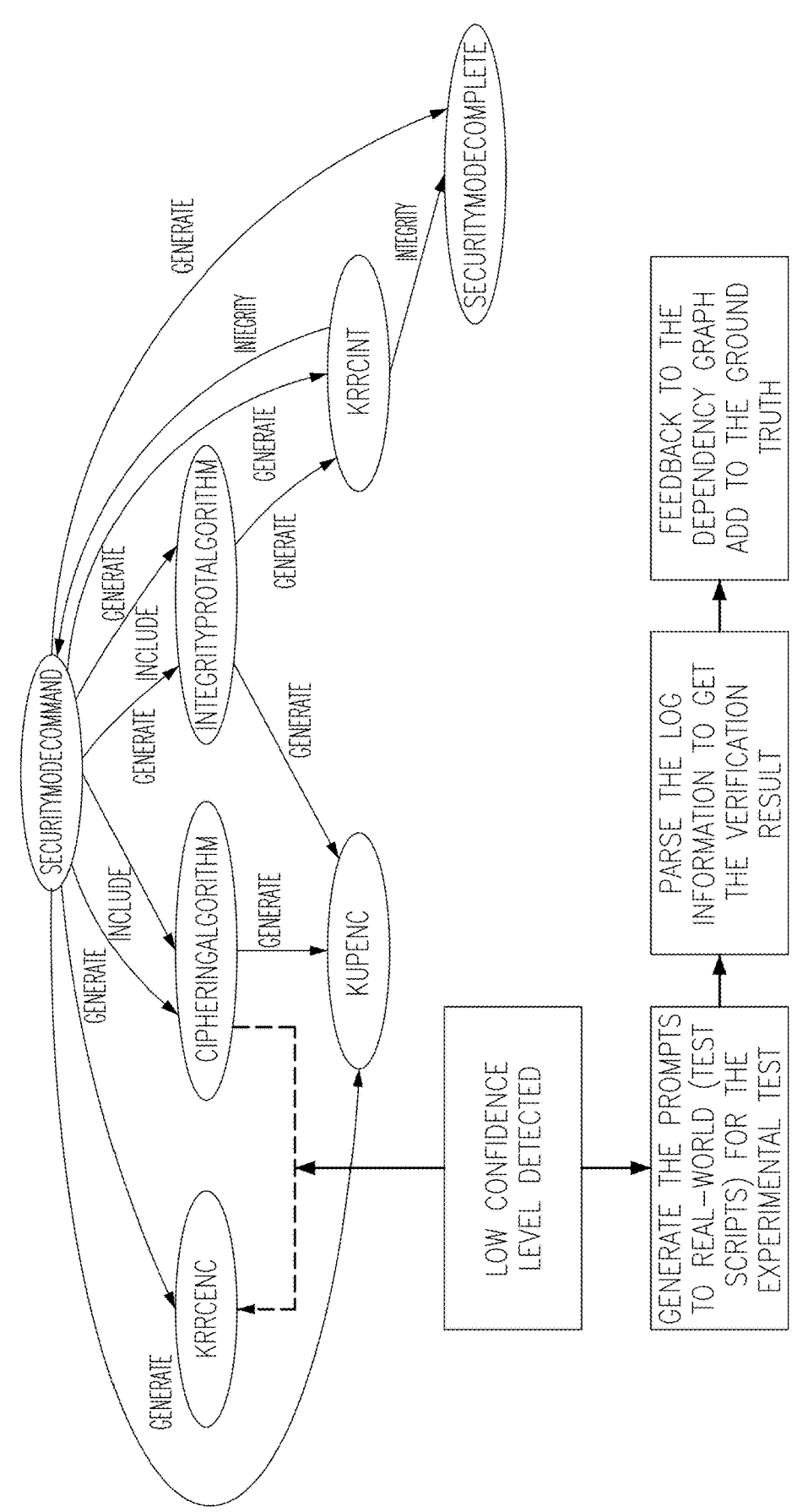
FIG. 34 is an information flow-graph detected in the Experiment Platform in accordance with embodiments of the present invention.

Case Study of Design Intention Capturing and Trustworthy Enhancement Via the Connection to Real-World Testbed:

For Case 1: Design Intention: With the CAL model, the generated dependencies include both intended and unintended ones. Compared to extraction from human expertise, a portion of unintended dependency relationships is also detected. These unintended dependencies can be filtered out via connection to a real-world experimental platform. The examples of "RRC_setup_request" and "Security_mode_command" were used, as shown in FIGS. 32A-32E. FIG. 32A illustrates the raw dependency relationships detected by CAL, while FIG. 32B shows the experimentally filtered, design-intended dependency graph. Using the information flow from the experiment platform, as shown in FIG. 34, the design-intended dependency graph can be derived and is presented in FIGS. 32B and 32D. FIGS. 32C and 32E) are equivalent to FIGS. 32B and 32D, respectively, offering a more user-friendly visualization.

For Case 2: Trustworthy: For dependencies predicted by CAL with low confidence, the uncertain dependency can be converted into test scripts and sent to an experimental platform to generate evidence. This evidence can be used to confirm or refute the existence of the dependency. As shown in FIG. 34, the dependency between KRRCenc and CipherAlgorithm shows low confidence in the detected "Integrity". This is automatically converted into fuzzing scripts to generate evidence, proving that there is no dependency between them, as indicated in the parsed information from the FIG. 35.

Formal Verification and Attack Model:

Based on the predicted relationship between entities, the next objective was to perform the formal verification, as shown in FIG. 36 and FIG. 37. The interconnected sections and communicated commands include identifiers. The interconnected sections and communicated commands can first be filled up, which are depicted in natural language protocols, shown in FIG. 38 to FIG. 40. And from the command table in natural language protocols, it can be identified which identifiers are included in the commands.

Utilizing the identified formal properties, a comprehensive dependency graph was constructed, which facilitates the derivation of formal dependencies through the graph.

Figure 38:
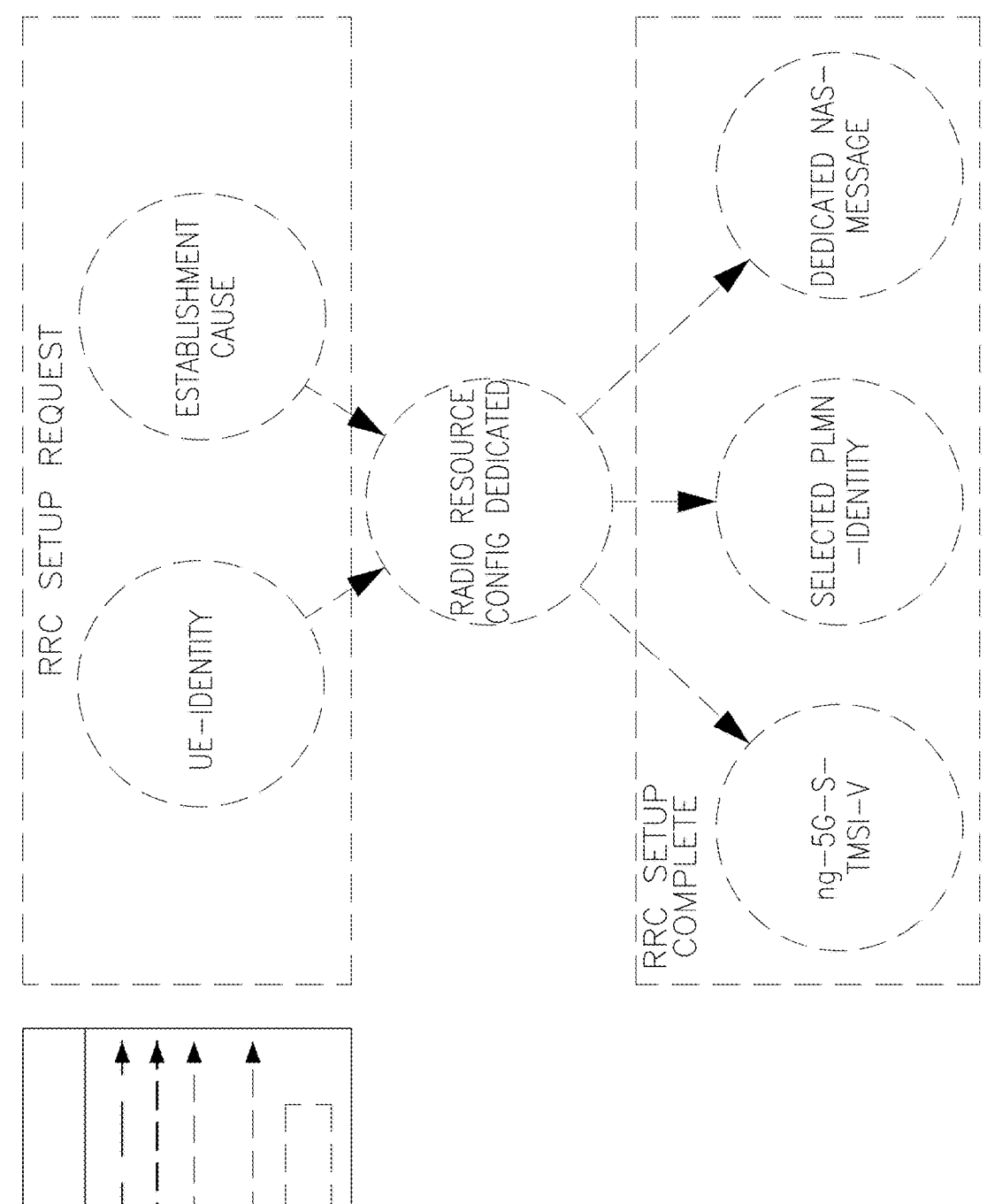
FIG. 38 is a ground truth RRC connection dependency graph and a predicted security mode command dependency graph.

The RRC connection establishment procedure was considered as an example. Nodes were manually extracted from the natural language protocol, as depicted in FIG. 38. The visual representation employs boxes to signify "Include" and uses various arrow types to delineate distinct formal properties. Leveraging the predicted formal properties, the RRC connection dependency graph (FIG. 38) was generated. Remarkably, this aligns with the ground truth of the RRC connection dependency graph. However, during the Security Mode procedure, there were discrepancies between the predicted formal properties (as presented in FIG. 39) and the ground truth (see FIG. 40). Therefore, subsequent manual verification is advisable. Notably, while there may be extraneous formal properties included, none are omitted. Building on previous related work, this dependency graph can be transformed into Proverif code, enabling formal verification. Compared to solely manual labeling of formal properties, the proposed model streamlines the process by narrowing down the entirety of natural language protocols to the task of parsing redundant formal properties from the crafted formal dependency graph.

Overall AVRE, a novel system for the formal verification of NextG protocols, was presented, leveraging LLMs to transform protocol descriptions into dependency graphs and formal models. Enhanced by the HyFuzz experimental platform, AVRE demonstrates significant advances in the accuracy and relevance of formal verification in complex communication protocols. The present invention underscores the efficiency of CAL, a continuously-learning, cross-attention-based LLM, in extracting formal properties and dependencies, outperforming traditional methods, and emphasizes the potential of LLMs in enhancing trustworthiness and clarifying ambiguities in protocol verification, marking a significant contribution to the field. By reducing reliance on manual labeling and associated human errors, the present method offers a more efficient approach, focusing only on the most pertinent formal relationships. This invention involving extracting formal relationships from natural language protocols enhances the clarity and understanding of these protocols, ensuring a more robust, reliable, and efficient approach for protocol verification and system validation in large-scale, complex systems.

Example 10: Dependency-Graph Enabled Formal Analysis for 5G AKA Protocols: Assumption Propagation and Verification A high-resolution and in-depth formal analysis of the AKA protocol was undertaken, addressing hidden assumptions stemming from the underlying dependencies among entities. The direct properties among identifiers in each protocol session were categorized into confidentiality, integrity, authentication, and accounting. Furthermore, the indirect dependencies among identifiers through the propagation of assumptions in the designed dependency graph were uncovered. The formal models are generated from both the direct and indirect dependencies and are verified using ProVerif. The present approach reveals four major vulnerability types across four sub-procedures. This includes three vulnerabilities previously identified in existing research, as well as one newly discovered vulnerability type. The solutions proposed to address these vulnerabilities have been validated through formal verification and over-the-air (OTA) testing. The first formal models that consider hidden assumptions and their propagation in 5G are therefore presented, demonstrating the fragility of the 5G-AKA protocol through experimental practice. Also included are formally verified fixes for the encountered vulnerabilities.

In this example, for the first time, an intuitive dependency-based formal verification framework is proposed, aiming to mitigate the dependency on expert engagement and offer guidance for novices in the field. In the proposed framework, it is first determined whether the identifier inherits the formal properties from previous identifiers to identify direct and indirect dependency relationships. Then, the formal property dependency tree was constructed to guide the formal verification code generation. After that, based on the results of the formal verification, corresponding solutions are presented from the roots to the leaves of the dependency tree. This is because the security of a parent node can influence the security of child nodes with high probability. Following this approach, multiple vulnerabilities were discovered due to absence of the rudimentary man-in-the-middle (MITM) protection within the protocol, which is unexpected considering that the Transport Layer Security (TLS) solution to this issue has been in existence for well over a decade. The inventive framework, characterized by robust automation, scalability, and usability, promises to enhance security assurance and resilience across both infrastructure and domain levels, striving to guarantee the absence of additional security issues within the system. Additionally, the proposed approach could be applied to various open programmable communication platforms.

An extensive and simplified formal verification framework was designed and implemented, which significantly improves efficiency and achieves scalability for large-scale 5G systems and discovery of new and exploited vulnerabilities in the Non Standard-Alone (NSA) 5G communication authentication process.

An in-depth formal analysis was also performed on the NSA 5G authentication process by converting informal protocols into a symbolic flowchart (FIG. 41) through identification of direct and indirect formal dependency relationships, enabling comprehensive formal analysis.

Multiple vulnerabilities were discovered due to absence of rudimentary MITM protection. The 3GPP technical standards and protocols, despite the TLS solution to this issue has been in existence for well over a decade.

With the proposed formal verification framework, connected vulnerabilities were detected by formal analysis to real-life attack models and new vulnerabilities were discovered.

While the efforts of past studies have been pivotal in identifying existing vulnerabilities in 5G systems, it's important to highlight that these analyses primarily focused on one-shot fuzzing intrusions. This limits vulnerability detection to single-bit mutations or single-command misplacements, often overlooking more complex attack strategies involving multiple steps. Such multi-step attack strategies, challenging for current cybersecurity defenses to detect, pose significant threats. Therefore, the present disclosure advocates for the application of formal verification to detect these multi step attack strategies via logical proof, which is a more direct approach compared to fuzzing testing. For instance, in the publication by Kacem et al. entitled "A Formal Model of a Multi-step Coordination Protocol for Self-adaptive Software Using Coloured Petrinets," International Journal of Computing and Information Sciences (IJCIS), vol. 7, no. 1, the entire disclosure of which is incorporated herein by reference and made a part of the present application wherever appropriate, introduced a comprehensive formal model for solving multi-step problems observed in complex systems. Aligned with this approach, the present formal verification framework utilizes the inheritance of the formal properties from previous procedures, where interdependent and distributed adaptions are concurrently performed. Furthermore, to offer a more efficient formal analysis approach, the formal relationships were simplified into six types and a dependency graph was utilized to generate the formal verification.

Architecture Overview: Based on the 3GPP 5G NSA protocol, two criteria were utilized: procedure and entities, to separately analyze each component within the whole 5G NSA AKA process. Rather than compiling all procedures into large formal verification code, we the transmissions activities were extracted between major entities in each relative dependent procedure and inherit the formal properties from the proof of previous procedure. The transmissions were then transferred between entities to formal code and provide security analysis.

Figure 41:
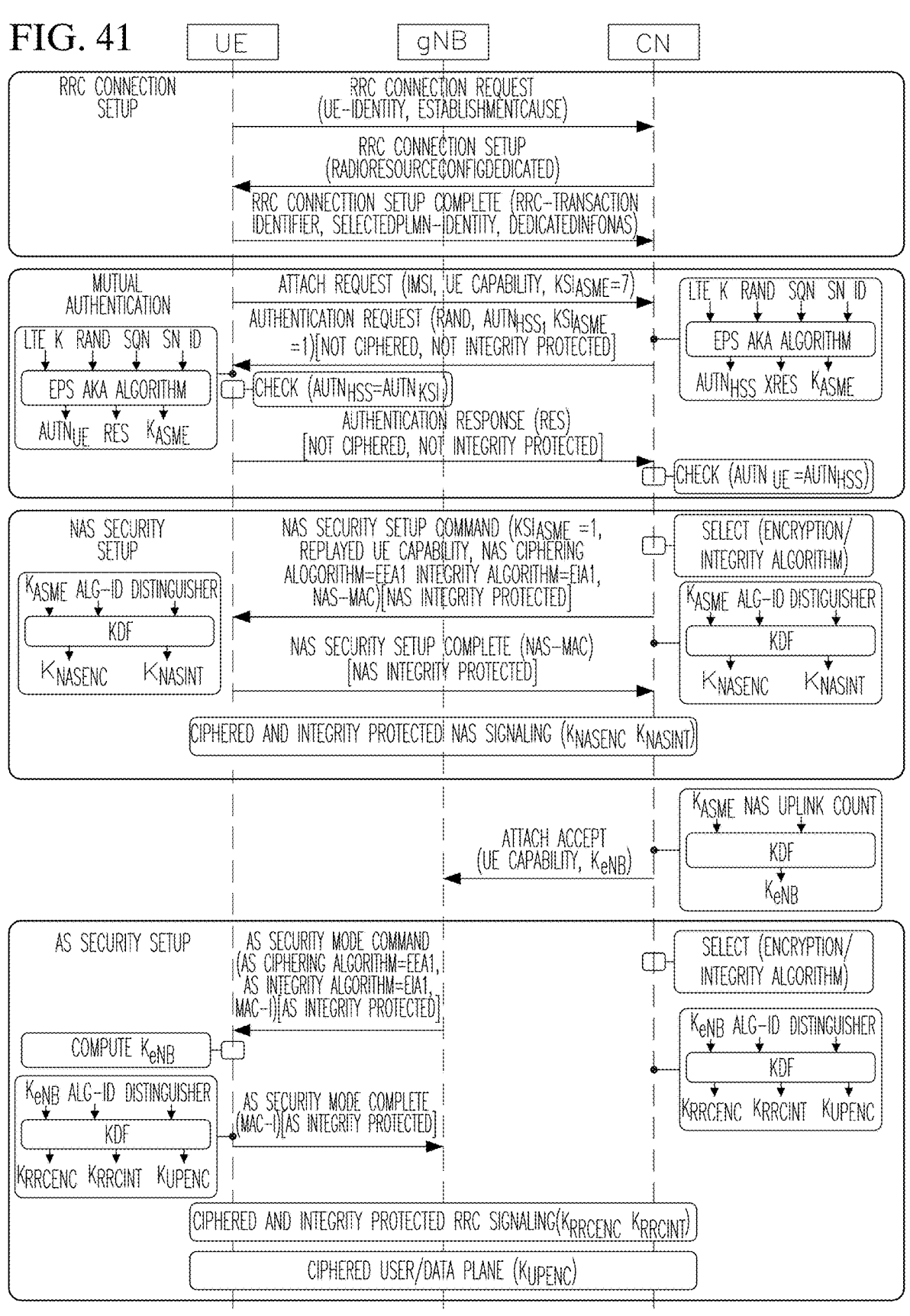
FIG. 41 is a schematic diagram showing a 5G NSA authentication and key agreement (AKA) Process.

Based on procedure, the whole 5G NSA AKA process was divided into following four procedures, as shown in FIG. 41: RRC Connection Setup, Mutual Authentication, NSA Security Setup, and AS Security Setup.

Radio Resource Control (RRC) Connection Setup: RRC Connection Setup is an AKA procedure to establish the RRC Connection by exchanging the UE-identity, RRC-Transaction Identifier and some essential identifiers.

Mutual Authentication: This procedure is the official attach authentication procedure. In this procedure, a new authentication code will be established based on the IMSI, $KSI_{ASME}$ and random ID. This part is the foundation and guarantee of the following two procedures.

NAS Security Setup: NAS Security Setup primarily involves ensuring that the data stored on the NAS is protected from unauthorized access and potential threats. This procedure is responsible for verifying the algorithm and key for encryption and integrity.

Access Stratum (AS) Security Setup: Similar to an NAS security Setup process, AS Security Setup confirms the encryption key and integrity key based on the $K_{eNB}$, which is generated from $K_{ASME}$ and Non-Access Stratum (NAS) Uplink count.

Focusing on the functions on entities, the whole 5G NSA AKA process can be partitioned into three components: User Equipment (UE), Attacker and core network (CN).

UE: UE is a representation of ground side device, which requests the connection with unique identifiers, like international mobile subscriber identity (IMSI).

Attacker: In the 5G NSA AKA procedure, a typical threat to the security is the attacker regardless of whether it is inside or outside. To detect more vulnerabilities in different scenarios, attackers are assumed to have the ability to listen and filter all transmitted commands.

CN: CN is responsible for providing the information and authentication proof to the request from UE.

Figure 42:
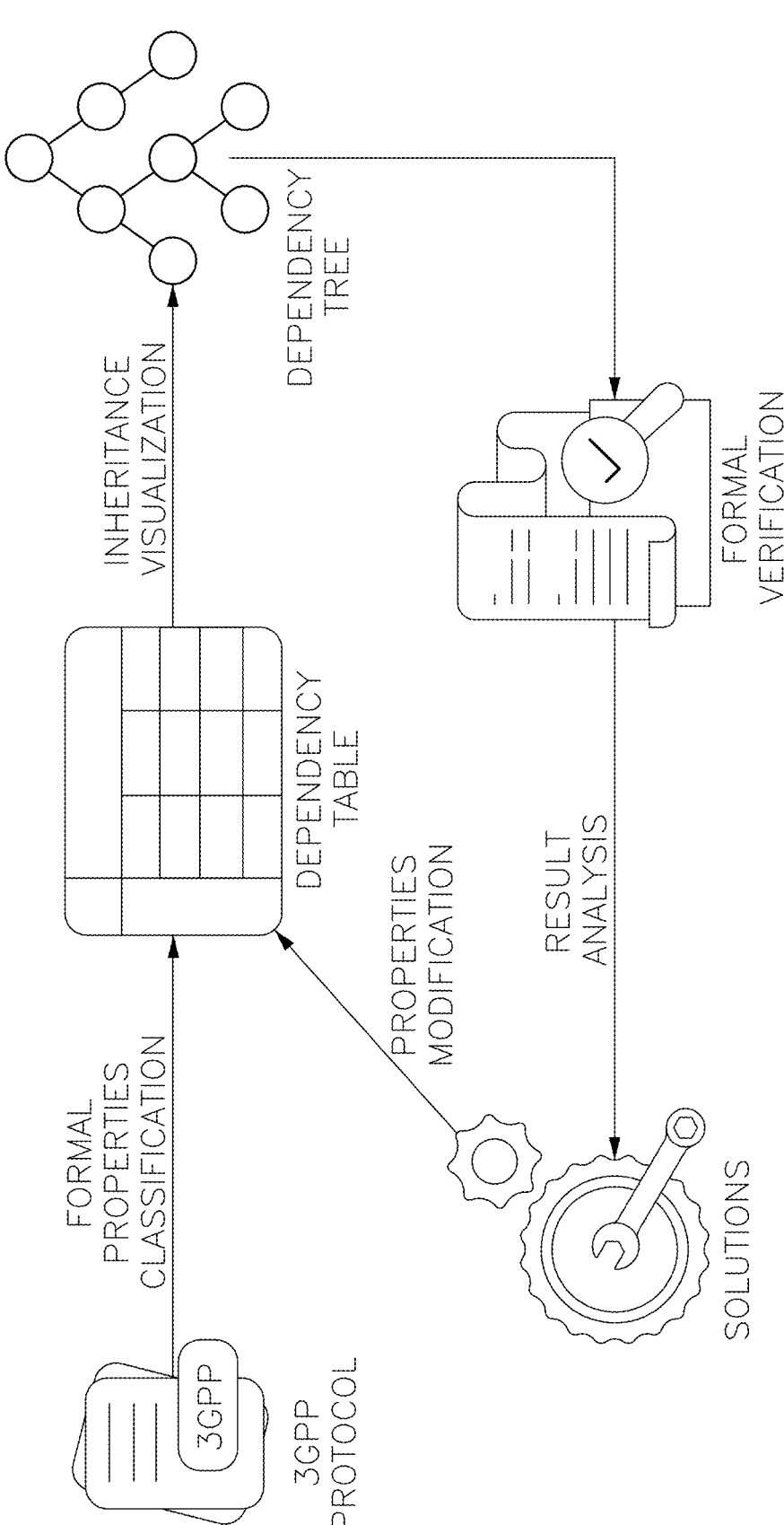
FIG. 42 is a schematic diagram of a system overview in accordance with embodiments of the present invention.

As depicted in FIG. 42, the presently proposed framework achieves a forward and back-propagation amplification through recursive formal verification and correction. Initially, we the relationships between identifiers in protocols were classified based on the following criteria:

Confidentiality ensures that private information is safeguarded from unauthorized access or leaks.

Integrity maintains the assurance that information remains unchanged.

Authentication ascertains if the receiver can verify the sender and the timing of the message.

Accounting determines if the current message aligns with the appropriate session.

Subsequently, these relationships were translated into a dependency table and produced the corresponding formal verification code. Based on the results of the formal verification, proposed solutions are proposed and their performance evaluated by adjusting the dependency relationships in the subsequent iteration.

Abstraction of NSA 5G Authentication Protocol: Compared to Standard-Alone (SA) 5G network architectures, the NSA 5G architecture is still widely adopted but more vulnerable because of the complexity introduced by the Long Term Evolution (LTE) compatibility in protocol designs and infrastructure implementation, especially for authentication and authorization. Therefore, the authentication process in NSA 5G architecture is emphasized herein.

Figure 43:
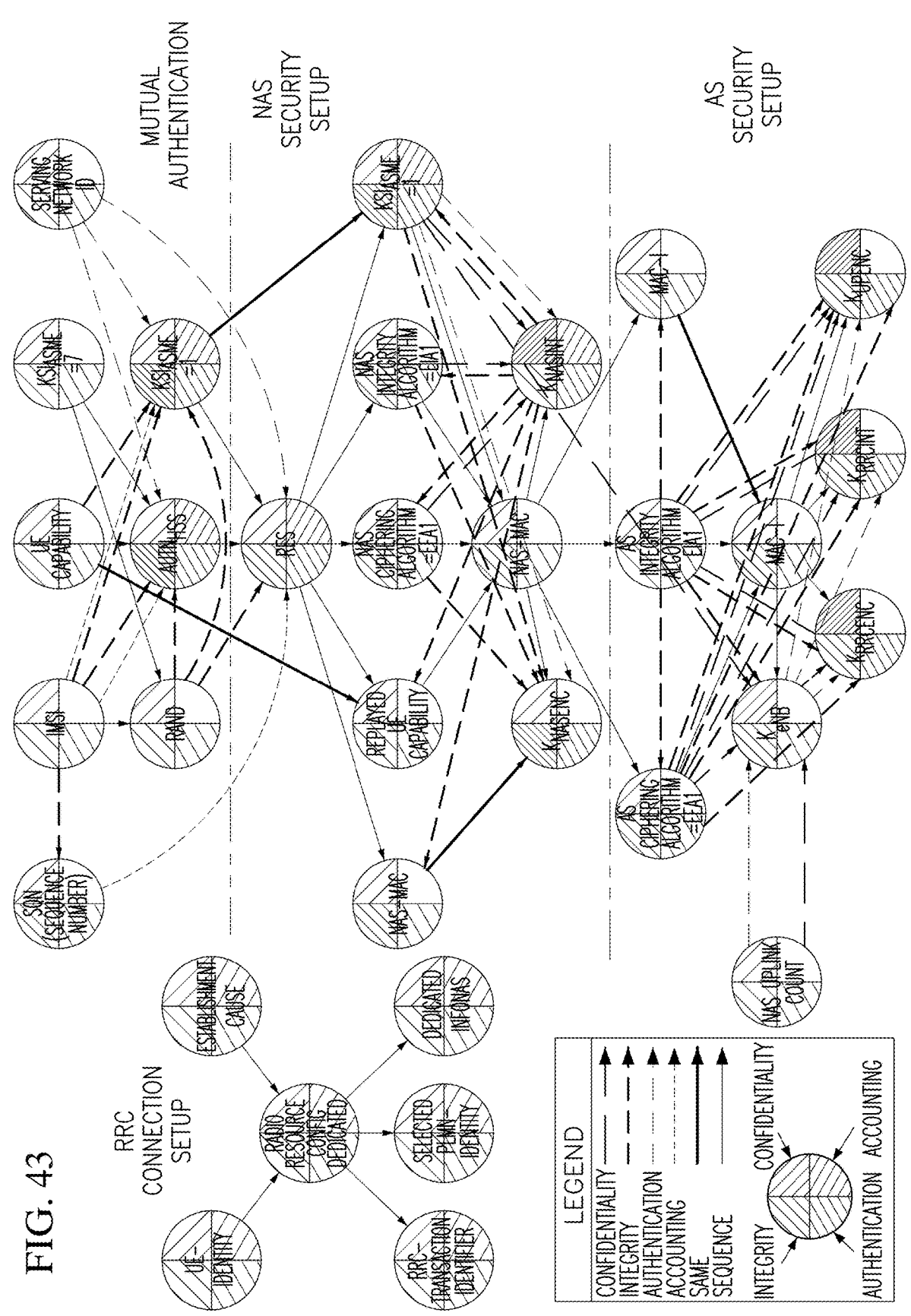
FIG. 43 is a dependency graph of an authentication process in accordance with embodiments of the present invention.

In the traditional formal verification process, security experts are required to abstract the flow graph and each detailed mathematical algorithm of the protocol, such as encryption functions. However, a shortage of security experts slows the pace of security validation. Consequently, an easily comprehensible framework is introduced to assist novices in generating formal verification code. In this framework, instead of mastering formal knowledge, the only task required to abstract a protocol is the classification of four basic formal properties: confidentiality, integrity, authentication, and accounting. For instance, in the mutual authentication process, it can be quickly concluded that Expected response (XRES) is generated from random value (RAND) without understanding the definition of f2 from the protocol description: "an expected response XRES=f2K (RAND)". Moreover, combining the comparison of XRES and response (RES), it can be determined that RES and XRES are integrity-protected by RAND. Considering four essential security properties, the dependency table, presented as FIG. 42A, can be abstracted and defined from the defined protocol. In FIG. 42A, the identifiers within cells indicate whether the target identifier (row) can obtain the corresponding formal property protection (column) from the identifiers inside those cells. Additionally, a formal dependency graph was constructed, as illustrated in FIG. 43, to offer a visual representation of the security dependency relationships.

FORMAL DETECTED ATTACK MODEL AND ANALYSIS: User Credentials Disclosure: In this attack, the adversary can exploit the transparency of the RRC Connection Setup process to effortlessly access critical user identity information, which includes but is not limited to the UE identity and establishment cause. This illicit access enables the adversary to acquire user information and use the ensuing session key for nefarious activities such as eavesdropping and manipulation of subsequent communications.

Assumption: From FIG. 43 (the left part), the RRC Connection Setup process contains only sequence relations without any confidentiality or integrity protection. Therefore, we can conclude that the adversary can exploit the transparency of RRC Connection Setup process to directly access any identifier within the message. Furthermore, the adversary is also capable of establishing a fake UE or a MITM relay to eavesdrop and manipulate the messages within the RRC Connection Setup process. To verify the security properties of identifiers within the RRC Connection Setup process, including aspects such as confidentiality and consistency, the aforementioned assumptions were converted into ProVerif code.

Vulnerability: As depicted in FIG. 41, the UE initiates the process by sending an RRC connection request to the CN. Upon receiving this request, the CN responds by transmitting the radioResourceConfigDedicated back to the UE. The UE, in turn, obtains authentication from the CN and responds with the RRC TransactionIdentifier, selectedPLMN-Identity and dedicatedInfoNAS to finalize the RRC connection setup. Nevertheless, this process presents an exploitable vulnerability as an adversary can access all message identifiers. Such unprotected identifiers run the risk of being eavesdropped upon and modified, potentially enabling the adversary to orchestrate a MITM relay attack.

Attack Trace Description: Employing formal verification, the confidentiality of identifiers within the RRC Connection Setup process were analyzed. Through this methodical investigation, two categories of identifiers were identified with the most significant impact: user identities and RRC configuration identifiers. As illustrated in FIG. 44, an attacker can access the identifiers marked in red, delineating the pathway of the attack. In the initial scenario, an adversary with access to the user identity, like UEidentity, is capable of launching a Deny of Service (DoS) attack with real UEidentity. Contrary to traditional DoS attacks, which aim to overwhelm a system's capacity, an UEidentity-based DoS attack efficiently disrupts the CN verification mechanism through repeated use of the same UEidentity, leading to authentication confusion. And in second case, with computationally derived RRC TransactionIdentifier, the adversary can establish a fake base station or perform a MITM relay attack by manipulating these identifiers. In the latter case, the adversary positions between the UE and the CN, intercepting and modifying communications in real-time. Consequently, this attack model presents a severe threat to the security and integrity of the mobile network's communication.

Fortification via Formal Traced Vulnerability: Given the significance and susceptibility of identifiers within the RRC Connection Setup process, it is beneficial to implement integrity protection measures for the RRC TransactionIdentifier. Additionally, adopting a hash value approach can assist in preventing the disclosure of UEidentity, further reinforcing security measures in this critical process Formal Detected Attack Model and Analysis: DoS or Cutting of Device Using Authentication Request:

In the mutual authentication process, not only is the Attach Request command sent from UE neither ciphered nor integrity protected, but the Authentication Request command sent from CN is also. Attackers can easily record and replay commands to cut off UE.

Assumption: After CN receives the Attach Request command sent from UE, CN will reply Authentication Request command to confirm whether UE is going to attach to the network and share the session key. However, because the Authentication Request command is neither ciphered nor integrity protected, UE will be hard to verify by whom and when the command was sent.

Vulnerability: Due to the non-confidentiality of the Authentication Request command, attackers can repeat the authentication request command to multi UEs, as shown in FIG. 45 It is hard for UE to identify which authentication request command is valid. Multi-times of authentication request command broadcasting will lead to DoS attacks or cutting of UE.

Solution: Based on the analysis of detected vulnerabilities, it is prudent to develop a verification mechanism to identify the validation of commands. The encryption or integrity protection of Authentication Requests becomes necessary for mutual authentication to guarantee the security of initial identifiers for the security establishment process. Based on the principle of minimum change of the current protocol, the following two solutions are proposed:

Ensured confidentiality: Authentication and Key agreement (EC-AKA): EC-AKA proposed new asymmetric encryption to enhance user confidentiality before symmetric encryption is determined. However, this solution will increase the cost of stations like public key broadcasting. Further details can be found in the publication by Bou Abdo et al., entitled "Ensured Confidentiality Authentication and Key Agreement Protocol for Eps," in 2012 Symposium on Broadband Networks and Fast Internet (RELABIRA), 2012, the entire contents of which is incorporated herein by reference and made a part of the present application wherever appropriate.

Hash value to represent IMSI: This approach can prevent attackers from getting the users' identities by concealing these identities within hash values. However, attackers can still modify or deploy DoS attacks. Further details can be found in the publication "Universal Mobile Telecommunications System (UMTS); LTE; Mobility Management Entity (MME) Visitor Location Register (VLR) SGs interface specification" 3rd Generation Partnership Project (3GPP), the entire contents of which is incorporated herein by reference and made a part of the present application wherever appropriate.

Hash value with integrity protection: Khan et al., in the publication entitled "Defeating the Downgrade Attack on Identity Privacy in 5g," in International Conference on Research in Security Standardisation, Springer, 2018, the entire contents of which is incorporated herein by reference and made a part of the present application wherever appropriate, proposed a combined solution, which uses hash values to represent IMSI and adds checksum value to determine whether messages are authenticated. Furthermore, the following commands in the LTE security setup process can be encrypted by original IMSI, which is invisible to the attacker but known to UE and CN. Hash value with integrity protection is a solution that can provide enough security for user identity at a low cost. Moreover, integrity protection can prevent DoS attacks by determining whether a message is repeated.

Exposing KNA Senc and KNAS$_{int}$:

NAS security establishment is only protected with integrity but not encryption, which allows attackers to access all the information but not to modify them. Attackers will masquerade as UE or base station with enough information of authentication process.

Assumption: Commands of the security authentication process in NAS security setup is only protected by KNA$_{Senc}$, a key generated based on the identifiers of the first command.

Vulnerability: Because commands of NAS security mode setup are not ciphered, attackers can access the necessary identifiers and generate the corresponding session key for the following communications based on the corresponding key derivation function. Then, attackers can pretend to be a base station to communicate with victim UE, as shown in FIG. 46.

Solution: As with DoS or Cutting of Device using Authentication Request above, there are two encryption methods to protect the NAS security setup:

First, broadcasting asymmetric public key from gNodeB (gNB) can be applied to encrypt the commands. However, the asymmetric encryption will double the cost of NAS security establishment process.

NAS security setup process can also encrypt with original IMSI as symmetric key, while the hashed IMSI is used for RRC connection setup.

Exposing K$_{RRCenc}$, K$_{RRCint}$ and K$_{UPenc}$:

Similar to the NAS security setup process, the AS security setup process is only integrity protected. All necessary identifiers of the following RRC and User Plane (UP) communications are transparent to attackers.

Assumption: Similar to the NAS security setup process, all commands of the AS security setup process are only integrity protected without encryption. Attackers will be more likely to generate RRC and UP session keys based on eavesdropped identifiers, like FIG. 47.

Vulnerability: Based on the eavesdropped K$_{RRCenc}$, K$_{RRCint}$ and K$_{UPenc}$, attackers can monitor, hijack and modify the commands between UE and CN.

Solution: As proposed above, asymmetric encryption can be used to cipher the communicated commands between UE and gNB. However, this solution will increase the cost of the AS security setup process. Additionally hashed IMSI will be used as the symmetric key to encrypt the commands.

The notable findings are summarized in FIG. 46A. In all four detected attack models, three can be verified by previous research, and one is newly detected. For each attack model, the verified solution with regenerated formal code is provided by modified dependency table and offer stateful guidance for fuzz testing to conduct more detailed vulnerability detection. It is noteworthy that only DoS attack operates without any assumptions, and all other attacks require at least one type of identifier, like TMSI. An attack with fewer requirements suggests that the vulnerabilities are more severe.

Overall, a novel, comprehensive, and intuitive formal verification framework is provided that transforms professional formal abstraction tasks into simpler classification tasks. Direct or indirect dependency relationships are leveraged to generate formal verification code. The dynamic feedback loop within this framework shows the effectiveness in vulnerability detection and solution validation. Four vulnerabilities detected across four continuous 5G AKA procedures are highlighted along with several solutions to demonstrate the capability of the proposed framework for solution verification.

To conclude, the present disclosure presents a pioneering step towards bolstering 5G security by employing an integrated, hierarchical approach to vulnerability detection. This invention contributes to the ongoing efforts to secure the next generation of wireless communications and provides a foundation for future research in this domain. Advanced wireless technologies present challenges such as increased complexity, dynamic network configurations, and a diverse ecosystem of devices and protocols, which complicates dependency-based formal analysis. The proposed framework, however, is useful in these contexts as it offers a structured method to model and analyze the intricate relationships and interactions within these technologies. By simplifying the complexity into manageable, formalized dependencies, the framework can help identify potential vulnerabilities, ensure security and reliability, and support the design of robust wireless networks across various applications and environments.

Example 11: A Unified Framework

A unified framework includes four elements. First is an NLP based Formal Modeling for Protocols and Specifications. This would utilize LLM based cross-attention for protocol auto formal modeling. This element achieved 100% recall to ensure a trustworthy vulnerability detection. In one embodiment LLM to train the graph generated by a Python program-generated graph.

The second element is a Formal and Fuzzing Amplification GAN Search Area Propagation. This would involve formal and fuzz auto-triggering of a search space propagation. It involves domain-based formal and fuzz amplification for risk assessment.

The third element is a Local-Edge-Cloud 24/7 Accessible 5G Digital Twin. It would involve a hybrid Over the Air and ZeroMQ based fuzzing platform. An assembly level fuzzing accelerator would allow for real-time digital engineering experiments.

The fourth element is Graph Embedding Vulnerability Causation and Risk Impacts. In one embodiment, it involves quantum neural network-based vulnerability causation for real-time monitoring and risk assessment. It can leverage carrier and publicly accessible 5G platforms.

Figure 48:
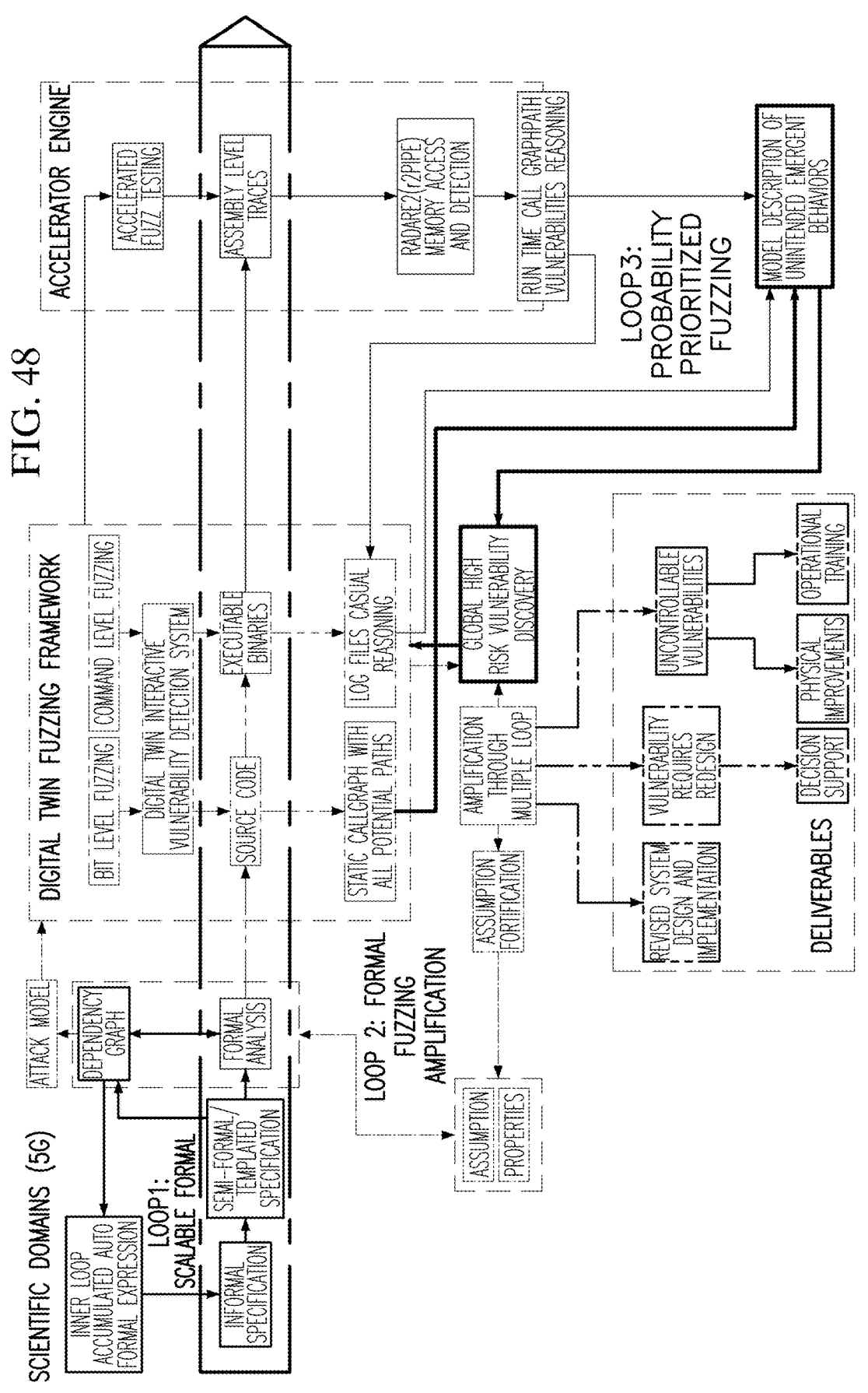
FIG. 48 is a system diagram illustrating Run Time Vulnerability Detection.

FIG. 48 illustrates Run Time Vulnerability Detection Overview. Loop 1 shows automation of formal expression using ChatGPT Assisted Natural Language Parsing from informal specification to semi-formal. Then, semi-formal to formal is conducted resulting in a dependency graph, including templated parsing.

Loop 2 shows Formal and Fuzz Amplification. This includes formal guided fuzz testing and fuzzing-identified high risk triggered formal methods. The fuzz testing results are used to fortify the assumptions of the formal methods.

Loop 3 shows Probability Based Intelligent Fuzzing. Specifically, fuzz testing results are used to guide the risk probability distribution, with the results from the formal tree and assembly level traces.

Figure 49:
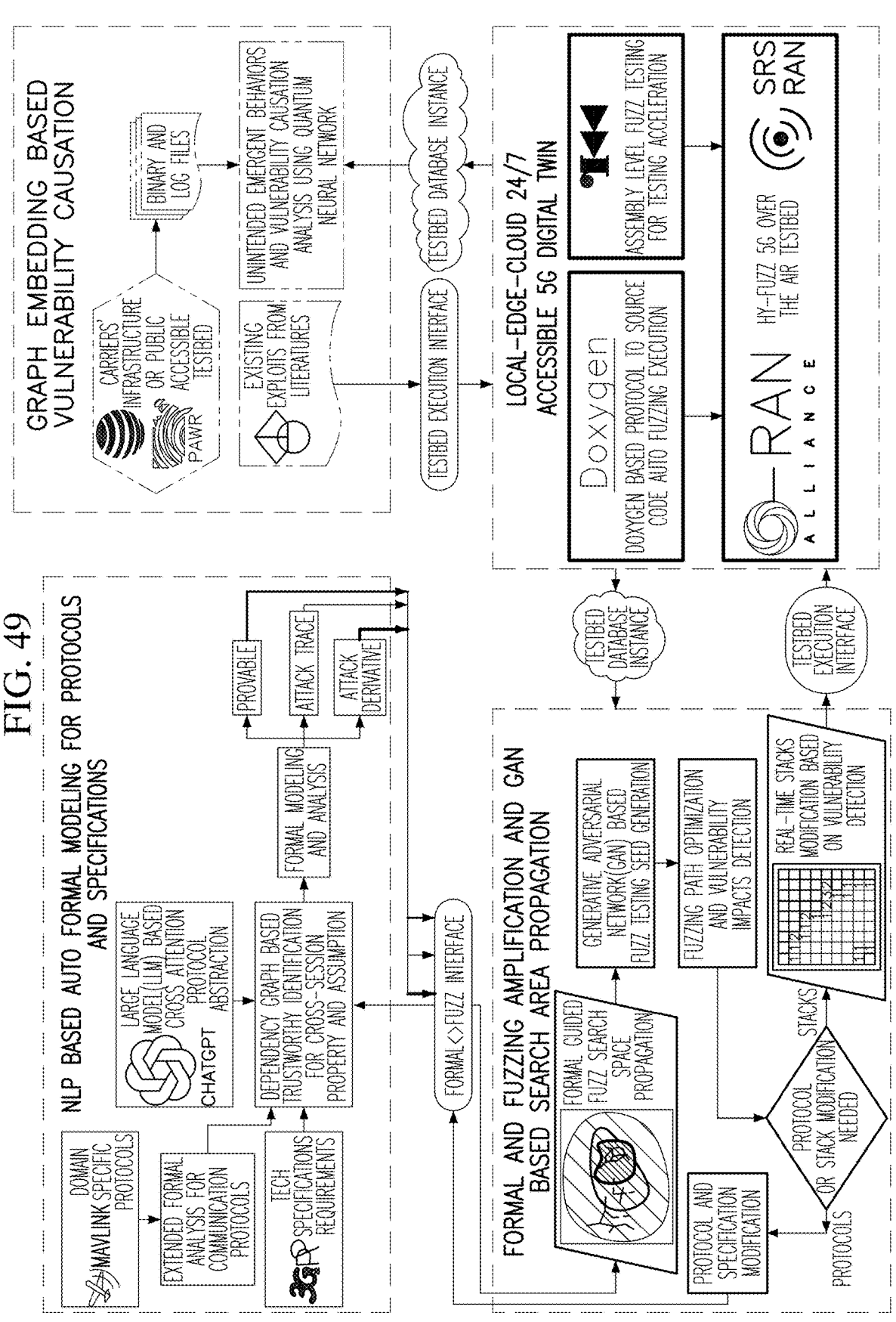
FIG. 49 is a schematic diagram showing a Component View of Design Verification and Implementation Validation.

FIG. 49 shows a Component View of Design Verification and Implementation Validation.

FIG. 42A shows Dependency Graph Based Formal Automation-Property Identification. Confidentiality, Integrity, Authentication and Accounting (CIAA) are the four properties in general for verification. For each identifier of the authentication command/procedure, defined CIAA defined requirements were identified. The sequential order of each layer is compiled. This framework could be leverages to convert from Natural Language based protocols to extract formal properties and assumptions, therefore enabling the automation of formal detection.

Figure 53:
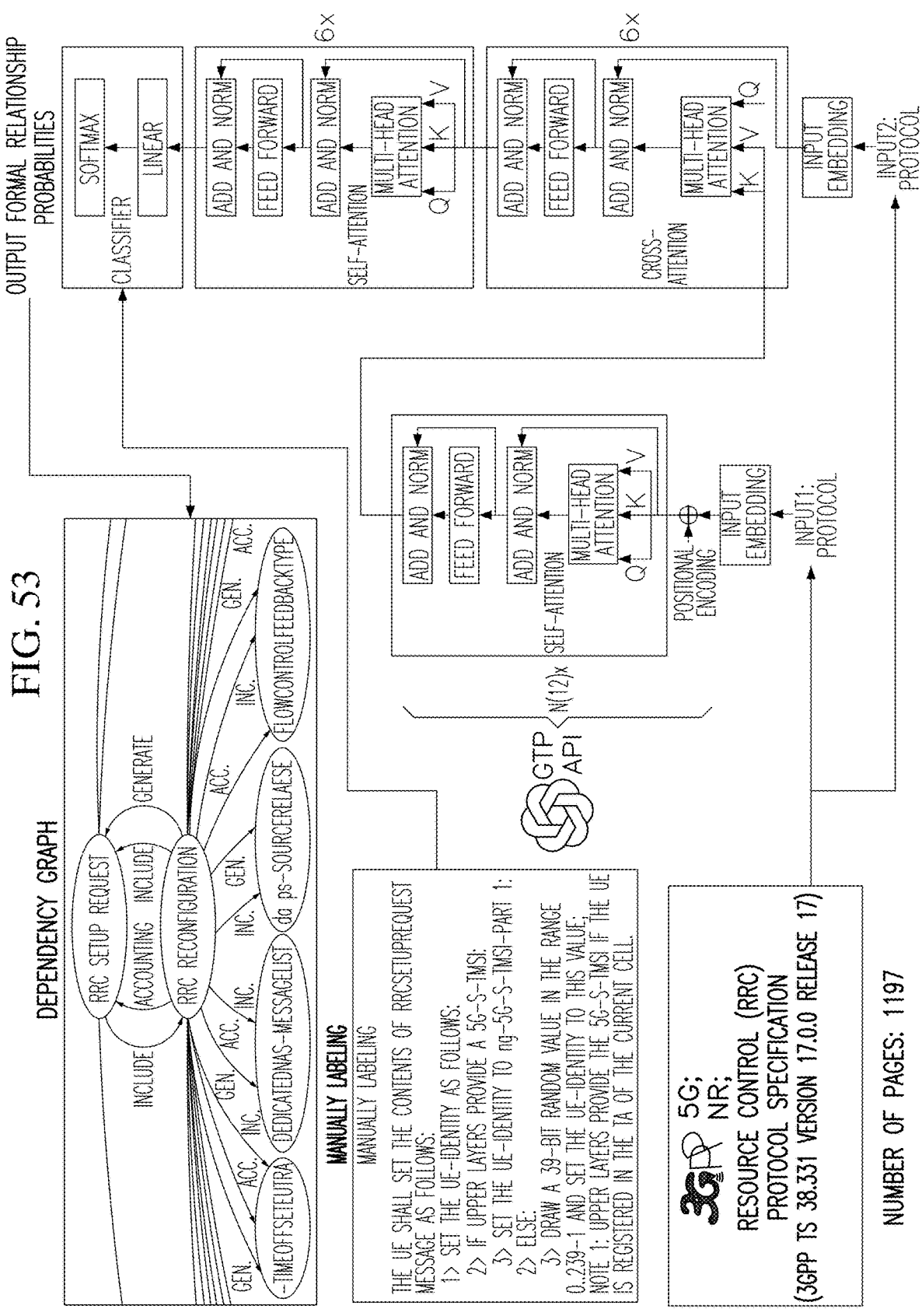
FIG. 53 is a schematic diagram showing a Cross-Attention based Large Language Model for Auto-Modeling of Formal Verification, in accordance with embodiments of the present invention.

FIG. 53 is a schematic diagram showing the inter-relation of various parts of a system constructed in accordance with embodiments of the present invention. Specifically, FIG. 53 shows a Cross-Attention based Large Language Model for Auto-Modeling of Formal Verification. Cross-attention-based Large Language Models can be developed to process thousands of pages of design documents for automatic formal modeling, significantly streamlining the traditionally labor-intensive process. Further, the present invention advances the capabilities of LLMs to accurately capture dependency graphs for formal verifiable relationships and design intents.

Manually Labelling can be conducted with the following algorithm, wherein The UE shall set the contents of RRC-SetupRequest message as follows:

1> set the ue-identity as follows:
2> if upper layers provide a 5G-S-TMSI:
3> set the ue-identity to ng-5G-S-TMSI-Part1;
2> else:
3> draw a 39-bit random value in the range 0.239-1 and set the ue-identity to this value;
Note that upper layers provide the 5G-S-TMSI if the UE is registered in the TA of the current cell.

This framework bridges the gap between the inherent ambiguity in natural language processing and the explicitness required in formal expression. The verifiability in formal models, in turn, creates a supervised environment using the verified results that significantly enhances the explanation and trustworthiness of the LLM system.

To this end, two challenges are addressed: First achieving Trustworthiness means resolving the conflict of ambiguity in NLP and then explicitly in formal methods. Then, Design Intention involves distinguishing design intended relations and design unintended relations.

Figure 50:
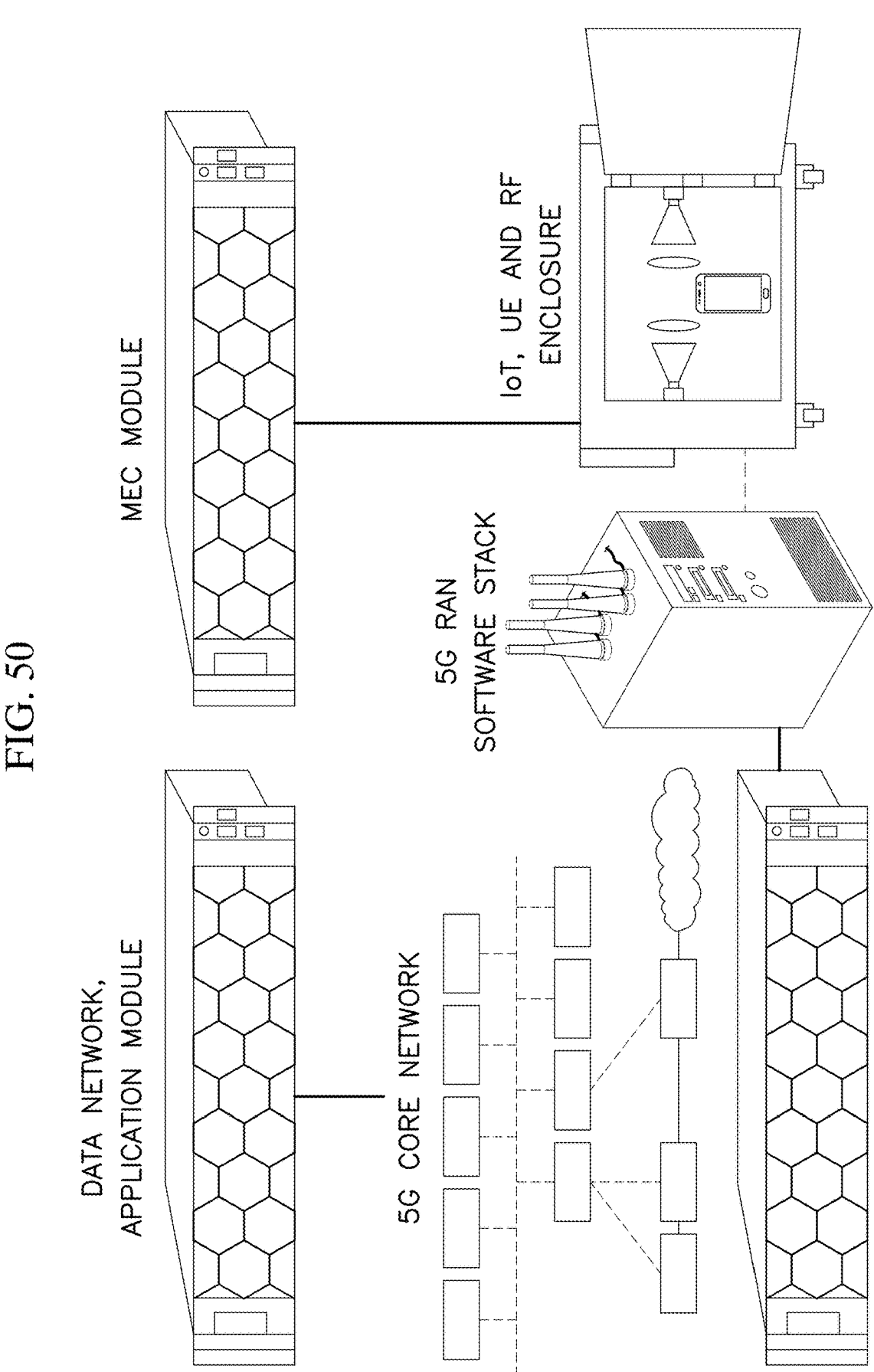
FIG. 50 shows the Structuring of a Dependency Graph Based on Real-world Exclusions.

FIG. 50 shows the Structuring of a Dependency Graph Based on Real-world Exclusions, while FIG. 51 a related algorithm and FIG. 52 is a related log file.

Figure 54:
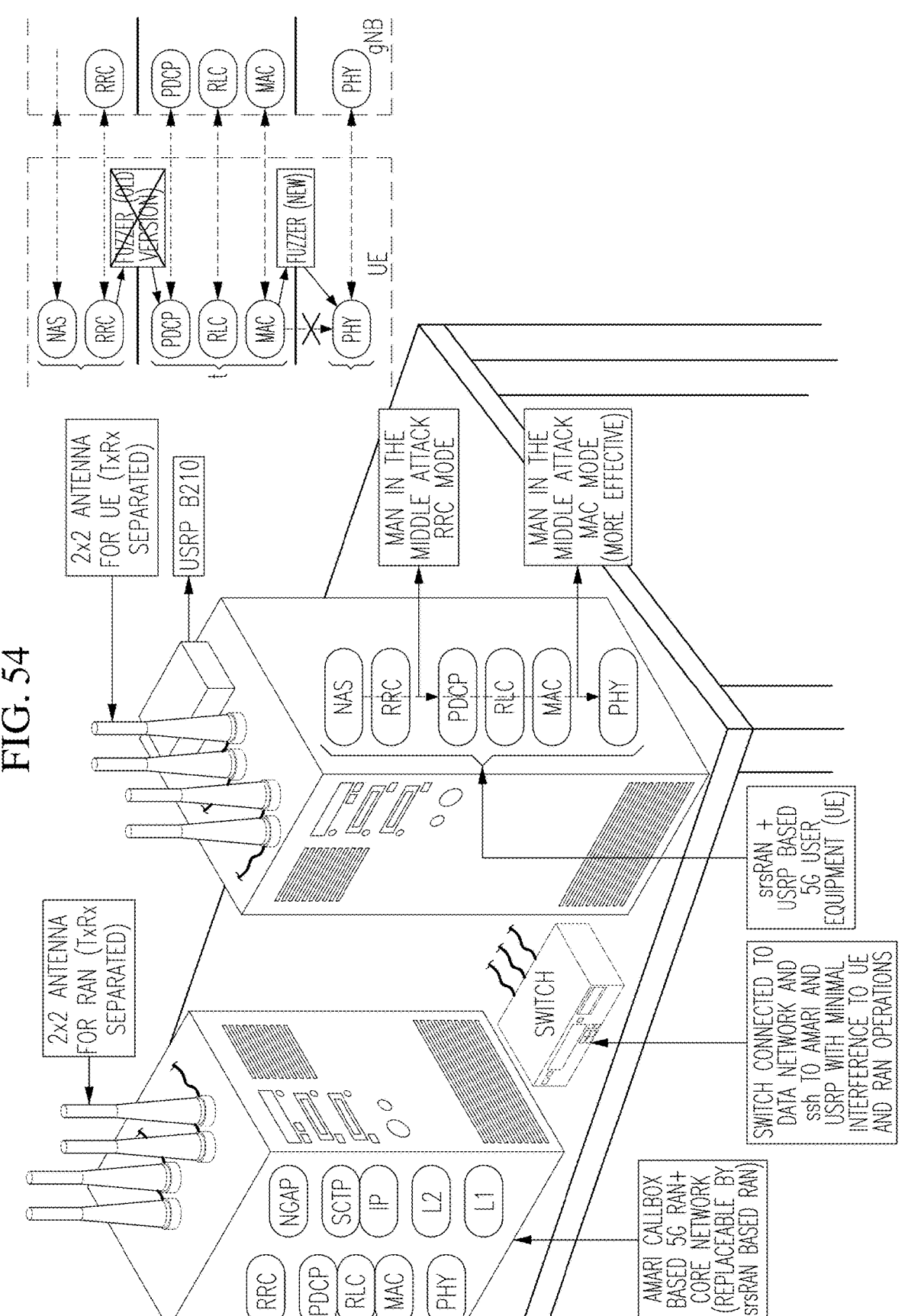
FIG. 54 is a schematic diagram for a Hybrid Platform for Multi-step Deep Fuzzing Over-the-Air in accordance with an embodiment of the present invention.
Figure 55:
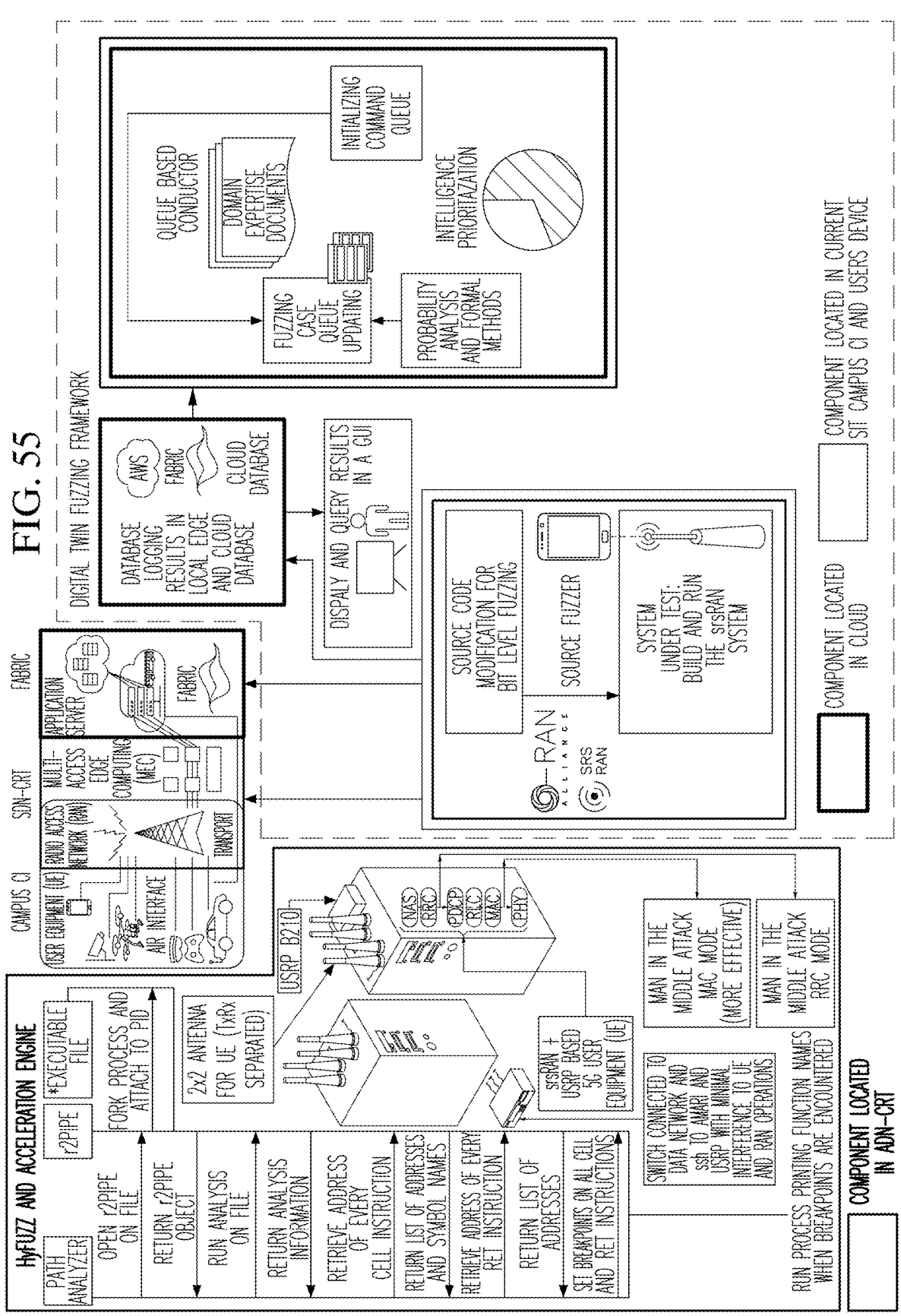
FIG. 55 is a schematic diagram providing a more detailed view of the inter-relation of components of the system of FIG. 54 when integrated with a campus infrastructure.

FIGS. 54-55 are schematic diagrams for a Hybrid Platform for Multi-step Deep Fuzzing Over-the-Air. Similarly, FIG. 55 provides a more detailed view of the inter-relation of components of such a system when integrated with campus infrastructure.

Figure 56:
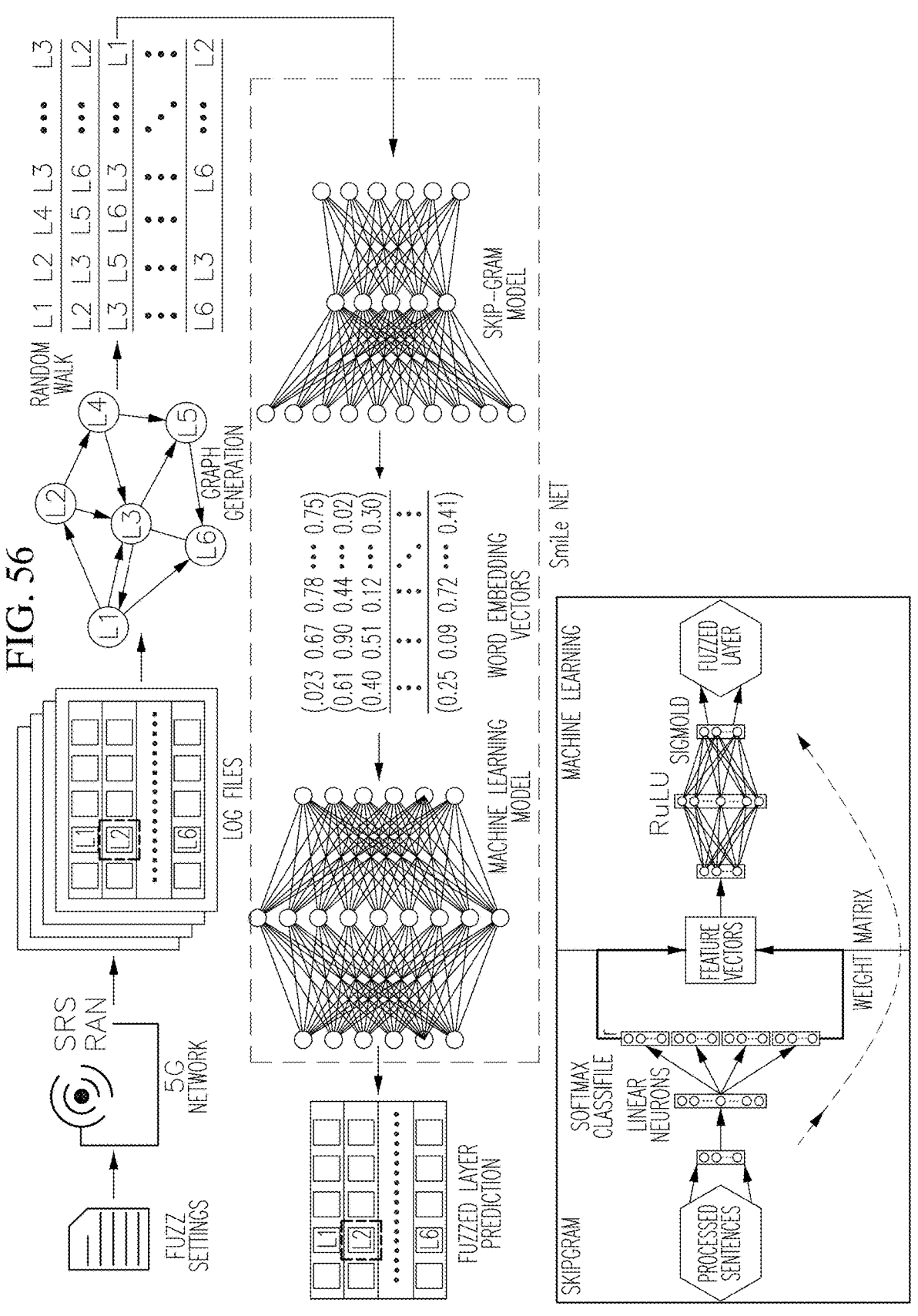
FIG. 56 is a schematic diagram illustrating Graph Embedding based Profiling Vulnerability Causal Inference to Root Causing.
Figure 57:
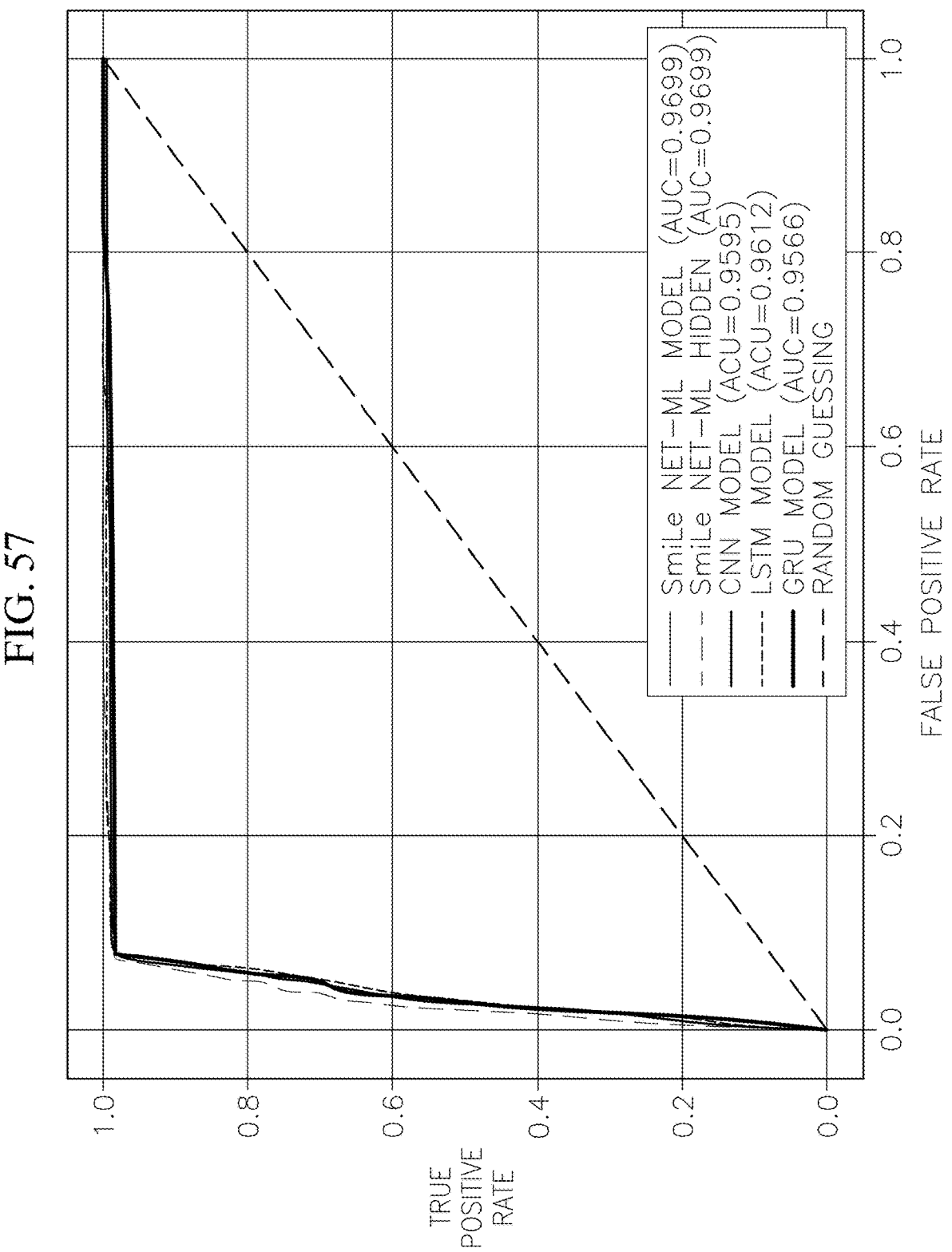
FIG. 57 represents graphical results relating to the schematic diagram of FIG. 56.
Figure 60:
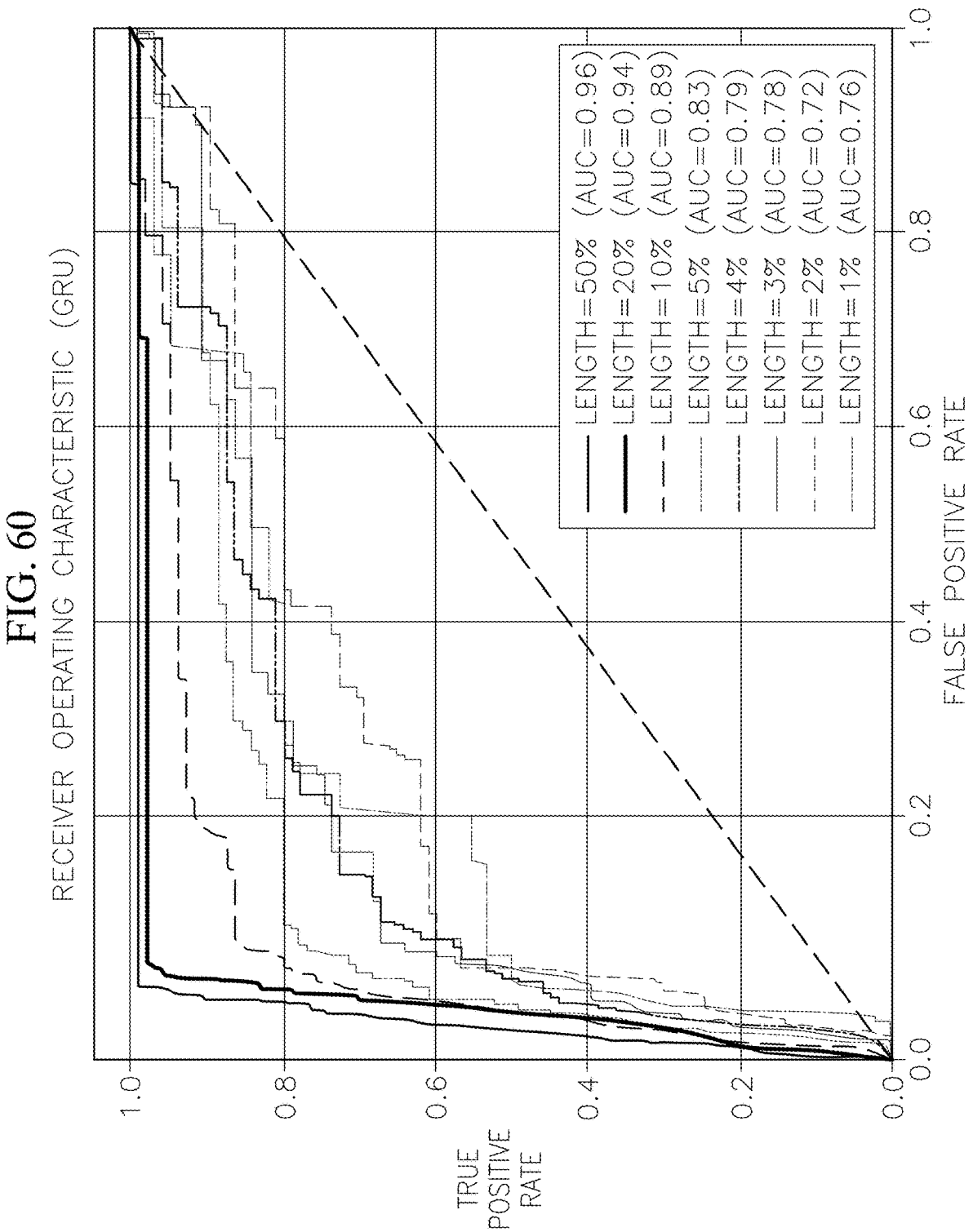
FIG. 60 is a graph representing results pertaining to the system of FIG. 58.
Figure 61:
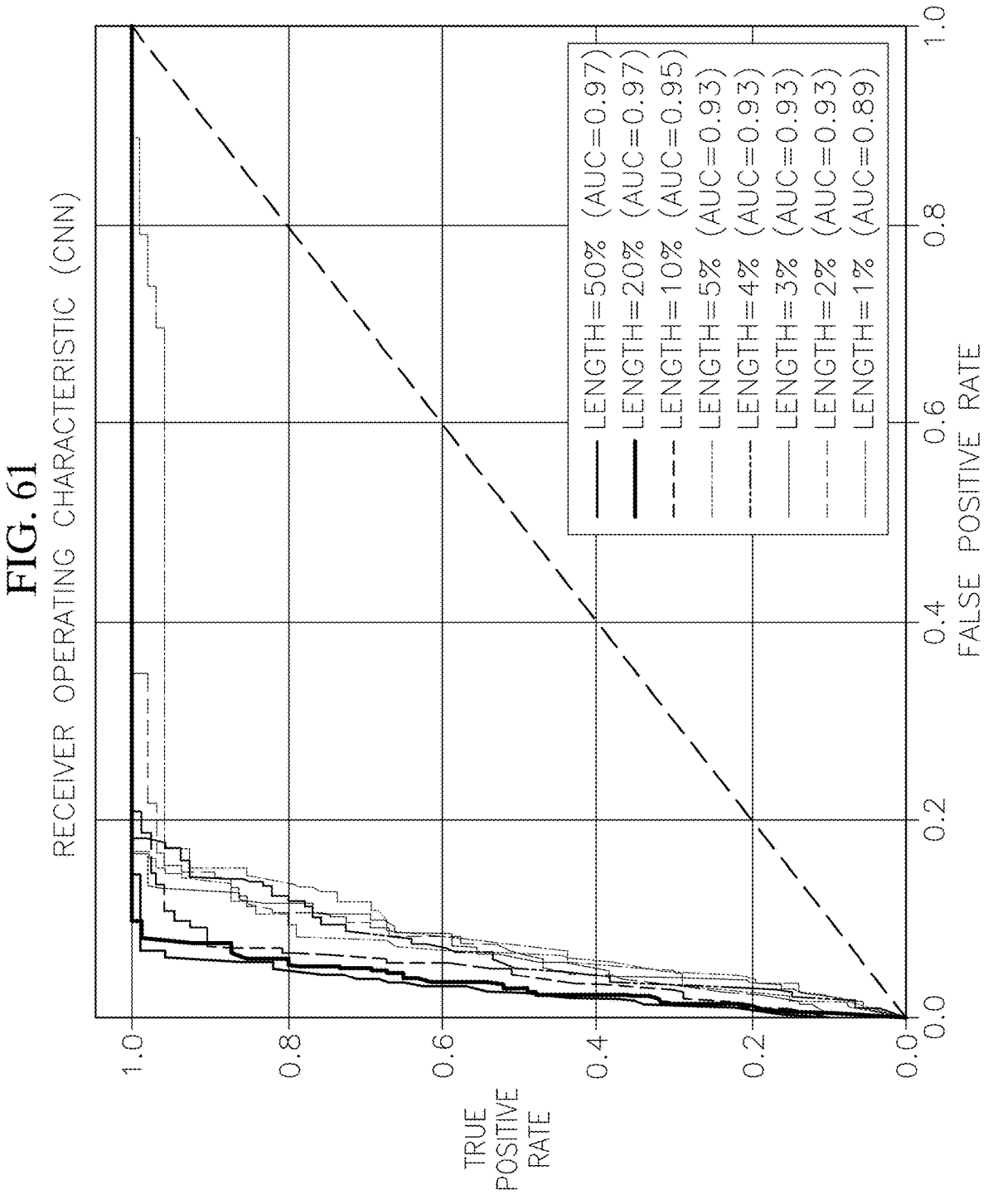
FIG. 61 is a graph representing results pertaining to the system of FIG. 58.
Figure 62:
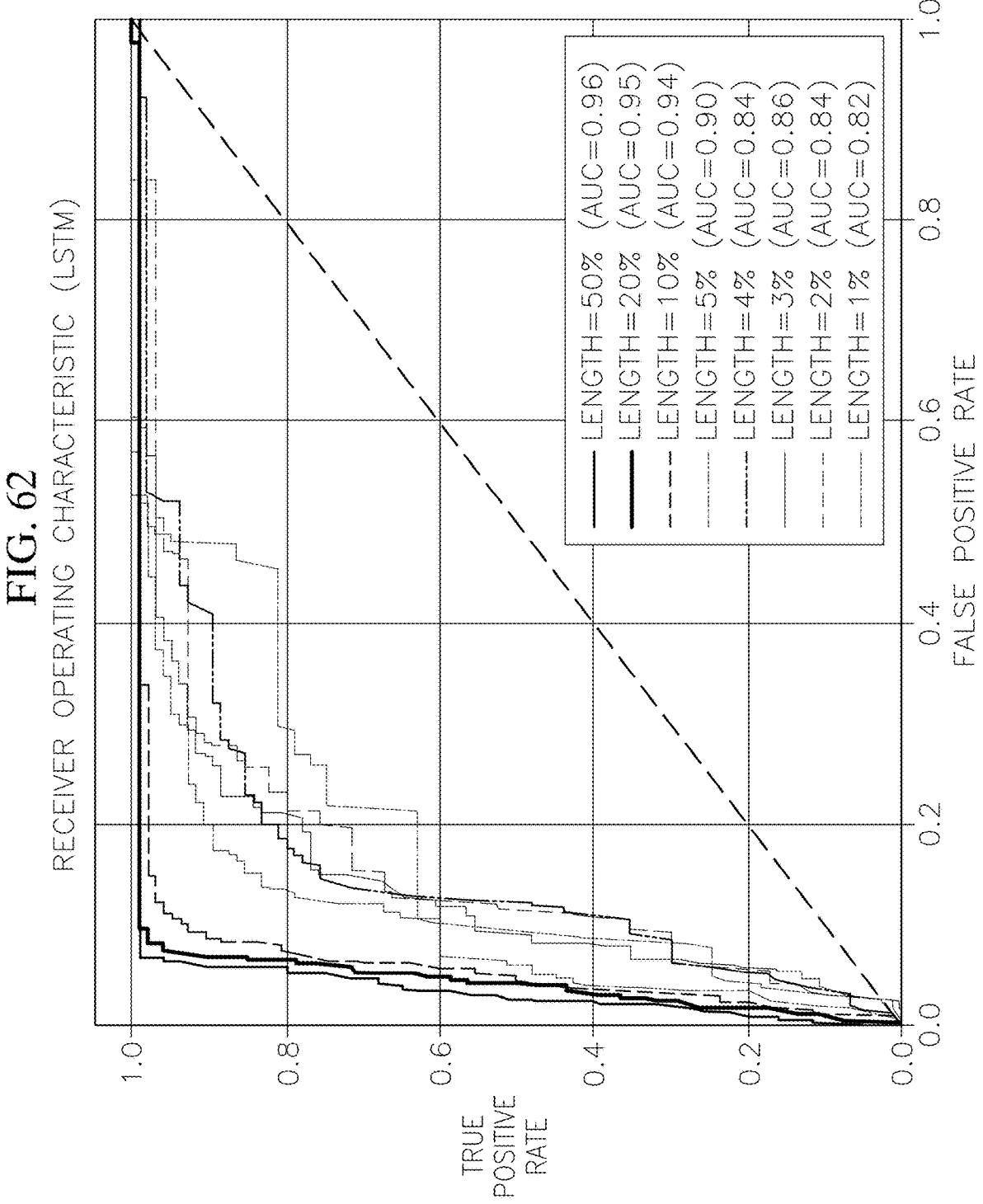
FIG. 62 is a graph representing results pertaining to the system of FIG. 58.
Figure 63:
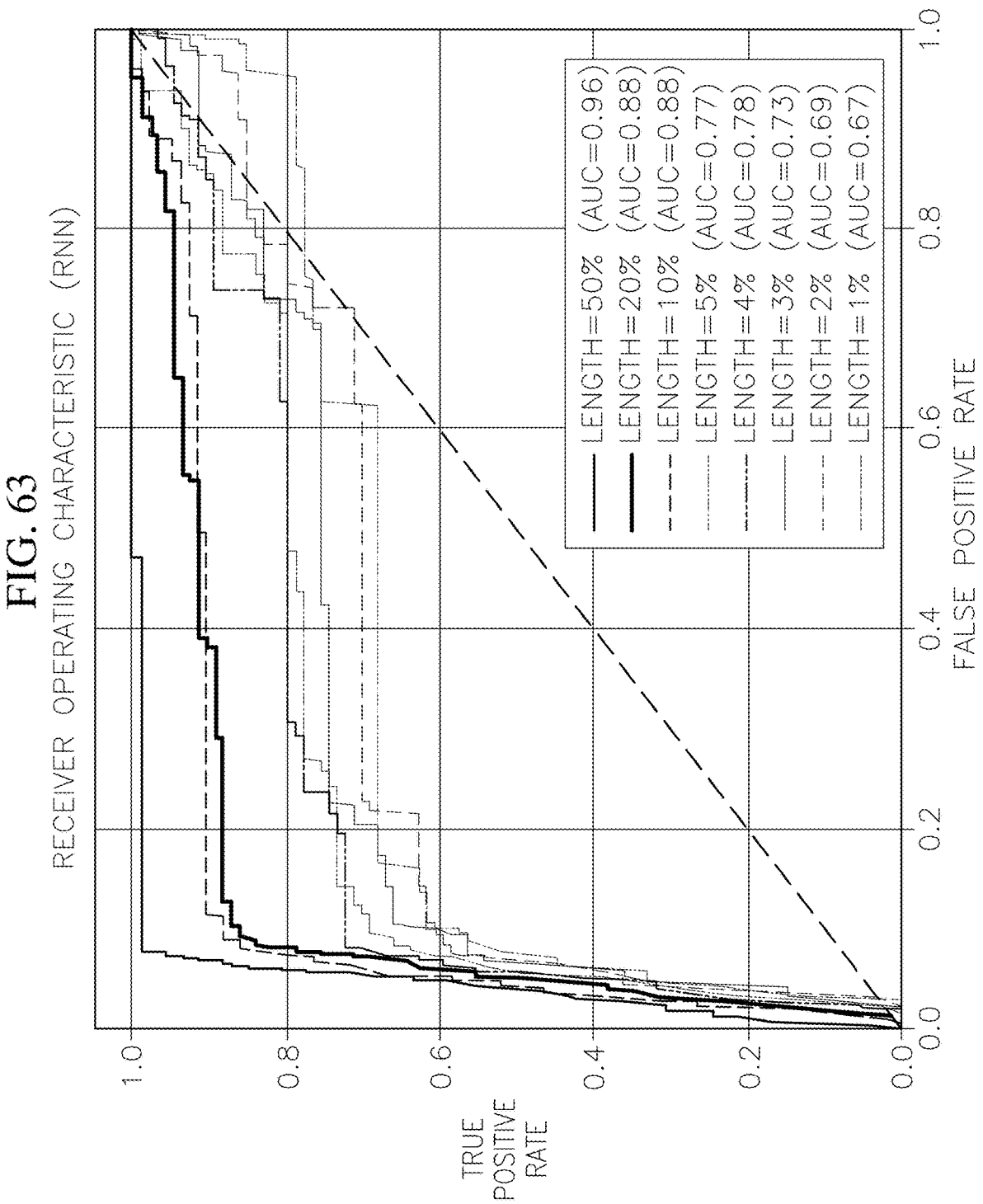
FIG. 63 is a graph representing results pertaining to the system of FIG. 58.
Figure 64:
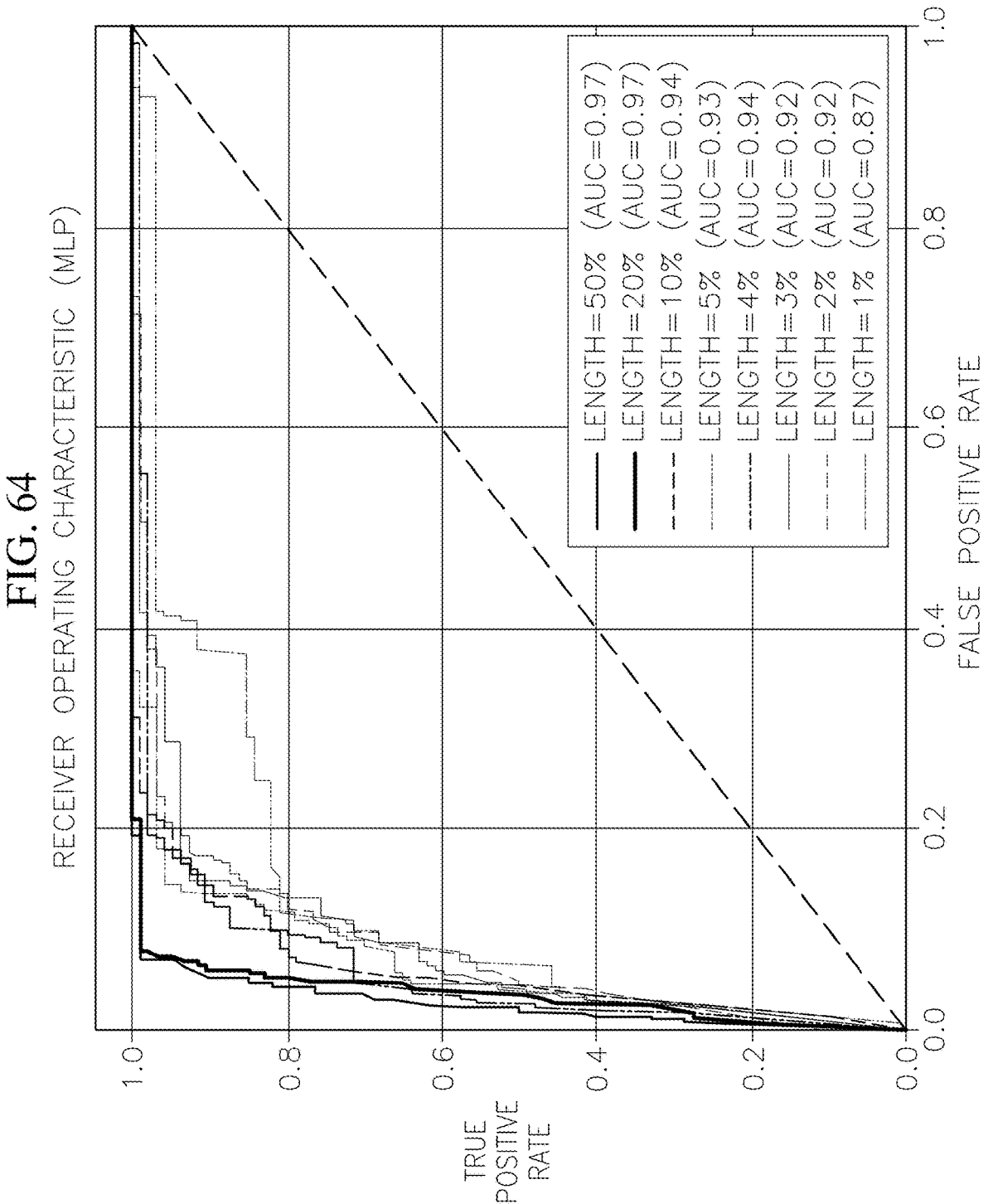
FIG. 64 is a graph representing results pertaining to the system of FIG. 58.

FIGS. 56 and 57 illustrate Graph Embedding based Profiling Vulnerability Causal Inference to Root Causing. If an input that causes the system to crash by fuzz testing is found, a developer may need to use a debugger or code review to find the specific code segment that caused the crash to analyze the problem. This may involve a deep understanding of the code's logic, system's configuration, operating system's behavior, etc. The results show that SmiLe Net can predict the root cause with the accuracy of 97%. It can be known know which layer is fuzzed from the log file of FIG. 59. FIG. 58 illustrates a Real-time Framework for Root Cause Analyses in NextG Vulnerability Detection (RAFT). RAFT is a general solution that can be built on top of any existing Machine Learning (ML) models. It does not require any knowledge about the target ML model. Therefore, it is maximally compatible with all existing innovations in model structure and feature engineering. FIGS. 60-64 illustrate graphical results pertaining to this system.

FIGS. 65-68 pertains to Graph Embedding based Root Causing and Causation. Specifically, Squirrel Net: A Supervised Hybrid Quantum Neural Network with Graph Embedding for NextG Vulnerability Detection is shown. This system involves supervised hybrid quantum neural networks with graph embedding for nextG vulnerability detection (Squirrel Net) with an accuracy and an AUC value of more than 96% and 0.98. This eliminates the requirements for a significant level of human intervention and a deep understanding of the system's code to identify the inputs that cause the vulnerability.

Figure 69:
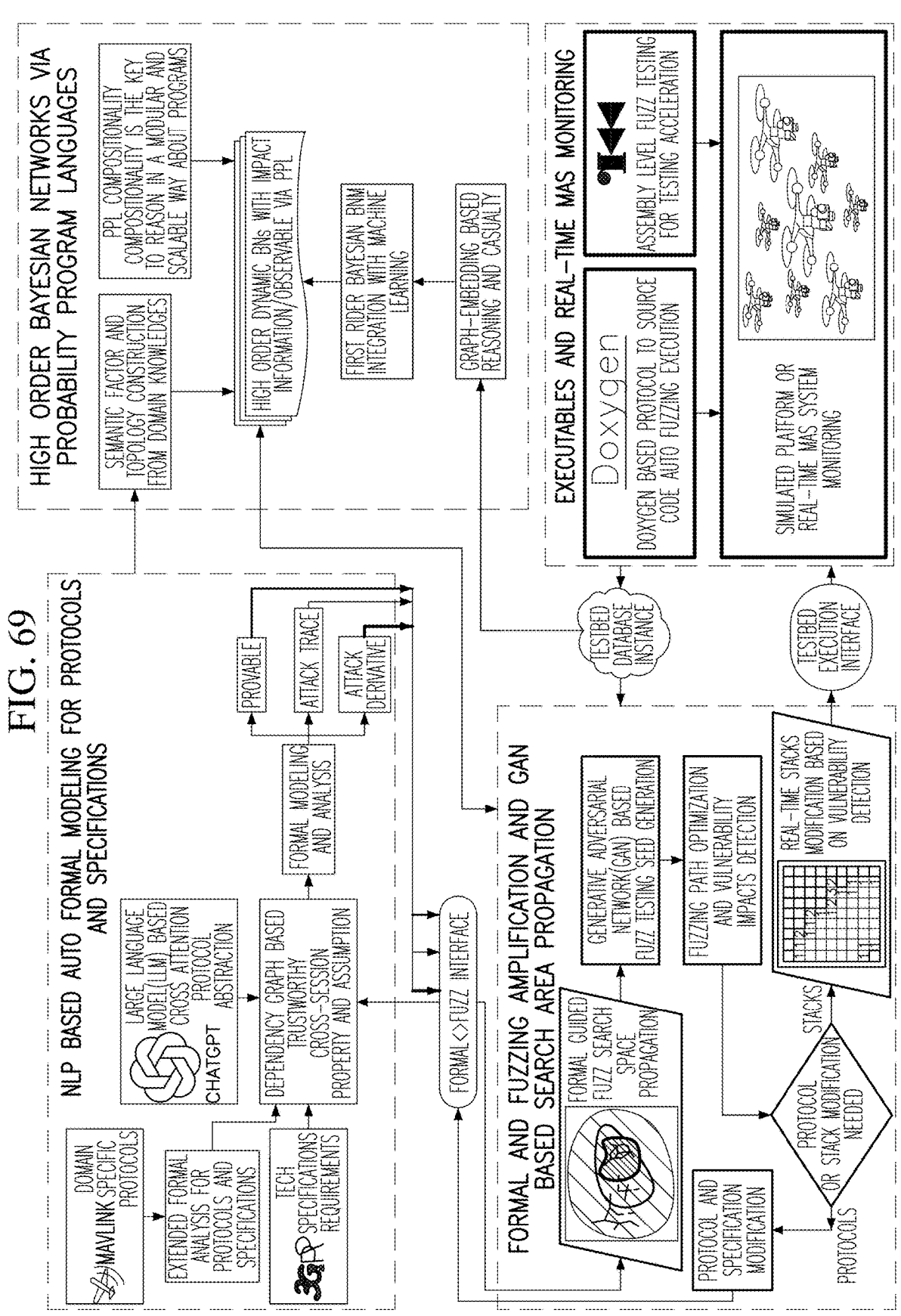
FIG. 69 relates to a system for Large-Scale Multi-Agent System Verification and Validation with Imperfect Information.

FIG. 69 pertains to a Large-Scale Multi-Agent System Verification and Validation with Imperfect Information comprising four components.

Component 1 relates to Auto-Formal Modeling for Converting Designs and Domain Knowledge. Cross-attention-based LLMs are employed to process thousands of pages of design documents for automatic formal modeling, significantly streamlining the traditionally labor-intensive process. The focus lies in fundamental researched aimed at advancing the capabilities of LLMs and prompt engineering to accurately capture dependency graphs for formal verifiable relationships and design intents. This initiative bridges the gap between the inherent ambiguity in natural language processing and the explicitness required in formal expression. This verifiability in formal models, in turn, creates a supervised environment using the verified results that significantly enhances the explanation and trustworthiness of the LLM system.

Component 2 relates to Formal Fuzzing Amplification (FFA) for Intelligent Vulnerability Search Space Propagation. Formal Fuzzing Amplification is an enabler for addressing scalability challenges in large-scale Multi-Agent Systems (MAS). The aim is to realize auto-triggering for formal and fuzz amplification through in-depth fundamental research in a multi-modal search space propagation and search path optimization. The formal verification results generate seeds and guidance for fuzz testing on system implementations or for executable validations through the Generative Adversarial Network (GAN) network and receive feedback from fuzz testing with multi-modal learning factors and quantifiable risk impact estimations. In addition, a digital engineering module bridges the gap between design intentions and real-world operations for MAS.

Component 3 relates to High-Order Bayesian Networks (BNs) for Decision Making with Imperfect Information. In relevant scenarios, system verification and validation muyst often be undertaken with imperfect information from various and limited sources. The aim is to focus on high-order BNs integrated within an isolated search space of Task 2 and the digital engineering module, which facilitates connections to available real-world execution platforms to generate the likelihood of system states, and are utilized for decision-making problems in recurrent events.

Component 4 relates to Reverse Probabilistic Programming Languages (PPLs) for Integration. PPLs hold potential for the logical and semantic decomposition of large joint distributions into smaller factors. This is useful for accurately representing complex systems, such as MAS in real-time. A point of emphasis was reverse-transformed PPLs to develop statistical models integrating information from BNs and FFA, incorporating local deterministic and probabilistic vulnerability risks. The approach aims to create a comprehensive, real-time dynamic system risk model for the System Under Test (SUT).

Figure 70:
FIG. 70 is a log file relating to the system of FIG. 71.
Figure 71:
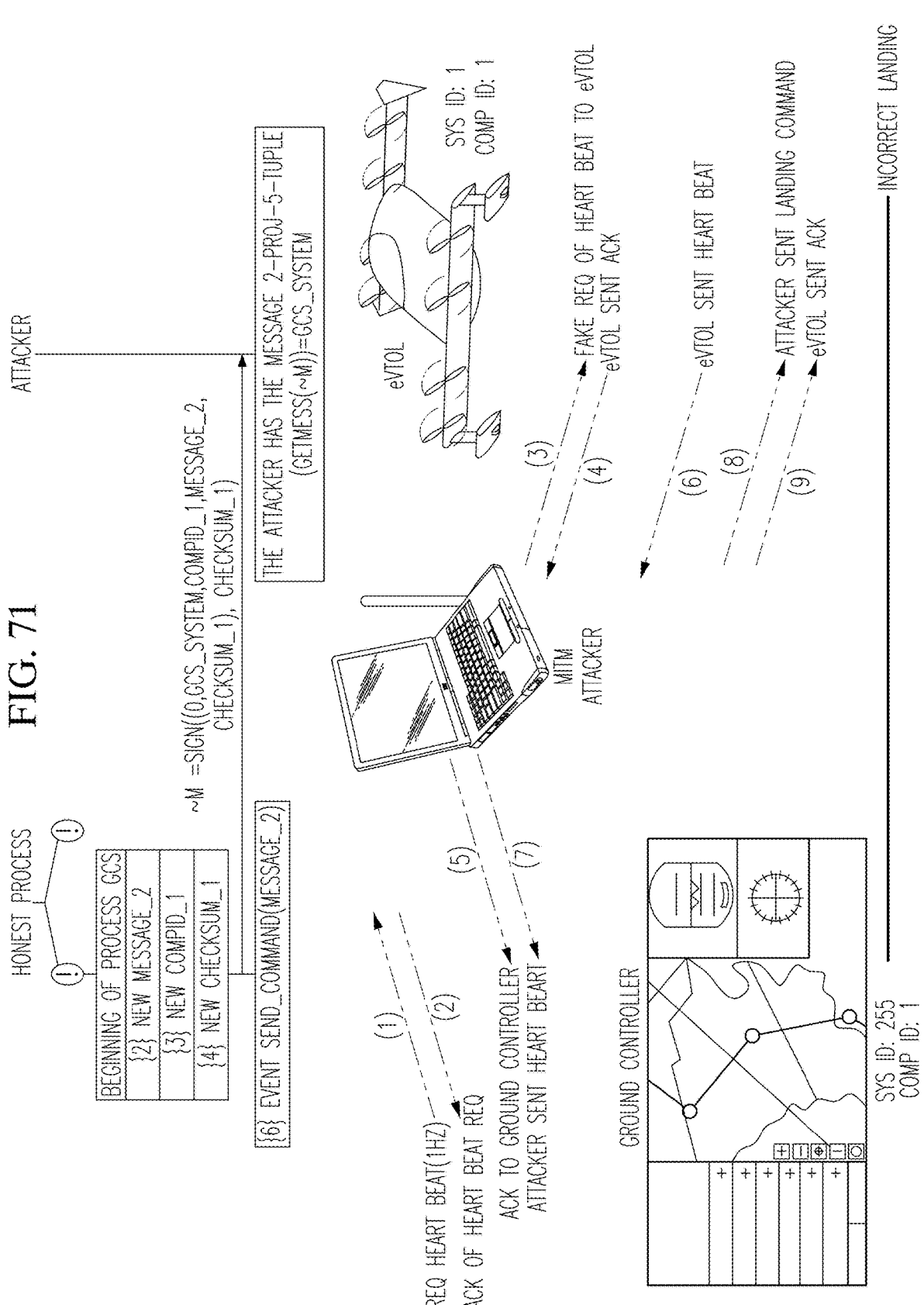
FIG. 71 is a schematic illustration of eVTOL and UAV Protocols for Mavlink Verification in accordance with an embodiment of the present invention.

FIGS. 70-71 illustrate a Dependency Graph Based Formal Automation Interdisciplinary Extension: eVTOL and UAV Protocols for Mavlink Verification. FIG. 70 includes is a related log file. FIG. 71 is a schematic illustration.

Figure 72A:
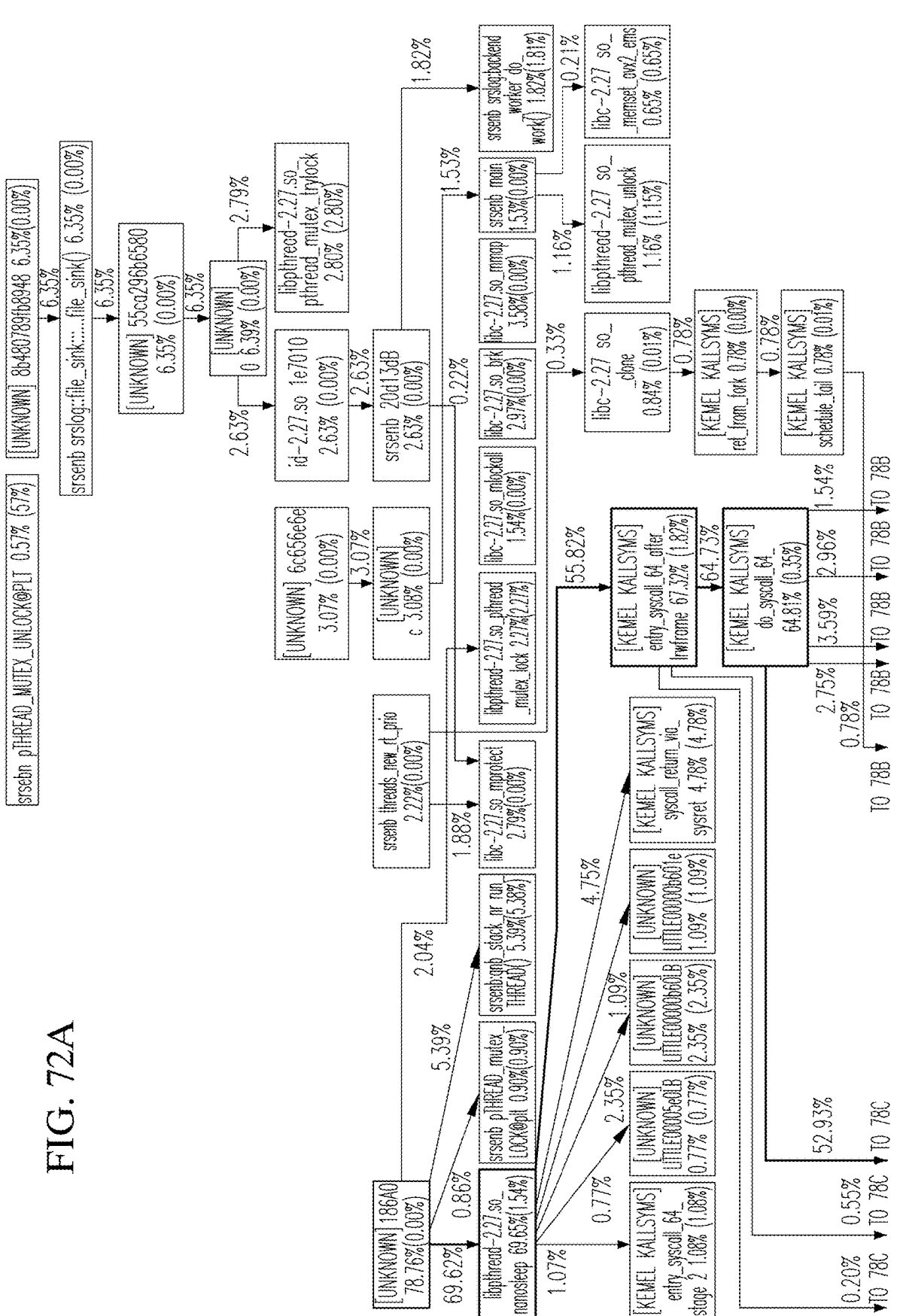
FIGS. 72A-72C are components of a flow diagram illustrating Dynamic Call Graph to Dependency Graph that enable assembly level fuzzing.
Figure 72B:
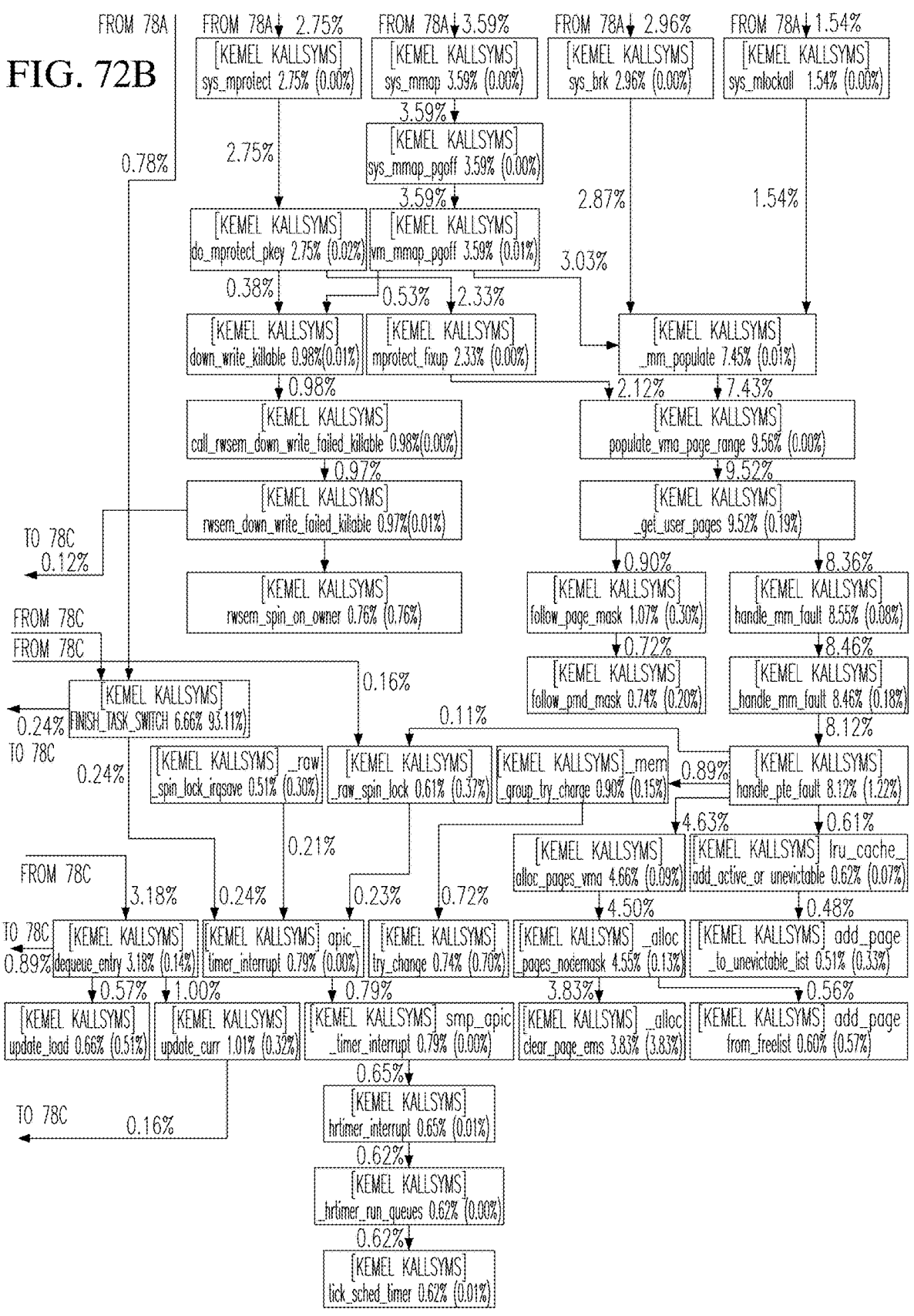
Figure 72C:
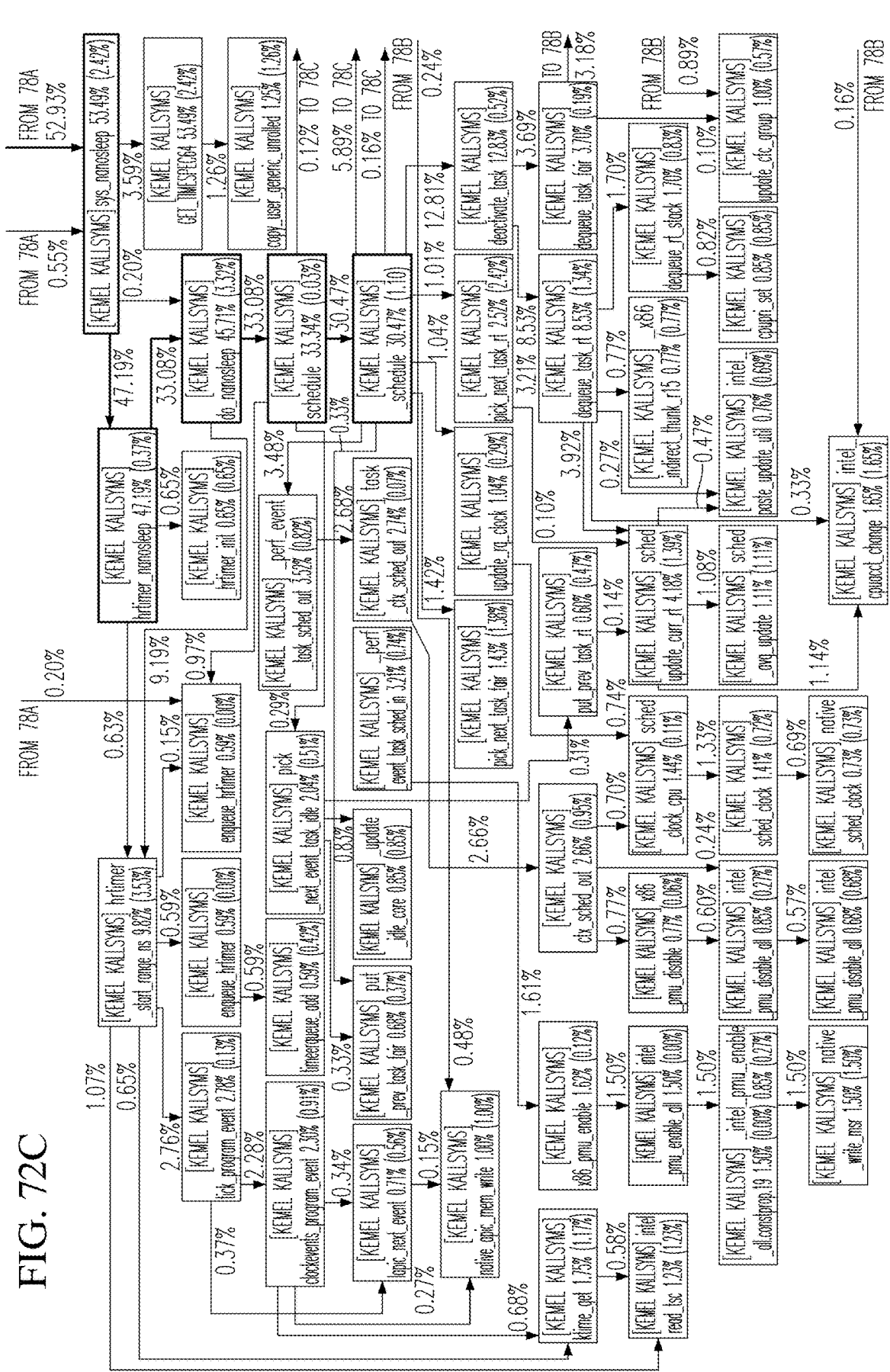
Figure 73:
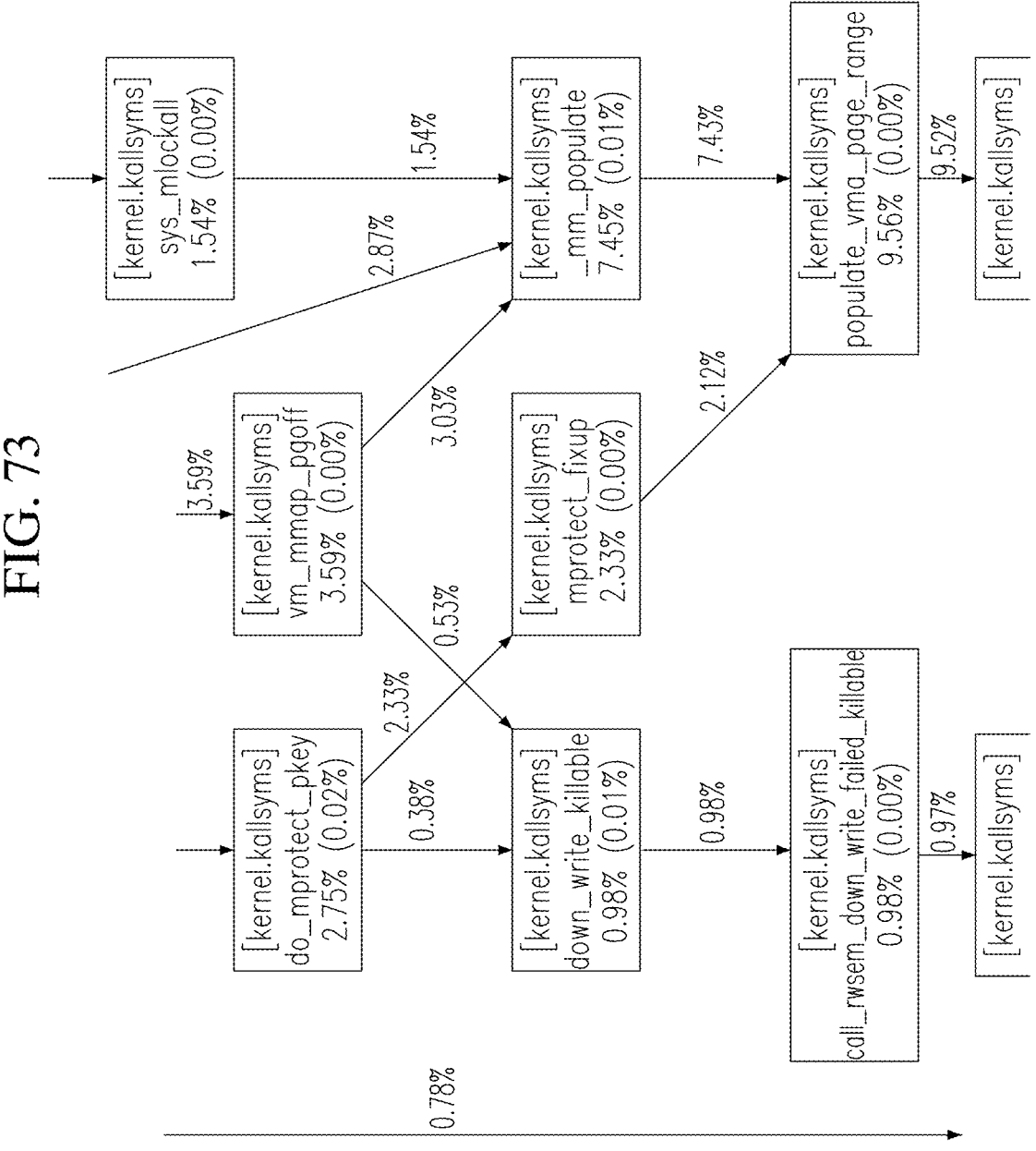
FIG. 73 is a focused excerpt of FIGS. 72A-72C

FIGS. 72A-72C are components of a flow diagram illustrating Dynamic Call Graph to Dependency Graph that enable assembly level fuzzing. FIG. 73 is a focused excerpt of FIGS. 72A-72C.

Further embodiments and details relating to the present invention can be found in the publication by Jingda Yang et al., entitled Systematic and Scalable Vulnerability Detection for 5G Specifications and Implementations, the entire contents of which is incorporated herein by reference and attached hereto as Appendix A and the project summary entitled CICI: TCR: Scalable Vulnerability and Emergent Behavior Detection from Protocol to Stack for Collaborative Cyber-Infrastructure Research, the entire contents of which is attached hereto as Appendix B and incorporated herein by reference.

In summary, the NLP approach to create exploits is a remarkable way of verifying protocols and systems. By annotating the protocol, the LLM can be trained on the new standards. Overall, the size of the documents that the NLP approach can verify is remarkable.

It will be understood that the embodiments described herein are merely exemplary and that a person skilled in the art may make many variations and modifications without departing from the spirit and scope of the invention. All such variations and modifications are intended to be included within the scope of the invention.

The invention claimed is:

1. A method for validating communication systems, comprising steps of:
obtaining input data comprising protocol descriptions;
transforming said protocol descriptions into dependency graphs and formal models using a large language model, said large language model being integrated with a transformer model;
resolving ambiguities in said input data;
determining design intent in said input data;
obtaining iterative feedback from a HyFuzz platform, said HyFuzz platform being adapted to refine capture of intentions and resolve ambiguities in said input data by providing said input data to said HyFuzz platform, wherein said HyFuzz platform is configured to supply said design intent to said large language model; and
producing output.

2. The method of claim 1, further comprising a step of establishing dependency relationships through cross-attention mechanisms and/or self-attention mechanisms.

3. The method of claim 1, further comprising a step of quantifying dependency relationships.

4. The method of claim 3, wherein said dependency relationships are quantified without human involvement.

5. The method of claim 1, further comprising a step of creating a list of exploits from said input data.

6. The method of claim 5, further comprising a step of conducting fuzz testing on said list of exploits.

7. The method of claim 1, wherein said large language model is Cross Attention Learning.

8. The method of claim 1, wherein said large language model performs concurrent processing of said protocol descriptions.

9. The method of claim 1, wherein said dependency graphs are scalable cross-session dependency graphs, supporting hierarchy of formal analysis, thereby facilitating revelation of in-depth relationships embedded within said protocol descriptions.

10. The method of claim 1, wherein said HyFuzz platform is trained on labeled identifiers and formal properties.

11. The method of claim 1, wherein said output bypasses token count barriers.

12. A method for validating communication systems, comprising steps of:

obtaining input data comprising protocol descriptions;
transforming said protocol descriptions into dependency graphs and formal models using a large language model, said large language model being integrated with a transformer model:

resolving ambiguities in said input data;
determining design intent in said input data;
obtaining iterative feedback from an experimental platform by providing said input data to said experimental platform, wherein said experimental platform is configured to supply said design intent to said large language model; and
producing output, wherein said output bypasses token count barriers.

13. The method of claim 12, further comprising a step of establishing dependency relationships through cross-attention mechanisms and/or self-attention mechanisms.

14. The method of claim 13, further comprising a step of quantifying said dependency relationships.

15. The method of claim 14, wherein said dependency relationships are quantified without human involvement.

16. The method of claim 12, further comprising a step of creating a list of exploits from said input data.

17. The method of claim 16, further comprising a step of conducting fuzz testing on said list of exploits.

18. The method of claim 12, wherein said large language model performs concurrent processing of said protocol descriptions.

19. The method of claim 12, wherein said dependency graphs are scalable cross-session dependency graphs, supporting hierarchy of formal analysis, thereby facilitating revelation of in-depth relationships embedded within said protocol descriptions.

20. The method of claim 12, wherein the experimental platform is trained on labeled identifiers and formal properties.

21. The method of claim 12, wherein said large language model is Cross Attention Learning.

22. A method for validating communication systems, comprising steps of:

obtaining input data comprising protocol descriptions;
transforming said protocol descriptions into dependency graphs and formal models using a large language model, said large language model being integrated with a transformer model;
resolving ambiguities in said input data;
determining design intent in said input data;
obtaining iterative feedback from an experimental platform by providing said input data to said experimental platform, wherein said experimental platform is configured to supply said design intent to said large language model;
producing output; and determining if identifiers from said protocol descriptions inherit formal properties from previous identifiers of said protocol descriptions, thereby identifying direct and indirect dependency relationships.

23. The method of claim 22, wherein said direct and indirect dependency relationships are established through cross-attention mechanisms and/or self-attention mechanisms.

24. The method of claim 22, further comprising a step of quantifying said direct and indirect dependency relationships.

25. The method of claim 24, wherein said direct and indirect dependency relationships are quantified without human involvement.

26. The method of claim 22, further comprising a step of creating a list of exploits from said input data.

27. The method of claim 26, further comprising a step of conducting fuzz testing on said list of exploits.

28. The method of claim 22, wherein said large language model performs concurrent processing of said protocol descriptions.

29. The method of claim 22, wherein said output bypasses token count barriers.

30. The method of claim 22, wherein said dependency graphs are scalable cross-session dependency graphs, supporting hierarchy of formal analysis, thereby facilitating revelation of in-depth relationships embedded within said protocol descriptions.

31. The method of claim 22, wherein the experimental platform is trained on labeled identifiers and formal properties.

32. The method of claim 22, wherein said large language model is Cross Attention Learning.

* * * * *